United States Patent
Lim et al.

(10) Patent No.: US 12,531,736 B2
(45) Date of Patent: Jan. 20, 2026

(54) ENFORCING DATA ACCESS POLICIES IN A REVERSE PROXY

(71) Applicant: NextLabs, Inc., San Mateo, CA (US)

(72) Inventors: Keng Lim, Atherton, CA (US); Poon Fung, Cupertino, CA (US)

(73) Assignee: NextLabs, Inc., San Mateo, CA (US)

( * ) Notice: Subject to any disclaimer, the term of this patent is extended or adjusted under 35 U.S.C. 154(b) by 191 days.

(21) Appl. No.: 18/341,725

(22) Filed: Jun. 26, 2023

(65) Prior Publication Data

US 2024/0064017 A1 Feb. 22, 2024

Related U.S. Application Data

(60) Provisional application No. 63/366,986, filed on Jun. 24, 2022.

(51) Int. Cl.
*H04L 9/32* (2006.01)
*G06F 16/2455* (2019.01)
*G06F 21/62* (2013.01)

(52) U.S. Cl.
CPC .......... *H04L 9/32* (2013.01); *G06F 16/24553* (2019.01); *G06F 21/6227* (2013.01)

(58) Field of Classification Search
CPC ....... H04L 9/32; H04L 9/0891; H04L 9/0894; G06F 16/24553; G06F 21/6227
See application file for complete search history.

(56) References Cited

U.S. PATENT DOCUMENTS

| | | | |
|---|---|---|---|
| 7,243,097 B1 * | 7/2007 | Agrawal | G06F 16/2452 |
| 7,716,240 B2 | 5/2010 | Lim | |
| 7,774,363 B2 | 8/2010 | Lim | |
| 7,877,409 B2 | 1/2011 | Lim | |
| 7,877,781 B2 | 1/2011 | Lim | |
| 8,150,816 B2 | 4/2012 | Lim | |
| 8,156,159 B2 | 4/2012 | Ebrahimi et al. | |
| 8,156,566 B2 | 4/2012 | Lim | |
| 8,244,745 B2 | 8/2012 | Lim | |
| 8,321,437 B2 | 11/2012 | Lim | |
| 8,407,345 B2 | 3/2013 | Lim | |
| 8,544,058 B2 | 9/2013 | Lim | |
| 8,595,788 B2 | 11/2013 | Lim | |
| 8,621,549 B2 | 12/2013 | Lim | |
| 8,627,490 B2 | 1/2014 | Lim | |
| 8,677,499 B2 | 3/2014 | Lim | |
| 8,762,406 B2 | 6/2014 | Ho et al. | |
| 8,832,048 B2 | 9/2014 | Lim | |
| 8,843,734 B2 | 9/2014 | Lim | |
| 8,849,858 B2 | 9/2014 | Lim | |
| 8,862,551 B2 | 10/2014 | Lim | |
| 8,875,218 B2 | 10/2014 | Lim | |
| 8,930,381 B2 | 1/2015 | Raghunathan et al. | |

(Continued)

*Primary Examiner* — Abiy Getachew
(74) *Attorney, Agent, or Firm* — Aka Chan LLP

(57) ABSTRACT

A method and system of masking, redacting, filtering, and encrypting data retrieved from or stored into a database using policies in an information management system. The system comprises application, data protection, and database components. A data protection component is placed between an application component and a database component to provide protection to data in a database by applying data access policies to requests sent from the application component to the database component.

28 Claims, 21 Drawing Sheets

(56) References Cited

U.S. PATENT DOCUMENTS

| | | |
|---|---|---|
| 8,930,403 B2 * | 1/2015 | Rissanen ............. G06F 21/6218 |
| | | 707/786 |
| 8,972,449 B2 | 3/2015 | Lim |
| 9,064,131 B2 | 6/2015 | Lim et al. |
| 9,081,981 B2 | 7/2015 | Lim |
| 9,171,182 B2 | 10/2015 | Shukla et al. |
| 9,349,026 B2 | 5/2016 | Gianniotis et al. |
| 9,384,360 B2 | 7/2016 | Lim |
| 9,407,662 B2 | 8/2016 | Lim |
| 9,497,219 B2 | 11/2016 | Lim |
| 9,715,528 B2 | 7/2017 | Ho et al. |
| 9,864,752 B2 | 1/2018 | Lim |
| 9,888,014 B2 | 2/2018 | Rodniansky |
| 9,942,271 B2 | 4/2018 | Lim |
| 10,091,212 B2 | 10/2018 | Weintraub et al. |
| 10,097,582 B2 | 10/2018 | Rodniansky |
| 10,303,892 B1 | 5/2019 | Lim et al. |
| 10,387,669 B1 | 8/2019 | Lim et al. |
| 10,523,423 B2 | 12/2019 | Lim et al. |
| 10,592,683 B1 | 3/2020 | Lim et al. |
| 11,042,955 B2 | 6/2021 | Lim et al. |
| 11,347,880 B1 | 5/2022 | Lim et al. |
| 2011/0313981 A1 | 12/2011 | Ben-Natan |
| 2013/0104191 A1 * | 4/2013 | Peled ................... G06Q 50/265 |
| | | 726/1 |
| 2014/0012833 A1 | 1/2014 | Humprecht |
| 2017/0104756 A1 | 4/2017 | Rosenthal et al. |
| 2018/0131726 A1 | 5/2018 | Arumugam et al. |
| 2019/0005265 A1 | 1/2019 | Panchapakesan et al. |
| 2019/0166129 A1 * | 5/2019 | Gaetjen ................... H04L 9/321 |
| 2021/0248237 A1 * | 8/2021 | Reich ................... G06F 21/566 |

* cited by examiner

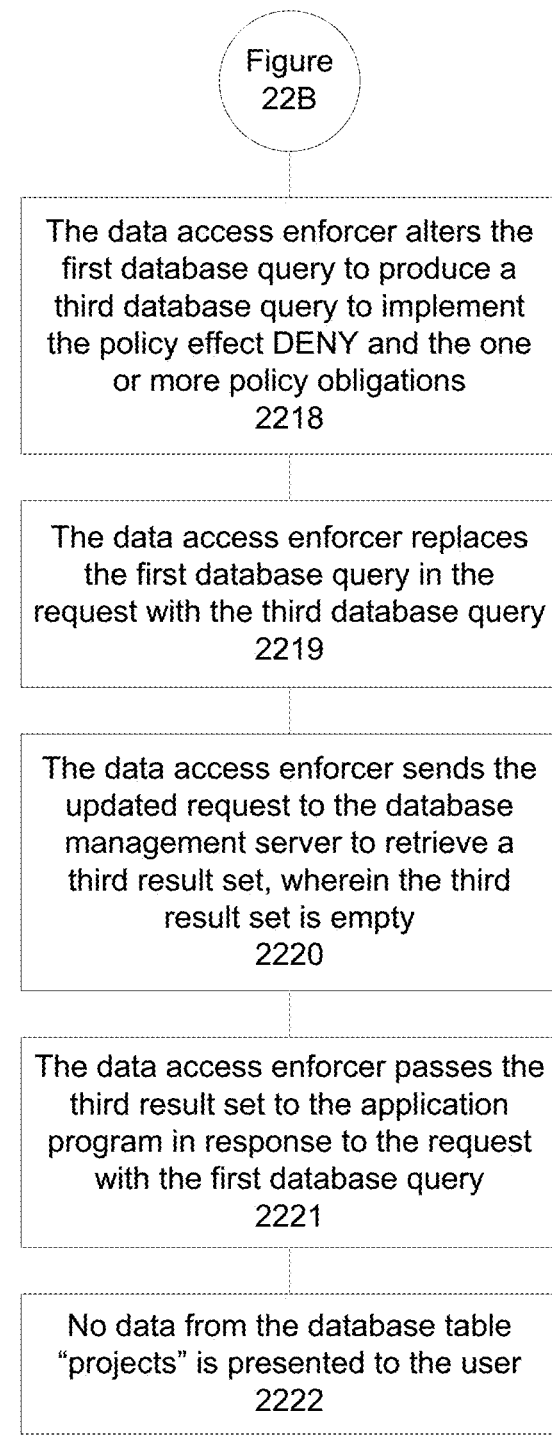

ENFORCING DATA ACCESS POLICIES IN A REVERSE PROXY

CROSS-REFERENCE TO RELATED APPLICATIONS

This patent application claims the benefit of U.S. patent application 63/366,986, filed Jun. 24, 2022, which is incorporated by reference along with all other references cited in this application.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to the field of software and data protection, and more specifically, to filter, mask, redact, or encrypt data when it is retrieved from a database in an information management system and block unauthorized database operations.

The software stack of a typically application that accesses a database includes an application component and a database component. To protect privacy and confidentiality and prevent data leak, logic to guard confidential and sensitive data from unauthorized access and misuse is often implemented in both the application component and the database component. The security logic that may be implemented in the application component or the database component is constraint by the contextual information available to the component. This security model is unreliable and limiting because security logic is scattered. For example, it is often not possible for a database component to limit data retrieved by a specific user who is currently logged on to an application component because the database component is unaware of the specific user. In another example, a coding error in an application component may expose data to a user who is not authorized to view the data, but it is difficult to ensure there is no coding error in the application component. At times, a minor code change may introduce a new error that is not caught by testing.

Therefore, there is a need for improved software, especially for data protection and to filter, mask, redact, or encrypt data when it is retrieved from a database in an information management system and block unauthorized database operations.

BRIEF SUMMARY OF THE INVENTION

A method and system of masking, redacting, filtering, and encrypting data retrieved from or stored into a database using policies in an information management system. The system includes application, data protection, and database components. A data protection component is placed between an application component and a database component to provide protection to data in a database by applying data access policies to requests sent from the application component to the database component.

It is desirable to have an additional layer of security logic placed between the application component and the database component, and this layer of security logic may be managed by a data security specialist separated from the management of the application component or the database component.

This three-layer security model offers many benefits. First, the security logic provides additional protection to the data in the database component. Errors in the application component may be caught and corrected in the security logic. Second, the security logic may collect information from different sources to provide a broader context, allowing it to enforce data access policies that may not be enforceable in the application component or the database component. Third, the security logic may be managed by data security professionals with sole focus on protecting privacy and confidentiality and preventing data leak. When the three-layer security model is implemented on a plurality of software stacks, data access policies may be enforced consistently across an organization.

In an implementation, a method includes: providing a database component in a software stack, where the database component manages a relational database, where the relational database having tables, where each table having a rows and columns; providing an application component in the software stack, where the application component has access to data in the tables, where the application component retrieves data in the tables via a database query; providing a data protection component in the software stack, where the data protection component controls access to the data in the tables according to data access policies, where a database query sent by the application component passes through the data protection component before the database query reaches the database component; at the application component, sending a first database query to the database component to retrieve a first result set, where the identity of a user who shall view the data in the first result set is sent along with the first database query; at the data protection component, intercepting the first database query before the first database query reaches the database component; at the data protection component, collecting contextual information to support evaluation of the data access policies, where a subset of the contextual information is collected from the application component; at the data protection component, obtaining an instruction for altering the first database query according to the data access policies and contextual information, where the instruction can include a policy obligation; at the data protection component, altering the first database query to produce a second database query according to the instruction; at the data protection component, sending the second database query to the database component to retrieve a second result set, where the first database query is not sent to the database component; and at the data protection component, passing the second result set to the application component in response to the first database query.

In a further implementation, a method includes: providing a database management server, where the database management server manages a relational database, where the relational database having tables, where each table having rows and columns; providing an application program having access to data in the tables, where the application program retrieves data in the tables via a database query; providing a database client interface facilitating communication between the application program and the database management server, where the application program sends database queries to the database management server through the database client interface; providing a policy engine having data access policies, where the data access policies controls access to the data in the tables; providing a data access enforcer capable of intercepting database queries passing through the database client interface; at the application program, sending a first database query through the database client interface to the database management server to retrieve a first result set, where the identity of a user who shall view the data in the first result set is sent along with the first database query; at the data access enforcer, intercepting the first database query before the first database query reaches the database management server; at the data access enforcer, collecting contextual information to support evaluation of the data access policies, where a subset of the contextual information is collected from the application program; at the data access enforcer, obtaining a decision on whether the first database query is allowed from the policy engine; at the data access enforcer, altering the first database query to produce a second database query to implement the decision; at the data access enforcer, sending the second database query using the database client interface to the database management server to retrieve a second result set, where the first database query is not sent to the database management server; and at the data access enforcer, passing the second result set to the application program in response to the first database query.

In a further implementation, a method includes: providing a database management server, where the database management server manages a relational database, where the relational database having tables, where each table having rows and columns; providing an application program having access to data in the tables, where the application program retrieves data in the tables via a database query; providing a database client interface facilitating communication between the application program and the database management server, where the application program sends database queries to the database management server through the database client interface; providing a policy engine having data access policies, where the data access policies controls access to the data in the tables; providing a data access enforcer capable of intercepting database queries passing through the database client interface; at the application program, sending a first database query through the database client interface to the database management server to retrieve a first result set; at the data access enforcer, intercepting the first database query before the first database query reaches the database management server; at the data access enforcer, collecting contextual information to support evaluation of the data access policies, where a subset of the contextual information is collected from the application program; at the data access enforcer, obtaining a decision on whether the first database query is allowed from the policy engine; at the data access enforcer, altering the first database query to produce a second database query to implement the decision; at the data access enforcer, sending the second database query using the database client interface to the database management server to retrieve a second result set, where the first database query is not sent to the database management server; and at the data access enforcer, passing the second result set to the application program in response to the first database query.

In a further implementation, a method includes: providing a database management server, where the database management server manages a relational database, where the relational database having tables, where each table having rows and columns; providing an application program having access to data in the tables, where the application program retrieves data in the tables via a database query; providing a policy engine having data access policies, where the data access policies controls access to the data in the tables; providing a data access enforcer capable of intercepting database queries before the database queries reach the database management server; at the application program, sending a first database query to the database management server to retrieve a first result set, where the identity of a user who shall view the data in the first result set is sent along with the first database query; at the data access enforcer, intercepting the first database query before the first database query is processed by the database management server; at the data access enforcer, collecting contextual information to support evaluation of the data access policies; at the data access enforcer, obtaining a decision on whether the first database query is allowed from the policy engine, where the decision includes a policy obligation; at the data access enforcer, altering the first database query to produce a second database query to implement the decision; at the data access enforcer, sending the second database query to the database management server to retrieve a second result set, where the first database query is not sent to the database management server; and at the data access enforcer, passing the second result set to the application program in response to the first database query.

A software stack contains three layers: application component, data protection component and database component. The data protection component is a data access enforcer that dynamically alters a SQL statement. The claim is designed to generalize deployment location of data access enforcer to anywhere between an application program and a database to cover client-side, server-side, and gateway deployment.

Client-side deployment includes intercepting database requests at ODBC, JDBC, ADO.NET Oracle OCI and SAP HDB Client. These database client access libraries and the like can be referred to as a Database Client Interface. The mirror component on the database server side can be referred to as a Database Client Interface Handler.

Data access policies are described that are different from access or use control policies or rights control policies. Data access policies focus on altering SQL statements using policy obligations. Access or use control policies focus on controlling access and use. Rights control policies focus on controlling use through rights.

An application user or identity can be used in a policy. An implementation includes one or both user identity awareness and policy obligation. An implementation can include policy obligation and omit user identity. An implementation does not include one or both policy obligation or user identity. An implementation does not include user identity awareness.

Server-side enforcement includes intercepting database requests at database server network interface such as Microsoft/Sybase TDS or Oracle OCI. Intercepting at a database server includes intercepting database requests from client computers (e.g., all or every client computer connected to the server). The system performs the function of a reverse proxy.

Gateway deployment includes having another computer or process sitting in the middle. Application programs need to redirect database requests to the gateway and a data access enforcer in the gateway does the enforcement. Database requests may use Microsoft/Sybase TDS, Oracle OCI, HTTP/REST, or SOAP protocol. A gateway is also a reverse proxy. Therefore, an implementation includes server-side and gateway deployments.

Gateway deployment may be preferred in a production environment over server-side deployment because a database server is locked down normally.

Gateway deployment is a viable option (or in some instances, the only option available) for cloud databases because the databases that are owned and managed by database providers like Amazon or Google.

Data access policies are different from access or use control policies or rights control policies. Data access policies focus on altering SQL statements using policy obligations. Access or use control policies focus on controlling access and use. Rights control policies focus on controlling use through rights.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 22A-22C show a flow diagram of a data access enforcer on a gateway computer enforcing data access policies that filter out data in a result set produced by a database management server Google BigQuery™.

DETAILED DESCRIPTION OF THE INVENTION

Figure 1:
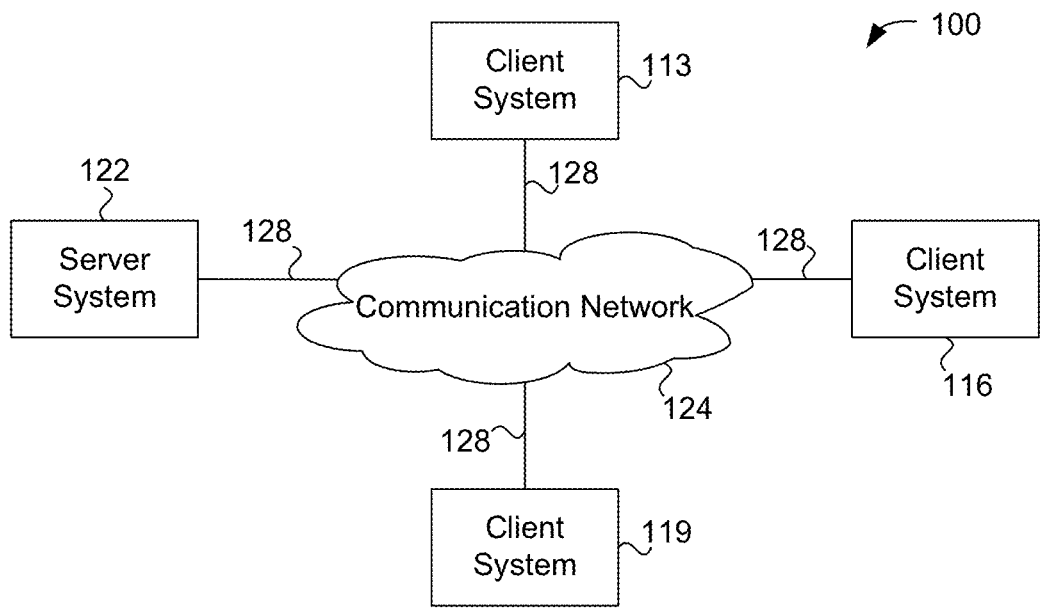
FIG. 1 shows a simplified block diagram of a distributed computer network and clients.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, vendor-specific protocols, customized protocols, or others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer and Edge browsers by Microsoft Corporation, the Firefox® browser by Mozilla Foundation, the Chrome browser by Google Inc., the Safari browser by Apple Inc., or others.

Figure 2:
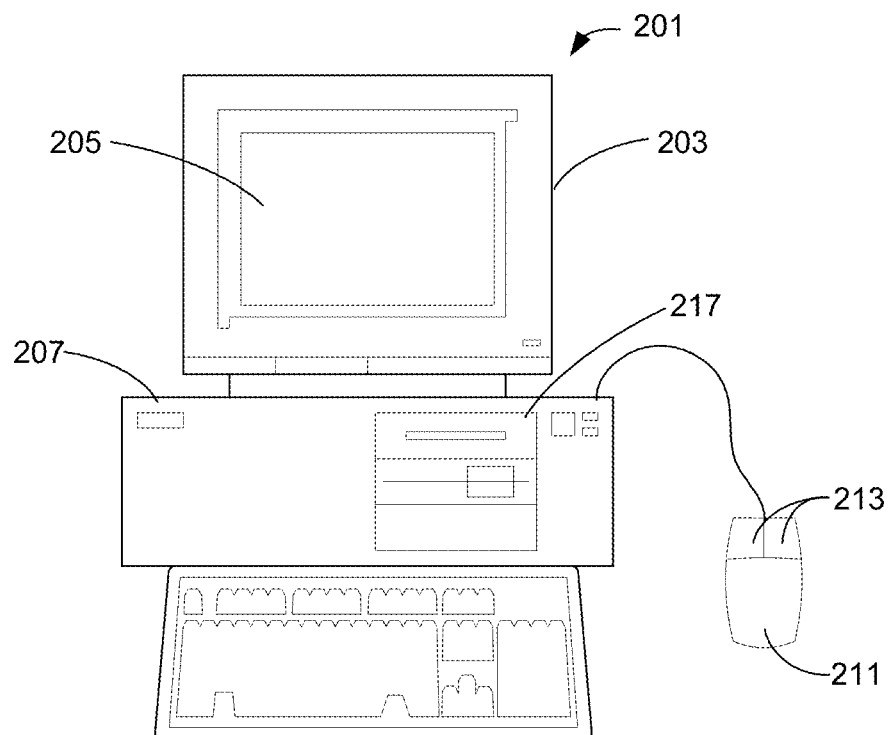
FIG. 2 shows a more detailed diagram of a computer system which may be a client or server.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media may also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
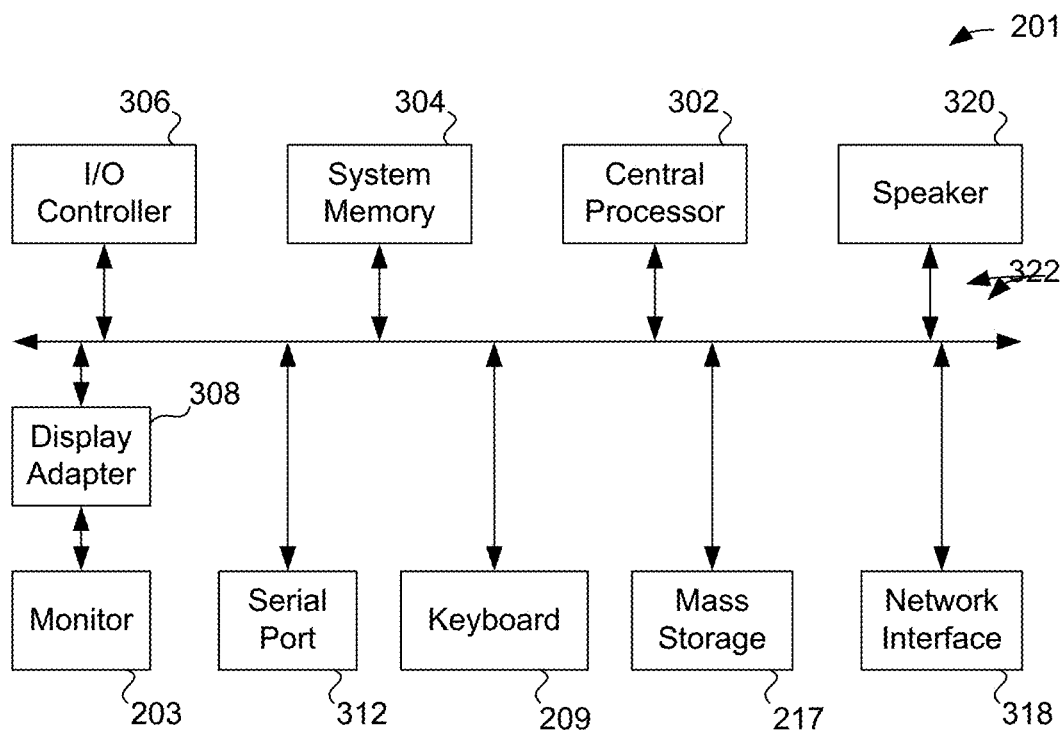
FIG. 3 shows a system block diagram of computer system.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64 X2 Dual-Core, AMD Phenom™, or Microsoft Xbox 360 central processing unit (CPU).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is an example of a computer system suitable for use with the present invention. Other configurations of subsystems suitable for use with the present invention shall be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Oracle®) or Enterprise Java Beans (EJB from Oracle®). An operating system for the system may be one of the Microsoft Windows® family of operating systems (e.g., Windows 95, 98, Me, Windows NT, Windows 2000, Windows XP, Windows Vista, Windows 7, Windows 8, Windows 10, Windows 11, Windows CE, Windows Mobile), Linux, UNIX, Sun OS, Ubuntu, or Macintosh OS X. Other operating systems may be used. Microsoft Windows is a trademark of Microsoft Corporation.

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Figure 4:
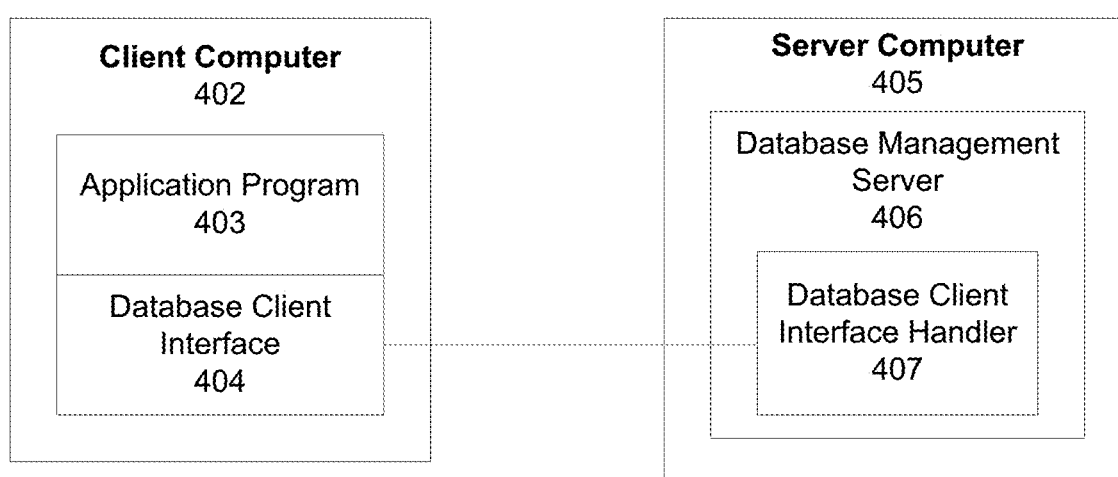
FIG. 4 shows a functional block diagram of a client-server deployment of an application program and a database management server.

FIG. 4 shows a functional block diagram 401 of a client-server deployment of an application program 403 and a database management server 406. The application program is running on a client computer 402 and the database management server is running on a server computer 405. The application program sends a request through a database client interface 404 on the client computer to retrieve data from the database management server. The request is received by a database client interface handler 407 of the database management server.

The client computer and the server computer may be physical computers, virtual machines, containers, other physical or virtual computing environment, or any combination thereof. The client computer and the server computer each may comprise a single computer, a computing cluster, a cloud computing platform, or other computing resource. The client computer and the server computer may be connected through a local area network, a wide area network, the Internet, or other data network.

The application program submits (or sends) requests to the database management server periodically. The application program may be a software that is used by a single user or it may be a software that supports many users. Examples of single user software that queries databases include Microsoft Excel®, DbVis Software AB DbVisualizer™, Microsoft Power BI® Desktop, Quest Software Inc. Toad®, or many others. Examples of software that supports many users and queries databases include SAP C/4HANA®, SAP ERP Central Component®, Microsoft Dynamics®, or many bothers.

The database management server is a software that manages one or more databases. The application program may query the one or more databases by submitting requests through a database client interface. Examples of database management servers include Microsoft SQL Server®, Oracle® database, Oracle MySQL®, SAP HANA®, IBM DB2®, Google BigQuery™, Amazon Aurora®, PostgreSQL®, or many others.

The database client interface (sometimes referred to as database client access library) may be a software library, a proxy, an integrated component of the application program, or others. The database client interface may run on the same computing device as the application program or on a different computing device. Examples of database client interfaces include Open Database Connectivity, Java Database Connectivity, Microsoft® ADO.NET, Oracle® Call Interface, IBM® Db2 Call Level Interface, SAP® HANA Client, SAP® database client interface library, or many others.

Open Database Connectivity (ODBC) is a standard application program interface (API) for accessing database management systems. ODBC interfaces with database management systems through ODBC drivers that are loaded by an ODBC manager. To access data in a database managed by a database management server, an application program calls one or more ODBC API functions to submit a SQL statement to the database management server to get a result set. A result set is similar to a database table and it comprises of rows and columns.

Java Database Connectivity (JDBC) is an application programming interface for the programming language Java® and it is a part of the Java Standard Edition runtime environment. JDBC consists of a collection of class libraries which provide methods to query and update relational databases. JDBC supports different database connectivity through JDBC drivers. A JDBC driver manager handles connectivity requests from application programs and loads JDBC drivers.

Oracle® Call Interface is an application programming interface that lets applications to use function calls to access an Oracle® database and control all phases of SQL statement execution and data access.

The database client interface and the database client interface handler communicate using a standard or propriety application layer protocol or messaging protocol. Examples of application layer protocols include Microsoft® or Sybase® Tabular Data Stream (TDS), Hypertext Transfer Protocol (HTTP), Hypertext Transfer Protocol Secure (HTTPS), or many bothers. Examples of messaging protocols include SOAP, or others.

The application program shall establish a connection with the database management server before the application program may retrieve data from the database management server. To establish a connection, the application program may submit a connection string, a username and a password through the database client interface. The connection string specifies the name or address of the server computer along with a port number. The connection string may include additional parameters. The username and password identify a user who is authorized to access the database management server. The user shall be referred to as database user in this document.

Once the application program establishes a connection with the database management server, the application program may submit (or send) database queries to the database management server to retrieve data. A database query may be expressed in a declarative query language. Examples of declarative query languages include SQL (published under International Standard ISO/IEC 9075:1992), its subsequent updates, other SQL variants (e.g., Oracle® PL/SQL, Sybase® Transact-SQL, or SAP® HANA HDBSQL), or others.

The most common database operation is retrieving data from one or more tables in a database. In SQL, this operation is specified using a SELECT statement. The general syntax of a SELECT statement is:

```
# <comment>
SELECT <columns>
FROM <table>
WHERE <predicate on rows>
GROUP BY <columns>
HAVING <predicate on groups>
ORDER BY <columns>;
```

A "#" character in a SQL statement denotes the start of a comment in this document and the comment extends to the end of current line. Detailed specification of SQL syntax may be found in the International Standard ISO/IEC 9075: 1992 document. The following is an example SQL statement for retrieving sales data:

```
SELECT customerId, customerName, orderNumber, orderDate, amount
FROM orders
WHERE region = "North America"
    AND (orderDate >= 2021-01-01 AND orderDate < 2021-04-01)
ORDER BY customerId, orderDate;
```

The database management server produces a result set on successful execution of a data retrieval database query (e.g., a SELECT statement). A result set comprises zero or more rows and one or more columns of data.

An aspect of the invention is an information management system employs a plurality of policies to protect information or documents from unauthorized access or misuse, protect privacy and confidentiality of information or document content and prevent data leak.

In an embodiment, an information management system employs a plurality of policies, a policy server, a plurality of policy engines, a plurality of data protection clients, a plurality of container service modules, a plurality of encryption service modules, or any combination thereof to protect information or documents.

The plurality of policies comprises at least one of data access policies, access or use control policies, rights control policies, or other policies that control access or use of information or documents, protect privacy and confidentiality of information and prevent data leak.

A data access policy protects access to data in a database and it is applied to protect privacy and confidentiality and prevent data leak. Examples of protecting privacy include not displaying a customer's age, a patient's health condition, a person's sexual orientation, data protected by privacy laws, or others to a non-privileged (or unauthorized) user. Examples of privacy laws include Health Insurance Portability and Accountability Act (HIPPA), General Data Protection Regulation (GDPR), or others. Examples of protecting confidentiality including not displaying the amount on a contract that shall stay confidential, sales data of a company, design data that is a company's secret, data covered by the laws that must stay confidential (e.g., security laws, or legal judgments), data that a company is contractually obliged to keep secret, or others to a non-privileged (or unauthorized) user. Examples of preventing data leak include preventing unauthorized access to data by personnel internal or external to an organization that may be caused by an error, a malicious hack, or others. Data access policies are described in detail further below.

An access or use control policy controls access to and use of information or documents, and it is applied to prevent unauthorized access to information or documents and provide continue protection while information or documents is being processed by an application program. Examples of application programs in the context of access or use control policy include word processors, spreadsheets, presentation programs, document viewers, web browsers, e-mail clients, instant messengers, or many others. Access or use control policies are described in detail in U.S. patent application Ser. No. 11/615,477, filed Dec. 22, 2006, and other U.S. patent applications listed in this application and incorporated by reference.

A rights control policy protects documents, and it is applied to control use of document content and prevent misuse based on rights. Rights control policies are described in detail in U.S. patent application Ser. No. 15/268,155, filed Sep. 16, 2016, and other U.S. patent applications listed in this application and incorporated by reference.

The plurality of data protection clients comprises at least one of data access enforcers, policy enforcers, rights management clients, rights managed applications, content access governors, or other modules or application programs that perform the function of a data protection client. Data protection client is described in detail in U.S. patent application Ser. No. 15/268,155, filed Sep. 16, 2016, and other U.S. patent applications listed in this application and incorporated by reference.

Further, this patent application incorporates by reference U.S. patent applications 60/755,019, filed Dec. 29, 2005, 60/776,036, filed Dec. 29, 2005, 60/743,121, filed Jan. 11, 2006, 60/821,050, filed Aug. 1, 2006, 60/870,195, filed Dec. 15, 2006, 61/357,016, filed Jun. 21, 2010, 61/368,408, filed Jul. 28, 2010, 61/471,682, filed Apr. 4, 2011, 62/220,104, filed Sep. 17, 2015, 62/238,009, filed Oct. 6, 2015, 62/240,391, filed Oct. 11, 2015, 62/344,557, filed Jun. 2, 2016, 62/365,886, filed Jul. 22, 2016, 62/373,319, filed Aug. 10, 2016, Ser. No. 11/383,159, filed May 12, 2006, Ser. No. 11/383,161, filed May 12, 2006, Ser. No. 11/383,164, filed May 12, 2006, Ser. No. 11/615,477, filed Dec. 22, 2006, Ser. No. 13/165,730, filed Jun. 21, 2011, Ser. No. 13/193,588, filed Jul. 28, 2011, Ser. No. 13/439,827, filed Apr. 4, 2012, Ser. No. 15/268,155, filed Sep. 16, 2016, Ser. No. 15/291,653, filed Oct. 12, 2016, Ser. No. 15/482,655, filed Apr. 7, 2017 and Ser. No. 15/673,338, filed on Aug. 9, 2017, and Ser. No. 18/332,671, filed Jun. 9, 2023.

A data access enforcer is a specific implementation of the data protection client and it enforces data access polices on requests sent from an application program to a database management server. Data access enforcer is described in detail further below.

A policy enforcer is a specific implementation of the data protection client and it enforces access or use control policies on information or documents when the information or documents are being accessed (e.g., loading a webpage, or opening a document) or being used (e.g., copying content of a webpage to clipboard, printing a documenting, or making a copy of a document). A policy enforcer may be deployed to protect a wide range of information or documents accessible from a desktop or laptop computer. A policy enforcer is a software module or computer code executing on a computer that is used to protect information or documents by controlling access to, use of, or rights to the information or documents. Some example operations a policy enforcer controls are whether to allow: open operations (e.g., whether a user may open a document with Microsoft® Word), edit operation (e.g., whether a user may copy from one document into another document, or whether a user may modify an e-mail's text), or many others. Policy enforcer is described in detail in U.S. patent application Ser. No. 11/383,159, filed May 12, 2006, Ser. No. 11/615,477, filed Dec. 22, 2006, Ser. No. 13/193,588, filed Jul. 28, 2011, Ser. No. 15/268,155, filed Sep. 16, 2016, and other U.S. patent applications listed in this application and incorporated by reference.

On the other hand, if the objective is to protect copying of high-value documents such as Microsoft® Office documents or Adobe® PDF documents, a rights management client may be deployed. A rights management client is a specific implementation of the data protection client that enforces rights control policies. A rights management client enforces rights control policies on documents when a document is being accessed (e.g., enforcing view right) or being used (e.g., enforcing print or copy rights) by an application program (e.g., Microsoft® Word, or Adobe Reader®). The document may be encrypted. Rights management client is described in detail in U.S. patent application Ser. No. 15/268,155, filed Sep. 16, 2016, and other U.S. patent applications listed in this application and incorporated by reference.

A rights managed application is an application program that implements the information or document protection functionality of a data protection client. A rights managed application enforces rights control policies on a document when the document is being accessed (e.g., enforcing view right) or being used (e.g., enforcing print or copy rights) by the rights managed application. Rights managed application is described in detail in U.S. patent application Ser. No. 15/291,653, filed Oct. 12, 2016, which is incorporated by reference.

A content access governor provides policy decision to an application server (e.g., secured viewing server) when a user attempts to access information or a document on an application server. A content access governor implements the information or document protection functionality of a data protection client except that of a PEP. Optionally, a content access governor provides a plurality of rights to an application server on information or a document being accessed. A content access governor may also provide an encryption key to a container manager to encrypt or decrypt information or a document. Content access governor is described in detail in U.S. patent application Ser. No. 15/291,653, filed Oct. 12, 2016, which is incorporated by reference.

A managed document container (sometimes referred to as a protected document) is a file or data object that stores information or a document to be protected and metadata used by a data protection client to protect the information or document. A managed document container may also store metadata not used by a data protection client. Examples of metadata include attributes, keywords, lineage, discretionary policies, access and use history, or many others.

A container service module provides access to content of documents in managed document containers to application programs. A container service module makes access to content of a document in a managed document container transparent to an application program thereby an application program may access content of a document without being aware of the document being stored in a managed document container. With a container service module, an application program does not need to be altered to access a document stored in a managed document container. A container service module also provides access to metadata in a managed document container to a data protection client. Container service module is described in detail in U.S. patent application Ser. No. 15/268,155, filed Sep. 16, 2016, and U.S. patent applications listed in this application and incorporated by reference.

An encryption service module provides unencrypted content of protected documents to application programs or encrypts unencrypted content before storing it in protected documents. An encryption service module encrypts a document or decrypts an encrypted document independent of an application program, thereby encryption and decryption are transparent to an application program that accesses the document. An encryption service module also performs the functions of a container service module. An encryption service module does not perform access control decision or enforcement on a document. All access control decisions and enforcements on a document are performed by a data protection client. Encryption service module is described in detail in U.S. patent application Ser. No. 15/268,155, filed Sep. 16, 2016, and other U.S. patent applications listed in this application and incorporated by reference.

A policy server manages a plurality of policies and distributes the plurality of policies or subsets of it to the plurality of data protection clients. Policy server is described in detail further below.

A policy engine (also referred to as policy decision point) evaluates a plurality of policies or subsets of it to produce a policy effect (also referred to as decision, or policy decision; e.g., allowed or deny) and optionally, one or more policy obligations (also referred to as obligations, obligation tasks, or instructions). The decision and policy obligations (if any) are implemented by a data protection client. Policy engine is described in detail further below.

Information includes data in a relational database, data in an enterprise resource planning (ERP) system, data in a product lifecycle management (PLM) system, data in a collaboration system such as Microsoft SharePoint®, data on a Web server, data delivered to a SAP® client application (e.g., information about an employee) by a SAP® human resource module running on a server, or others.

A document encompasses objects such as a file, compound document, e-mail message, web page, on-line report, on-line form, discussion thread, result set generated by a database query, bitmap, file system object, data object attached to an e-mail message, data object managed by a document management system, data object managed by a content management server, data object in a product lifecycle management system, source code file or code fragment managed by a source code management system, data object managed by a configuration management system, data object managed by a project management system, data object in an enterprise resource planning system, data object in a customer relationship management system, data object managed or served, or both by a portal server, data object served by a Web server, data object managed or served by any application server, or any unit of information content stored using volatile or nonvolatile memory.

A document may be a file system or non-file system object. A document may be stored in memory or a disk of a computing device, removable storage device, document repository, database, another document, document archive, or more. If a document is a file, the file may be stored on a disk or memory of a computing device, file server, database, document management system, intranet or Internet file store, cloud storage, removable hard disk or flash drive, CD-ROM, DVD, or others.

A computing device may include an application server, database server, file server, desktop computer, laptop computer, tablet computer, smartphone, information kiosk, augmented reality system, game console, navigation system, or others.

In a specific embodiment, an information management system employs a plurality of data access policies, a policy server, a policy engine, and a data access enforcer to protect access to data in a database. Protecting access to data in a database include keeping private data private, preventing unauthorized access to sensitive or confidential data, or prevent unintentional leakage of data to unauthorized users.

An aspect of the invention is a policy language for the information management system that includes policies and policy abstractions. Policies may also be referred to as rules or policy object, and policy abstractions may also be referred to as abstractions, abstraction objects or variables. There may be any number of policies, policies abstractions, or both. Typically, an information management system shall have hundreds, thousands, millions, or greater number of policies. Because many policies are typically used to manage information in a company effectively, policy abstractions may be used to simplify maintenance of the policies and there should be a system to effectively managing policies and policy abstractions.

In an embodiment, a policy object may comprise of a set of predefined building blocks (or abstraction objects) strung together according to a precise syntax. Because the abstraction objects are often logical representation of specific physical entities, policy objects constructed based on the abstraction objects also possess great flexibility in covering activities (or actions) and entities in the physical network with little regard to how the activities and entities change and evolve over time.

In an embodiment, a policy (or rule) includes an expression. A premise may be an expression or statement. More specifically, a premise may contain an expression, and an expression may be a statement. An expression may be "a=true and b=c." An expression may also include a comma delimited list. For example, one may check whether an action is one of the actions listed in a comma delimited list. A statement may be "FOR expression ON expression BY expression WHERE expression DO statement," or any non-logical or mathematical expression. A statement includes expressions, potentially multiple expressions, each of which may be nested. A statement may also include nested statements.

policy:=premise+ consequence+directives

A premise generally refers to terms such as events, resources, subjects, context, policy abstractions and directives. Not all of the terms in a premise are required. A premise is sometimes called a condition or predicate. A premise may be a simple Boolean expression that evaluates to true or false at run time, a simple statement with at least one expression, or a complex statement composes of multiple parts, each part consists of nested statements or subexpressions, and more. Any one of the above terms may appear one or more time in an expression, a subexpression, or a statement. Each term may also appear in more than one expression, subexpression, or statement within the premise. A consequence generally refers to an effect (or policy effect, or decision), obligation tasks (or policy obligation), remediation tasks, or any combination of these. For a policy that prevents data leak or protect privacy and confidentiality, an effect may be optional, and obligation tasks specify how a database query should be alerted to guard against data leak and address privacy and confidentiality concerns. For a policy that implements control function, an effect is required, but obligation tasks and remediation tasks are optional. In a policy that does not implement control function, an effect is optional. A policy may contain any number of directives to assist in policy deployment, affect policy evaluation, or carry an instruction or instructions (e.g., message payload) that influences any one of the stages in a policy lifecycle.

A policy is sometimes referred to as an attribute-based policy when its premise is expressed using a collection of object attributes. The objects where their attributes are used to compose a policy include resources, events, subjects, context, or others. A policy may be specified using attributes from one or more objects. Examples of resources include files, email messages, application programs, computing devices, tables in a database, columns in a database table, or others. Examples of events include opening a file, sending an email, copying content to clipboard, a select database operation, an insert database operation, an update database operation, or others. Examples of subjects include current user who has logged on to a computer, a user who has logged on to an application program that trigged an event, or others. Examples of context include locations, time, application programs, computing devices, databases, database tables, data in a column in a database table, or others.

In an embodiment of the invention, the policies or rules are decoupled from the physical resources using policy abstractions. For example, the following is a policy that says legal documents may only be viewed by legal team. "Legal-Docs" is an abstraction object which is specified separately from the policy. One abstraction may apply to more than one policy.

```
FOR Legal-Docs
ON OPEN
BY Legal-Team
DO ALLOW OTHERS DENY
```

For the above example, both Legal-Docs and Legal-Team are abstractions in the policy. The exact definition of these abstractions is decoupled from the policy.

A further aspect of the invention is that decoupling of the rules from data protection client (or agents) where the rules or policy abstractions, or both, are evaluated. For example, some rules are relevant to server agents (or data protection clients) while some rules are relevant to client agents. However, user or policy author does not need to know where a rule is applied, the selection (or target binding) process is done automatically. This makes rules management much easier. This also makes supporting different clients and new type of clients easier.

In some implementations, a policy abstraction may include two or more variable definitions. Each variable in the policy abstraction includes a name and a definition. A variable definition may comprise an expression or a statement where the expression or statement may refer to another variable in the policy abstraction or another policy abstraction.

A policy may be defined (or created) independent of a user, information or a document. A data access policy may protect access to data in a database from leaks or make sure privacy and confidentiality is respected. An access or use control policy or a right control policy may control access to or use of a plurality of information or documents. A policy may be defined before a user who is affected by the policy is added to an information management system, yet the policy applies to the user. A policy may be defined in an information management system before information or a document is added or created, yet access to the information or document is controlled by the policy. A new policy may be defined, or an existing policy may be updated after information or a document is created, yet the new or existing policy shall be applied to control access to or use of the information or document once it is deployed. In another word, policies in an information management system are not static, which is unlike how policies work in many digital rights management systems. Policy and policy abstraction including their syntax, applications, deployment and evaluation are described in detail in U.S. patent application Ser. No. 11/615,477, filed Dec. 22, 2006, and U.S. patent applications listed in this application and incorporated by reference.

In an implementation, an information management system enforces centralized policies, discretionary policies, or combination of these to protect information or documents. Centralized policies are policies managed by a policy server and intelligently deployed to a plurality of data protection clients or a plurality of policy engine servers. Centralized policies are typically applied to a wide range of information or documents. Discretionary polices are policies embedded in documents or objects. Discretionary policies are typically applied to a particular document or object. Centralized and discretionary policies are described in detail in U.S. patent application Ser. No. 15/268,155, filed Sep. 16, 2016, which is incorporated by reference.

In an embodiment, a policy language is used to control access or use of information or documents, enforce rights on document content, protect privacy and confidentiality and prevent data leak on data retrieved from databases, and more. A data access policy is a specific implementation of the policy language for protecting privacy and confidentiality and preventing data leak. The policy language syntax of data access policy is:

```
# <comment>
policy := FOR <resource expression>
ON <event expression >
BY <subject expression>
WHERE < context expression >
DO <positive consequence>
OTHERS <negative consequence>
positive consequence := effect AND <obligation tasks>
negative consequence := effect AND <obligation tasks>
```

A "#" character in a policy statement denotes the start of a comment and the comment extends to the end of current line. The premise is comprised of a resource element (or FOR element), an event element (or ON element, or action element), a subject element (or BY element, or user element), and a context element (or WHERE element, or context element). The consequence is comprised of a positive consequence element (or DO element) and a negative consequence element (or OTHERS element). Not all elements in a premise are required. Negative consequence element is optional.

The resource element in the policy language specifies a logical expression (i.e., resource expression) that describes one or more policy abstractions (e.g., "SAP-servers: =server='SAP-AppServer-1' OR server='SAP-AppServer-5'"), application programs, servers, databases, database tables (e.g., "table='server1.dept03db.orders'"), or any combination of these.

The event element specifies a comma separated list of database query operations. The event expression comprises at least one database query operation including select, insert, update, delete, call (i.e., calling stored procedure), or more.

The subject element specifies a comma separated list of users. A user may be the one who is currently logged on to an application program (e.g., SAP C/4HANA®) that initiated current database operation (this user is also referred to as application user). A user may also be the one who is using a desktop computer to access information in a database that initiated current database operation (this user is also referred to as desktop user). A user may also refer to the account that is used to connect to a database (this user is also referred to as database user).

The context element specifies a logical expression (i.e., context expression) comprises of one or more predicates. For example, the context expression may take on the syntax of a WHERE clause in SQL, the international standard.

The positive consequence element includes a positive consequence statement. A positive consequence statement may contain a policy effect (e.g., ALLOW, DENY, query user, custom effect handler, or DELEGATE), optionally one or more obligation tasks (or policy obligations). A positive consequence is adopted during policy evaluation when a policy's premise is evaluated to true.

The negative consequence element includes a negative consequence statement. A negative consequence element has the same structure as the positive consequence statement. A negative consequence is adopted during policy evaluation when a policy's premise is evaluated to false. Negative consequence is optional in a policy.

A typical data access policy specifies an event (e.g., select, insert, update, delete, or call) that corresponds to a database query operation of the same name in SQL. A resource element specifies one or more policy abstractions, application programs, servers, databases, database tables (or tables), or others. A subject element specifies one or more application users, desktop users, database users, or others. A context element specifies one or more predicates (e.g., users.role="supervisor" AND users.department="customer support"). The policy outcome may be ALLOW or DENY, and the policy may specify one or more policy obligations (e.g., filtering policy obligations, masking policy obligations, or blocking policy obligation).

A policy obligation (or obligation task) is a task to be performed by a data protection client or policy engine when a policy specifying the policy obligation is in the subset of policies being evaluated and invocation condition (i.e., premise) of the policy obligation is satisfied. A policy obligation is an optional element of a policy. Policy evaluation may not produce a policy obligation. Examples of policy obligations include: (a) filtering policy obligation (or filtering obligation) that restricts what data may be returned by a database query; (b) masking policy obligation (or masking obligation) that partially or completely redacts the data in a column in a result se; (c) log policy obligation (or log obligation) that logs data to a log server; (d) automatic tagging policy obligation (or automatic tagging obligation) that inserts one or more document attributes into a document or document container; (e) an interactive tagging policy obligation (or interactive tagging obligation) that queries a user to enter one or more document attributes and inserts the one or more document attributes into a document or document container; (f) strip attachment policy obligation (or strip attachment obligation) that removes an attachment from an e-mail message; (g) encryption policy obligation (or encryption obligation) that encrypts a document and saves the encrypted document in a managed document container; (h) security overlay policy obligation (or security overlay obligation) that renders one or more security markers on top of content of a document being displayed; (i) blocking database query policy obligation (or blocking database query obligation) that alters a database query so that executing the altered database query always generates an empty result set; or many more.

A policy obligation in a data access policy may insert one or more guard conditions into a database query. A guard condition may add a boundary that limits the amount of information a database query may return (e.g., WHERE orders.orderDate>=DATEADD(DAY, −30, GETDATE( )). A guard condition may alter a database query to mask (or redact) data in a column of a result set produced by a database query. A guard condition may force a database query to return no data (i.e., zero row in a result set). A guard condition may force a database query to return an error status. The most common data access policy obligations are filtering policy obligation, masking policy obligation and blocking database query policy obligation.

In an implementation of a policy language, the policy language is used to protect access or use of information or documents. A policy specified using the policy language is an access or use control policy. An access or use control policy may be used to permit or block an application program operation access to or use of a resource. A resource includes information or a document described above. The general form of an access or use control policy includes at least one resource, one action (e.g., open or edit), one user, one effect (e.g., ALLOW or DENY) and optionally a context. For example, an access control policy may specify only a user in a group Executive may open a document classified as Financial and Confidential when a computer is connected to a network in the office. A use control policy may specify all users may not send a document classified as "top secret" in an e-mail message. Access or use control policies including their syntax, applications, deployment and evaluation are described in detail in U.S. patent application Ser. No. 11/615,477, filed Dec. 22, 2006, and other U.S. patent applications listed in this application and incorporated by reference.

In an implementation of a policy language, the policy language grants or revokes rights (or digital rights) on information or a document. A policy specified using the policy language is a rights control policy. A rights control policy may be used to grant a right to a resource to a user or revoke a right to a resource granted to a user. A rights control policy is different from an access or use control policy that a rights control policy specifies one or more rights a user may have on a resource, whereas an access or use control policy specifies what actions a user is allowed (or denied) to perform on a resource. Rights control policies and access or use control policies have similar applications—controlling access to or use of a resource.

Unlike an access control policy or use control policy which specifies what policy effect should be enforced when a user takes a particular action on a resource, a rights control policy declares what rights a user has on a resource. Further, an access control policy or use control policy is evaluated to determine what policy effect to enforce when an associated action is intercepted. A rights control policy is evaluated when a user accesses a resource, and the evaluation determines a plurality of rights the user has on the resource. If a user is allowed to access the resource, the plurality of rights is passed to a data protection client so that the plurality of rights may be implemented at the data protection client without further policy evaluation.

The rights in rights control policies and their definitions are specific to an information management system. Examples of rights that may be granted to or revoked from a user include view, edit, copy, extract, convert, print, send, decrypt, annotate, classify, assign, screen capture, or many others. The rights described herein are for illustration purpose only. An information system may enforce a different set of rights using the techniques described in this document. Variations such as naming of a right, adding a new right, deleting an existing right, or modifying definition of an existing right may be accommodated easily. For example, a send right may be modified to enforce uploading of a document to a website; an upload right may be added to enforce uploading of a document to a website; or a copy right may be renamed as a duplicate right. Rights control policies including their syntax, applications, deployment and evaluation are described in detail in U.S. patent application Ser. No. 15/268,155, filed Sep. 16, 2016, which is incorporated by reference.

An information management system may employ one type of policies, or it may employ more than one type of policies to protect information or documents.

In an implementation, an information management system employs a plurality of data access policies, a policy server, a policy engine, a data access enforcer to protect access to data in a database. A policy engine may run on the same computer as the data access enforcer. Alternatively, a policy engine server (or external policy engine) separated from the data access enforcer may handle policy evaluation requests from the data access enforcers.

In an implementation, an information management system employs a plurality of access or use control policies, a policy server, and a plurality of policy enforcers to protect information or documents. A policy engine is embedded in each policy enforcer to facilitate policy enforcement.

In an implementation, an information management system employs a plurality of rights control policies, a policy server, a plurality of rights management clients, and a plurality of encryption service modules to control usage of content in protected documents. A policy engine is embedded in each right management client to facilitate policy enforcement.

The policies outlined in this document is specified using a declarative syntax. However, these policies may also be expressed using other syntax or techniques. In an example, policies are composed using a graphical user interface and stored in a file or database. In another example, policies are expressed in XML or JSON format and stored in a file. In yet another example, parameters of policies are stored in a file or database, and a policy engine reconstitutes the policies based on the parameters and evaluates the reconstituted policies, or a policy engine evaluates based on the parameters. Those skilled in the art shall be able to devise methods that are appropriate for a particular implementation based on the teaching in this document.

A policy server manages a plurality of policies and distributes the plurality of policies or subsets of it to a plurality of data protection clients, a plurality of policy engine servers, and any combination thereof. The plurality of policies is stored in a policy database accessible by the policy server. A policy server manages the lifecycle of a policy including create, deploy, edit, redeploy (or update), enable, disable and delete. In one implementation, a policy server provides an authoring tool for creating and editing policies via a web browser.

A policy server may optimize a policy to improve its efficiency or remove a condition not relevant to a particular data protection client. A policy server may translate a policy to a format that is supported by a data protection client.

The plurality of policies is intelligently deployed to the plurality of data protection clients. A policy server has the ability to decide if a single or multiple policies or subset of policies are applicable to a data protection client. The plurality of policies or a subset of the plurality of policies may be distributed to one or more data protection clients. In one implementation, a policy server deploys the plurality of policies to a data protection client or policy engine server. In another implementation, a policy server deploys a subset of the plurality of policies to a data protection client or policy engine server. In yet another implementation, a policy server optimizes a policy before deploying it to a data protection client or policy engine server. Data protection client and policy engine server are described in detail further below.

A policy server stays in contact with a data protection client or policy engine server so the data protection client or policy engine server may receive updated policies from the policy server periodically. In addition, a policy server may also deploy configuration data, data that supports evaluation of policies, software updates, or other data to a data protection client or policy engine server. Policy server, policy deployment, policy optimization and policy translation are described in detail in U.S. patent application Ser. No. 11/615,477, filed Dec. 22, 2006, and other U.S. patent applications listed in this application and incorporated by reference.

A policy engine is an execution unit that processes and executes policies or rules to produce policy decisions (also referred to as policy effects). A policy engine takes the data collected by an interceptor (e.g., including data extracted from a database query) and contextual information and applies policies supplied by a policy server to the data to produce a consequence (also referred to as policy decision).

Contextual information refers to data relevant to evaluating policies which may include the user who is currently logged on to a computer, the user who has logged on to an application program, the user who shall view the data to be returned by a request, the role of a user, the department a user belongs to, the application program that makes a request, the database management server that shall receive a request, the computer where a request originated from, the computer where a request shall be delivered to, historical data from prior interceptions, configuration and environment data, data entered by a user, or some other data.

A consequence may include an effect (also referred to as decision, policy decision, or policy effect in this document; e.g., ALLOW, DENY, evaluate another policy, query user, or call a custom effect handler) and optionally one or more obligation or remediation tasks (obligation tasks are also referred to as policy obligations or obligations). The use of historical data in policy evaluation is optional. As part of a policy evaluation process, a policy engine may decide that it needs to obtain input form a user before it may proceed with or complete policy evaluation. At that time, the policy engine may invoke a user interface element to query the user for input. For example, such input is related to classifying a document (which produces document attribute values) that is required to complete a policy evaluation. A policy engine may also decide that it needs additional information to proceed with or complete policy evaluation. At that time, the policy engine may request additional information from a data source.

In an implementation, a policy engine supports evaluating rights control policies, the policy engine also determines the rights to be granted based on a plurality of policies.

A policy engine optionally performs one or more obligation tasks, performs one or more remediation tasks, invokes a custom effect handler, or a combination of these, if one is defined in a policy.

The implementation of a policy engine is policy system architecture specific.

Depending on what policy system architecture is selected, the implementation of a policy engine may vary significantly. Some examples of policy system architectures include: (a) distributing a full set of centralized policies to a data protection client or policy engine server; (b) distributing a subset of centralized policies to a data protection client or policy engine server; (c) organizing centralized policies based on the type of data protection client the policies target; (d) using centralized policies defined in XACML format; (e) using centralized policies defined in NextLabs Compliant Enterprise Active Control Policy Language™ (ACPL) format that uses a declarative approach to policy specification; or others. More detailed information about the ACPL language may be found in U.S. patent applications 60/870,195, filed Dec. 15, 2006, and Ser. No. 11/615,477, filed Dec. 22, 2006, which are incorporated by reference.

A policy engine may run in a process separate from a data protection client. The policy engine process and data protection client processes may run on the same computer or on separate computers. A policy engine may be integrated into a data protection client or may operate independent of a data protection client. When a policy engine operates independent of a data protection client, the policy engine communicates with the data protection client through a secured communication channel. The secured communication channel may be implemented using standard (e.g., IPSec or HTTPS) or propriety protocol. A policy engine that operates independent of a data protection client may run as a stand-alone policy engine server (or external policy engine) and provides policy decisions and optionally granted rights to one or more data protection clients. A policy engine that operates independent of a data protection client may be an integral part of a policy server. Policy engine is described in detail in U.S. patent application Ser. No. 11/615,477, filed Dec. 22, 2006, and other U.S. patent applications listed in this application and incorporated by reference.

An aspect of the invention is a data protection client that enforces a plurality of polices to protect information or documents from unauthorized access or misuse, protect privacy and confidentiality of information or documents and prevent data leak. Implementations of data protection clients differ depending on their operating environment or types of policies being enforced. For example, a data access enforcer is a specification implementation of data protection client for database operations that enforces data access policies to protect privacy and confidentiality and prevent data leak on database operations. A policy enforcer is a specification implementation of data protection client for desktop and server computers and it enforces access or use control policies to prevent unauthorized access to information or documents and misuse of information or document content. Rights management client and rights managed application are specification implementations of data protection client for digital rights management and they enforce rights control policies and rights assigned to a user on specific information or document content. A content access governor and a secured viewing server together implement the functions of a data protection client and they enforce access or use or rights control policies to extend protection of protected documents to a web browser. An information management system may deploy one or more types of data protection clients to achieve its data protection objectives.

Figure 5:
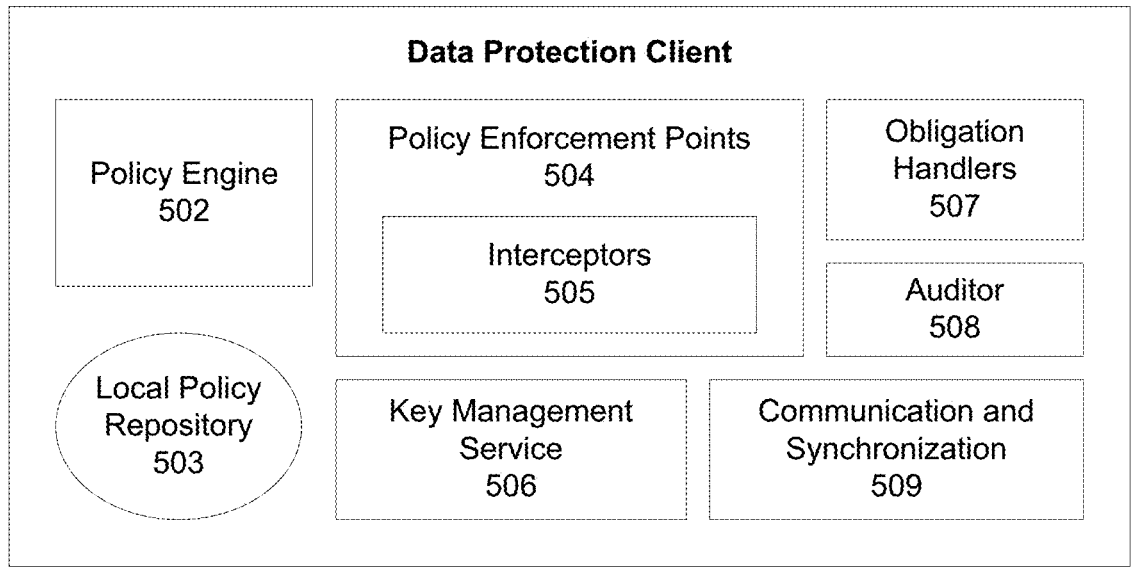
FIG. 5 shows a functional block diagram of a data protection client.

FIG. 5 shows a functional block diagram 501 of a data protection client. A data protection client may have one or more policy enforcement points (PEPs) 504 which intercept application programs, database client interfaces, database client interface handlers, or operating system operations and implement policy effects. A PEP may have one or more interceptors 505. Typically, an interceptor runs in an application program instance (e.g., a process), an operating system kernel, or a standalone server (e.g., as a reverse proxy or gateway). When an interceptor of a PEP intercepts a request (or operation, function call, method call, or message) in an application program, database client interface, database client interface handler or operating system module, the PEP collects (or gathers) contextual information relevant to evaluation of policies. The PEP queries a policy engine 502 with the intercepted request and contextual information for a policy decision (or decision, or policy effect).

Contextual information may include the application program that initiated current intercepted request, the user who is going to view the data returned by current request, the user who is currently logged on to the application program, the role of the user who has logged on to an application program, the department of the user who has logged on to an application program, the location of the user, or many others. The data protection client may obtain some contextual information through a policy context provider.

A policy context provider is a component or code module that retrieves contextual information to support policy evaluation on behalf of a data protection client. A policy context provider may be invoked on each interception, or may be invoked once and the contextual information collected is cached in the data protection client for use in subsequent interceptions. In an implementation, a policy context provider runs in an application program instance (i.e., in the process space of an application program) that initiated the intercepted request. In another implementation, a policy context provider runs in a process separated from the application program that initiated the intercepted request. In yet another implementation, a policy context provider runs in the process of a data protection client. In yet another implementation, a policy context provider and a policy engine run on the same computer and the policy engine requests contextual information from the policy context provider. In yet another implementation, the policy context provider retrieves contextual information from a directory service (e.g., Microsoft Active Directory® or OpenLDAP). A policy context provider is an optional component.

The policy engine 502 selects a first subset of policies from a plurality of policies in a local policy repository 503 that is relevant to the intercepted request and evaluates the first subset of policies to produce a policy decision. The policy decision includes ALLOW or DENY and optionally one or more policy obligations (or obligations). A policy obligation is a task to be carried out by a data protection client and it is an optional element of a policy. If a policy effect is ALLOW, the policy engine returns policy effect ALLOW to the PEP. The PEP implements a policy effect ALLOW by allowing the intercepted request to execute to completion. If a policy effect is DENY, the policy engine returns policy effect DENY to the PEP. The PEP implements a policy effect DENY by blocking the intercepted request.

In an implementation where a data protection client protects access to data in a database, a policy engine may produce a plurality of policy obligations for altering a database query to implement filtering, masking (or redaction) or blocking function.

In an implementation, the plurality of policies in the local policy repository is distributed from a policy server. The local policy repository may function as a policy cache that caches centralized policies from the policy server. In another implementation, the local policy repository is a persistent data store of centralized policies distributed from a policy server and it supports policy evaluation when a connection to the policy server is not available. In yet another implementation, the plurality of policies in the local policy repository is deployed manually.

A key management service (also referred to as encryption key management service) 506 manages encryption keys at a data protection client. Functions of a key management service include encryption key generation, encryption key lookup with a key management server, encryption key caching, encryption key expiration, encryption key revocation, or more. A key management service requests encryption keys from a key management server (also referred to as encryption key management server), caches encryption keys locally and releases encryption keys to an encryption service module. A key management service is an optional component of the data protection client.

The key management service releases an encryption key to an encryption service module only if an application program process that access decrypted information or document may be trusted. To determine if the application program process is to be trusted with decrypted information or document, the key management service checks a policy evaluation cache for a recent policy evaluation on the information or document by a user (i.e., the user that the application program process is running under) where policy effect is ALLOW. If a matching policy evaluation is found, the key management service trusts the application program process with decrypted information or document and releases the encryption key to the encryption service module to decrypt the information or document. Key management service, encryption service module and key management server are described in detail in U.S. patent application Ser. No. 13/193,588, filed Jul. 28, 2010, Ser. No. 15/268,155, filed Sep. 16, 2016, and other U.S. patent applications listed in this application and incorporated by reference.

If the policy decision produces a policy obligation, a corresponding obligation handler is invoked to carry out the policy obligation. A data protection client may implement one or more obligation handlers 507. Obligation handler is an optional component of a data protection client.

In an implementation where a data protection client supports rights enforcement, a policy engine may produce a plurality of rights granted to a user on a resource (e.g., document) and pass the plurality of rights to a PEP when it processes an access query on the resource (e.g., opening a file). By providing a PEP with a plurality of rights granted, a data protection client empowers the PEP to process subsequent interceptions (i.e., covered by the granted rights) based on the plurality of rights granted without querying the policy engine for policy decisions.

In an implementation, a policy engine produces a plurality of rights granted based on the first subset of policies. In another implementation, a policy engine selects a second subset of policies from the plurality of policies in the local policy repository based on the user and the resource and analyzes the second subset of policies to produce the plurality of rights granted. In yet another implementation, a PEP may make an addition query to a policy engine on a plurality of rights of interest to a PEP and the policy engine composes a plurality of rights granted to a user on a resource in response to the query. In yet another implementation, a plurality of rights granted to a user on a resource is composed based on a subset of centralized policies and a plurality of discretionary policies associated with information or a document.

An auditor 508 logs interceptions and policy evaluations at a data protection client. It also gathers additional information on the computing environment that may be used in an audit, performance analysis or diagnosis. An auditor typically caches log data locally so that it may continue to operate while a client computer is offline. Log data is transmitted to a central log server (or report server) when a client computer is online. The log data collected in a log server may be used to analyze information or documents usage pattern, analyze policy effectiveness, identify threats, generate alerts, or produce reports.

A communication and synchronization module 509 is responsible for transmitting policy updates from a policy server to the local policy repository and log data from an auditor to a central log server. A communication and synchronization module may communicate with a policy context provider to obtain contextual information to support policy evaluation.

A data protection client may have several components such as policy engine, local policy repository, policy enforcement point, key management service, obligation handler, auditor, communication and synchronization, combinations of these, or others. The components may run: (a) in a single process; (b) in multiple processes; (c) on a single computing device; (d) on multiple devices; (e) in a process of an application program; (f) in a process separated from the application program; (g) in processes of an application program and separated from the application program; or (h) others. The components may also be deployed in one package or separately in multiple packages.

In an implementation where a data protection client includes the function of making policy decision, the data protection client is also responsible for storing a plurality of centralized policies locally to support policy evaluation and a communication and synchronization module is an optional component of the data protection client.

In an implementation where a data protection client does not include the function of making policy decision, the data protection client is responsible for communicating with a policy engine server (or external policy engine) to obtain policy decisions. The policy engine server and the data protection client run on separate computing devices.

Intercepting information or document access or use operations, enforcing policy decisions and optionally effectuating information or document rights granted are functions of a policy enforcement point. A data protection client may include one or more policy enforcement points.

A data protection client may instrument an application program, a database client interface, a database client interface handler, or an operating system to intercept requests (or operations, function calls, method calls, or messages) using one of application plug-in, code injection, operating system management interface, operating system service provider, device driver, replacing code module, or others. Techniques on instrumenting application program or operating system are described in detail in U.S. patent application Ser. Nos.

11/383,159, 11/383,161, 11/383,164, filed May 12, 2006, Ser. No. 11/615,477, filed Dec. 22, 2006, and other U.S. patent applications listed in this application and incorporated by reference.

In an implementation where a data protection client protects access to data in a database, a data protection client alters a database query before sending the database query to a database management server. Altering the database query includes inserting a condition into the database query to carry out filtering, masking, or blocking operation.

In an implementation where a data protection client protects access to data in a database, a data protection client alters the data produced by a database query before passing the data to an application program. Altering the data includes filtering, masking or blocking operation.

In an embodiment, a data access enforcer is a specific implementation of a data protection client. A data access enforcer protects access to data in a database from leaks and privacy or confidentiality violations. In an example, a data access enforcer filters out (or excludes) rows of data in a result set that a user is not authorized to view. In another example, a data access enforcer masks (or redacts) data in a column in a result set that is private or confidential. In yet another example, a data access enforcer blocks updating of a column in a database table because a user is only allowed to view masked data of the column. In yet another example, a data access enforcer blocks inserting a new row into a database table because a user is only allowed to view masked data of a column in the database table.

Figure 6:
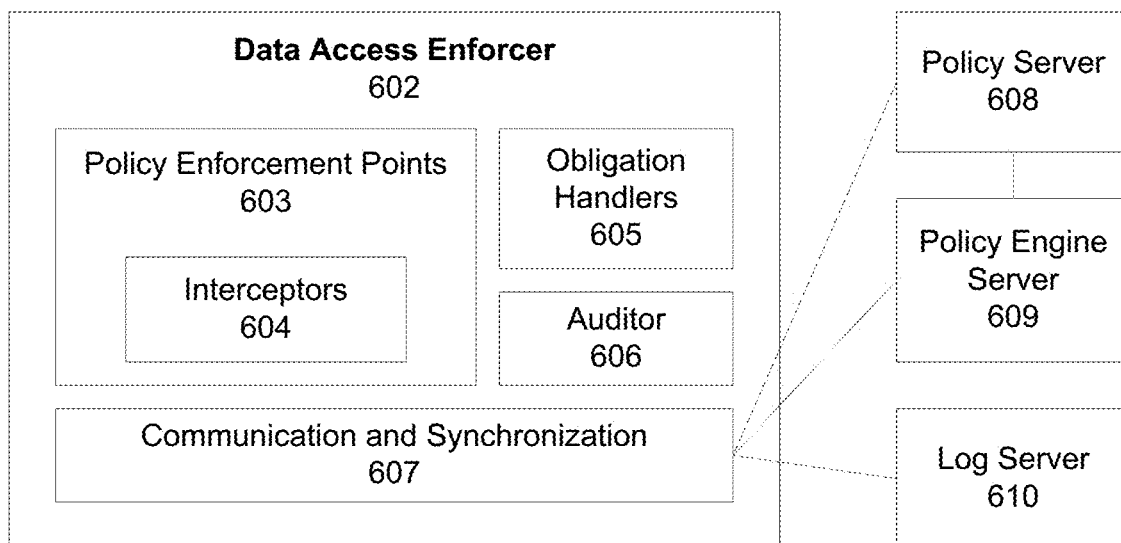
FIG. 6 shows a functional block diagram of a data access enforcer with a policy engine server.
Figure 7:
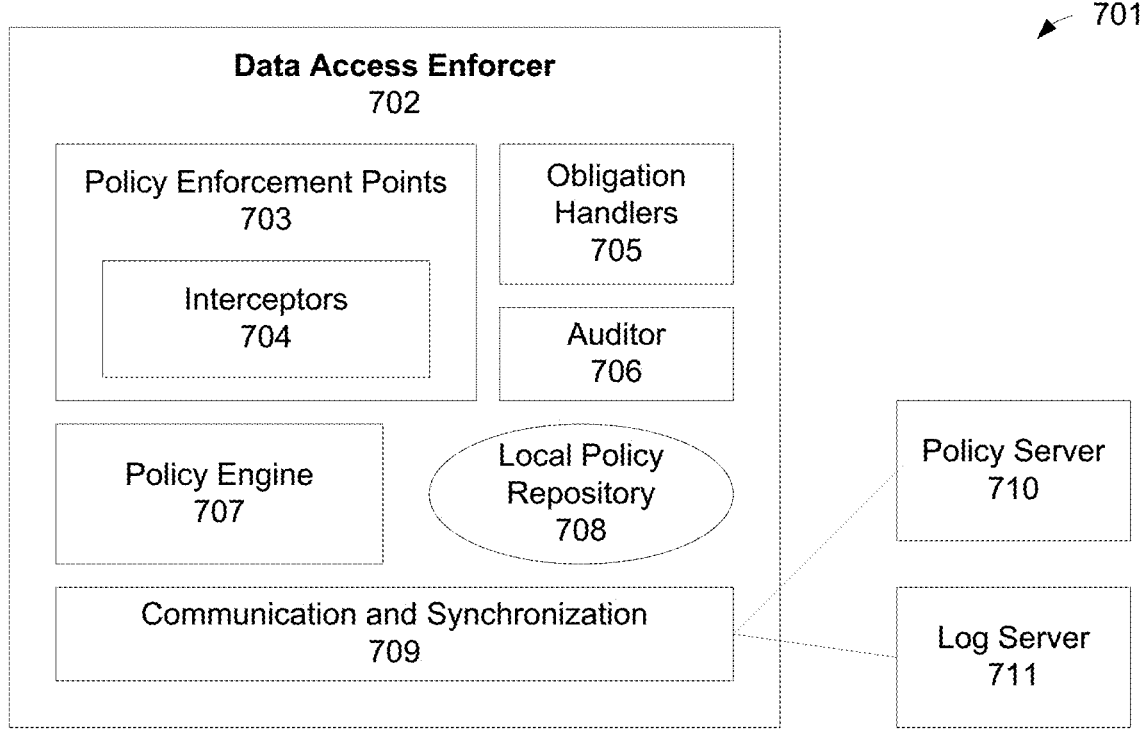
FIG. 7 shows a functional block diagram of a data access enforcer with a local policy engine.

FIGS. 6 and 7 show functional block diagrams of data access enforcers 602 and 702 with a policy engine server 609 and a local policy engine 707 respectively implementing the functionalities of a data protection client 501. A data access enforcer may be deployed on a client computer 402 in a client-server deployment 401 where the data access enforcer enforces data access policies on database operations initiated by an application program running on the client computer. A data access enforcer may be deployed on a server computer 405 in a client-server deployment 401 where the data access enforcer enforces data access policies on database operations initiated by one or more application programs running on one or more client computers, thereby acting as a reverse proxy for a database management server 406. A data access enforcer may be deployed on a gateway computing device 2007 or 2104 in a 3-tier deployment where the data access enforcer enforces data access policies on database operations initiated by one or more application programs 2003 or 2102 running on one or more client computers, thereby acting as a reverse proxy for a database management server 2014 or 2108. Deployment of data access enforcers is discussed in detail further below.

In an implementation, as shown in FIG. 6, a data access enforcer 602 does not perform data access policy evaluation locally. The data access enforcer submits a policy evaluation request to a policy engine server 609 and the policy engine server returns a decision to the data access enforcer. A policy engine server is an application program that provides policy decisions for one or more data access enforcers or data protection clients. In another implementation, as shown in FIG. 7, a data access enforcer 702 having a policy engine 707 and a local policy repository 708 evaluates data access policies locally in the data access enforcer. The policy engine receives a request from policy enforcement points 703 and returns a decision. In both implementations, the decision may include a policy effect and one or more policy obligations, if any, produced during policy evaluation.

Interceptors 604 or 704 of policy enforcement points 603 or 703 are installed to intercept requests sent to a database management server. In an implementation, interceptors are built into an application program. When an interceptor intercepts a request with an unguarded database query (described below) from an application program 403, the policy enforcement point of the interceptor extracts information from the unguarded database query (e.g., database operation, table names, view names, or column names) and collects contextual information (e.g., user identifier, application identifier or computer identifier) that are required to support policy evaluation. The data access enforcer sends the request, the extracted information and the contextual information to a policy engine 609 or 707.

In an implementation, the extracting of information from an unguarded database query is performed in the policy engine. The policy enforcement point sends the request and contextual information to the policy engine. The policy engine extracts information from the unguarded database query in the request (e.g., database operation, table names, view names, or column names) before evaluating data access policies.

Contextual information may include any information relevant to evaluating data access policies. In an implementation, an application program 1003, 1203, 1303, 1703, 1803 or 2003 sends a request to a database management server 1006, 1207, 1306, 1707, 1807 or 2014 with contextual information (e.g., user identifier, application identifier or computer identifier). The request may be sent through an identity-aware database client interface 1004, 1204, 1304, 1704, 1804 or 2004. In another implementation, a data access enforcer requests contextual information from a policy context provider 1104, 1407 or 1504. A policy context provider may be a code module installed in an application program 1103, 1403 or 1503 and run in a process of the application program, and the policy context provider retrieves information stored in the application program on behalf of a data access enforcer. A policy context provider may be a code module that retrieves information from a directory service (e.g., Microsoft Active Directory® or OpenLDAP). A policy context provider may be a utility application program that extracts contextual information from one or more data sources.

An identity-aware database client interface is a type of database client interface 404 that supports passing of contextual information that supports policy evaluation in a request. In an implementation, an Identity-aware JDBC Driver Manager 1204 extends JDBC Driver Manager to support passing of contextual information that supports policy evaluation in a request. In another implementation, an Identity-aware Oracle Call Interface 1304 which extends Oracle Call Interface to support passing of contextual information that supports policy evaluation in a request. In yet another implementation, an identity-aware database client interface is a specific implementation of the database client interface 404 that supports a 3-layer security model (described below) and it does not depend on an existing database client interface.

The policy engine 609 or 707 selects a subset of data access policies from a plurality of data access policies in a local policy repository relevant to the request. The plurality of data access policies may be distributed from a policy server 608 or 710 (i.e., centralized policies). The policy engine evaluates the subset of data access policies to determine if the request should be allowed.

If the request is allowed, the policy engine returns a policy effect ALLOW to the policy enforcement point along with one or more policy obligations, if any, is produced during policy evaluation. The policy enforcement point invokes obligation handlers 605 or 705 to implement the one or more policy obligations (if any) and produces a guarded database query (described below). In an example, the one or more obligation handlers alter the unguarded database query by inserting one or more conditions into the unguarded database query.

If the request is denied, the policy engine returns a policy effect DENY to the policy enforcement point. In an implementation, the policy enforcement point invokes obligation handlers 605 or 705 to implement a deny policy obligation that alters the unguarded database query to produce a guarded database query. A deny policy obligation is a policy obligation that inserts a false condition into a database query so that the altered database query produces an empty result set (i.e., a result set with zero row of data) when it is executed.

Optionally, the policy engine may return one or more policy obligations (if any) are produced during policy evaluation. The policy enforcement point invokes the obligation handlers to implement the one or more policy obligations making additional alterations to the unguarded database query. In an implementation, the deny policy obligation is one of the one or more policy obligations returned from the policy engine.

The policy enforcement point sends the request with the guarded database query to the database management server and passes a result set returned by the database management server to the application program in response to the request. The unguarded database query is not sent to the database management server.

In another implementation, the policy enforcement point does not send the request to the database management server. The policy enforcement point returns an error status to the application program in response to the request.

In an implementation, a policy engine returns one or more policy obligations but not a policy effect (i.e., since policy effect is always ALLOW).

An auditor 606 or 706 logs policy evaluations and related information in a local cache and sends log data in local cache to a log server 610 or 711. The log data may be used in reporting, auditing, diagnostics, or other purposes.

A communication and synchronization module 607 or 709 is responsible for communicating with a policy server to update policies in a local policy repository and a log server to upload log data. The communication and synchronization module may also communicate with a policy engine server 609.

In an implementation, a component of a data access enforcer runs in a process of an application program 403 while other components of the data access enforcer run in one or more processes separated from the application program.

In an implementation, a component of a data access enforcer runs in a process of a database client interface 404 while other components of the data access enforcer run in one or more processes separated from the database client interface.

In an implementation, the components of a data access enforcer runs in one or more processes separated from an application program 403.

An unguarded database query is a database query sent by an application program to a database management server before it is intercepted by a data access enforcer. A guarded database query is an unguarded database query that is examined and may be altered by a data access enforcer with guard conditions inserted. The effects of a guard condition on a database query include: (a) one or more rows that may go into a result set shall be excluded (or filtered); (b) one or more rows shall be added to a result set; (c) an empty result set to be produced (i.e., to implement policy effect DENY); (d) data in a column in a result set shall be masked (e.g., fully or partially redacted); (e) data in a column in a result set shall be replaced by random data (i.e., an alternative to masking that protects data in a column); (f) data in a column shall be encrypted using format-preserving encryption (i.e., for insert or update operations); or (g) others.

A data access enforcer enforces data access policies. The most common applications of data access policies are to insert guard conditions into database queries, alter database queries, alter result sets, or block unauthorized insert or update database operation. In an example, a data access policy is used to filter out (or exclude) one or more rows in a result set to prevent data leak. In another example, a data access policy is used to mask (or redact) data in a column in a result set to prevent confidential information from being exposed to a nonprivileged (or unauthorized) viewer. In yet another example, a data access policy is used to encrypt private data using format-preserving encryption before the data stored in a database (i.e., through an insert or update database operation) preventing the private data from being exposed to non-privileged (or unauthorized) viewers when it is retrieved by a legacy application program that is not capable of protecting the private data. In yet another example, a data access policy is used to block an insert, update or delete operation on a database table because the user who initiated the operation is not allowed to view a column in the database table unmasked.

Filtering of rows in a result set prevents or limits a data leak caused by illegal hacking activities or coding errors in an application program. The methods to filter (or exclude) rows in a result set include: (a) preventing specific rows to be included in a result set by altering a database query before it is processed by a database management server; or (b) removing one or more rows from a result set produced by a database management server before the data is delivered to an application program requesting the data. A data access enforcer may implement one of the two methods, or both. In an implementation, a data access policy uses a filtering policy obligation to specify which rows are to be included. An example of the filtering policy obligation is:

ApplyRowFilter("orders.enteredBy = ${user.name} AND orders.orderDate >= DATEADD(DAY, -365, GETDATE( ))")

In an implementation, filtering of rows in a result set is achieved by altering a database query (e.g., SQL statement) before it is processed by a database management server, effectuating the filtering of rows in a result set by altering a database query may be applied when a database management server supports a well-defined query language (e.g., SQL). In an implementation, filtering of rows in a result set is achieved by altering the result set after it is produced by a database management server, one or more rows in a result set may be removed before the result set is returned to an application program. Effectuating the filtering of rows in a result set by altering a result set may be applied when a database management server does not support a query language (e.g., NoSQL databases). In an implementation, filtering of rows in a result set is achieved by altering a database query before the database query is processed by a database management server and altering the result set after the result set is produced by a database management server. When a database query becomes too complex to alter, altering a result set may be an effective alternative. There are other situations that altering a result set may be an attractive alternative, they include: (a) the altered database query is too inefficient; (b) altering a database query is not possible due to structural or data dependency issues (e.g., a condition may depend on data in another database); or (c) others. A data access enforcer may alter a database query, result set, or both to carry out a row filtering task.

Masking data in a column in a result set protects privacy and confidentiality and prevent data leak by not presenting personally identifiable information, confidential, or sensitive data to a person who is not authorized to view the data. The methods to mask data in a column in a result set include: (a) transforming the data in a column in a result set by altering a database query before the database query is processed by a database management server; or (b) altering data in a column of a result set produced by a database management server before the data is delivered to an application program requesting the data to hide the original content. A data access enforcer may implement one of the two methods, or both. In an implementation, a data access policy uses a masking policy obligation to specify a mask pattern to be applied to a column in a result set. An example of the masking policy obligation is:
ApplyStringMask("customers.ssn", "0/*--/4")

Mask pattern is data format specific. Different mask patterns may be applied to different columns, each according to the data format of a column in a database table. Examples of database table column data formats include int, smallint, bigint, real, float, numeric, decimal, char, nchar, varchar, date, datetime, or many more. For a numeric data type (e.g., int, smallint, bigint, real, float, numeric or decimal), a mask pattern may specify a fix value, a random value, an expression, or others. If a fix value is specified, all data in a column in a result set shall be replaced with the fix value (e.g., 0, 100, or 999). If a random value is specified, a random value shall be generated for each element in a column in a result set. For a character data type (e.g., char, nchar or varchar), a mask pattern may specify a fix character string, a substitution pattern, an expression, or others. If a fix character string is specified, all data in a column shall be replaced with the fix character string (e.g., "******" or "name@somewebsite.com"). If a substitution pattern is specified, the substitution pattern (e.g., "xxxx-xxxx-xxxx-<last 4 digits of credit card number>" or "000-00-<last 4 digits of SSN>") shall be applied to each element in a column in a result set. For a date or time data type, a mask pattern may specify a fix value (e.g., "2021-01-01," or "Sep. 4, 2021"), a random value, an expression, or others.

In an implementation, masking data in a column in a result set is achieved by altering a database query (e.g., SQL statement) before it is processed by a database management server, effectuating the masking of data in a column in a result set by altering a database query may be applied when a database management server supports a well-defined query language (e.g., SQL). In an implementation, masking data in a column in a result set is achieved by altering the result set after it is produced by a database management server, data in a column in a result set may be masked (or redacted) before the result set is returned to an application program. Effectuating the masking of data in a column in a result set by altering a result set may be applied when a database management server does not support a query language (e.g., NoSQL databases). In an implementation, masking of data in a column in a result set is achieved by altering a database query before the database query is processed by a database management server and altering the result set after the result set is produced by a database management server. When a database query becomes too complex to alter, altering a result set may be an effective alternative. There are other situations that altering a result set may be an attractive alternative, they include: (a) the altered database query is too inefficient; (b) altering a database query is not possible due to structural or data dependency issues (e.g., a condition may depend on data in another database); or (c) others. A data access enforcer may alter a database query, result set, or both to carry out a masking task.

Encrypting data in a column using format-preserving encryption (FPE) protects privacy and confidentiality and prevent data leak. When personally identifiable information, confidential or sensitive data is stored in an encrypted format, the data is protected when it is at rest, in motion, or when it is handled by an application program that does not have privacy protection capabilities. FPE may be applied to data in a column in a database table in an insert or update database operation.

An aspect of the invention is a 3-layer security model for database applications that protects privacy and confidentiality of data in a database and prevents data leak. The 3-layer security model comprises an application component, data protection component and a database component. Application component comprises one or more application programs 403 in a client-server deployment 401. The database component comprises one or more database management systems 406 managing one or more databases. When an application program in the application component submits a database query to a database management server in the database component to retrieve data from a database, a data protection component inspects the database query and modifies it, if necessary, according to a plurality of data access policies to ensure privacy and confidentiality are respected and data leak is prevented or minimized.

In an embodiment, a software stack implementing a 3-layer security model comprises an application component, a data protection component, and a database component. An application program in the application component sends a first database query to a database management server in the database component to retrieve a first result set passes through the data protection component before reaching the database component. The data protection component applies data access policies to the first database query and, if necessary, alters the first database query to produce a second database query. For example, the data protection component may insert one or more guard conditions into the first database query. If the first database query is not altered, the data protection component sends the first database query to the database management server to retrieve a first result set and the data protection component returns the first result set to the application program in response to the first database query. If the first database query is altered, the data protection component sends the second database query to a database management server to retrieve a second result set and the data protection component returns the second result set to the application program in response to the first database query.

In an example, the guard conditions inserted into the first database query limits the number of rows of data that may be returned when the second database query is executed, whereby the second result set is smaller than or equal to the first result set. The guard conditions thereby implement a data filtering function. In another example, the guard conditions inserted into a first database query masks (or redacts)

data in a column in the second result set when the second database query is executed. The guard conditions thereby implement a data masking (or redacting) function. In yet another example, the guard conditions inserted into the first database query prevents any data to be returned when the second database query is executed, whereby the second result set is empty (i.e., contains zero row of data). The guard conditions thereby implement a blocking function (i.e., prevent successful completion of the first database query).

In an embodiment, a software stack implements a 3-layer security model and an application program in the application component sends a request with a first database query to insert, update or delete a record in the database passes through the data protection component before reaching the database component. The data protection component inspects the first database query and decides to deny the request. The data protection component returns an error status to the application program in response to the request. If the data protection component allows the request, the data protection component sends the request with the first database query to a database management server in the database component.

In an embodiment, a software stack implements a 3-layer security model and an application program in the database component sends a request with a first database query to insert, update or delete a record in the database passes through the data protection component before reaching the database component. The data protection component inspects the first database query and decides to deny the request. The data protection component alters the first database query to insert a condition into the first database query to produce a second database query, where the condition shall result in an error. The data protection component sends the second database query to a database management server in the database component to implement the second database query. The database management server executes the second database query and returns an error status. The data protection component returns the error status to the application component in response to the first database query.

Figure 8:
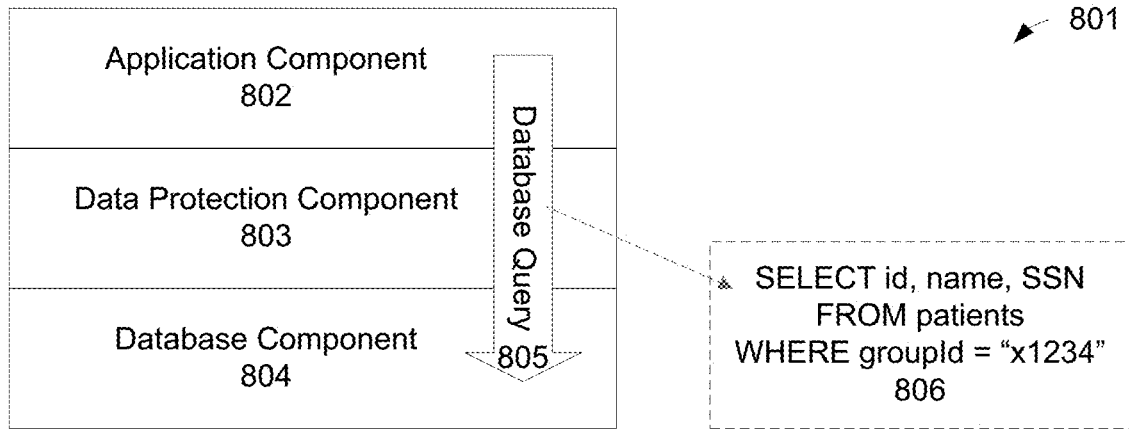
FIG. 8 shows a functional block diagram of a software stack implementing the 3-layer security model.

FIG. 8 shows a functional block diagram 801 of a software stack implementing the 3-layer security model. The software stack comprises an application component 802, a data protection component 803 and a database component 804. The application component comprises one or more application programs. Examples of application programs include SAP C/4HANA® application server, SAP ERP Central Component®, or others. The database component comprises one or more database management systems. Examples of database management systems include Oracle® database, Microsoft SQL Server®, SAP HANA®, IBM DB2®, or others. Examples of data protection components include NextLabs Data Access Enforcer for SAP ERP™, or others. An application program in the application component sends a request with a database query 805 to a database management server in the database component and the request is first processed by the data protection component and then by the database management server. An example of a database query is a SQL statement 806:

SQL_SM1
SELECT id, name, SSN FROM patients WHERE groupId = "x1234";

To protect privacy and confidentiality and prevent data leak, secure logic is implemented in the data protection component. The data protection component applies data access policies to (a) the database query before it is processed by the database component or (b) the result set produced by the database component to implement filtering, masking, or both functions. The data protection component may analyze the database query and alter the database query by inserting guard conditions into the database query before sending the altered database query to the database component. Alternatively, the data protection component may analyze the result set produced by the database query and alter the result set before passing the altered result set to the application component.

In an example, an application program in the application component attempts to retrieve information of a patient from a database managed by a database management server in the database component where the patient's group identifier groupId is known. The application program composes a SQL statement and sends it to the database management server to retrieve the patient's information. A data access enforcer in the data protection component intercepts (or receives) the SQL statement and inserts a guard condition to limit the data being retrieved. The guard condition limits retrieval to information belongs to the user who is currently logged on to the application program, thereby preventing data belongs to another user from being leaked in case an illegal intrusion into the application program has occurred.

Figure 9:
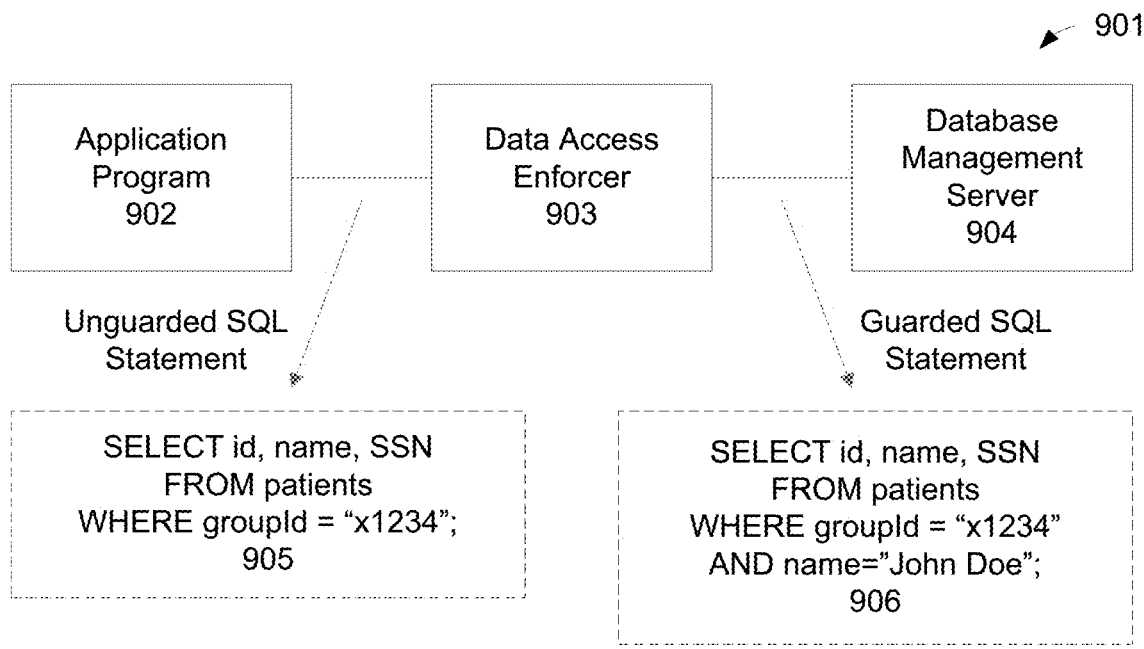
FIG. 9 shows a block diagram of a data access enforcer deployment according to the 3-layer security model.

FIG. 9 shows a block diagram 901 of a data access enforcer deployment according to the 3-layer security model 801. An application program 902 (e.g., SAP C/4HANA®) in the application component 802 sends an unguarded SQL statement 905 to a database management server 904 (e.g., Oracle® database) in the database component 804 to retrieve a first result set. The unguarded SQL statement is intercepted by a data access enforcer 903 in the data protection component 803. The unguarded SQL statement is:

SQL_SM2
SELECT id, name, SSN FROM patients WHERE groupId = "x1234";

The data access enforcer inspects (or analyzes) the unguarded SQL statement, extracts information (e.g., database operation, table names, view names, or column names) from the unguarded SQL statement, and collects contextual information required to support policy evaluation. The unguarded SQL statement, the extracted information and the contextual information are sent to a policy engine (not shown). The policy engine evaluates a plurality of data access policies with the unguarded SQL statement, extracted information and contextual information, and produces a policy effect (or policy decision, or decision) and one or more policy obligations (or obligations, or additional instructions), if any. The policy effect and the one or more policy obligations (if any) are returned to the data access enforcer.

The data access enforcer implements the policy effect and the one or more policy obligations (if any) by altering the unguarded SQL statement to product a guarded SQL statement 906. The guarded SQL statement is:

SQL_SM3
SELECT id, name, SSN FROM patients WHERE groupId = "x1234" AND name = "John Doe";

The guarded SQL statement is sent to the database management server to retrieve a second result set. The unguarded SQL statement is not sent to the database management server. The data access enforcer returns the second result set to the application program in response to the unguarded SQL statement.

In a client-server deployment, as shown in FIG. 4, data access enforcer may be deployed in different ways to achieve different data access protection objectives. Deployment models include client-side deployment, server-side deployment and gateway deployment.

In an embodiment, a data access enforcer is installed on a client computer 402 intercepting at a database client interface 404 requests sent by an application program 403 to a database management server 406. This deployment model is referred to as client-side deployment. Client-side deployment is most suitable for protecting access to data in a database from a server application program such as SAP C/4HANA® or others. Data access policies enforced by the data access enforcer may be tailored to the application program and the data access enforcer may obtain contextual information provided through an identity-aware database client interface or from a policy context provider running in a process of the application program.

In an embodiment, a data access enforcer is installed on a server computer 405 intercepting at a database client interface handler 407 requests sent by an application program 403 to a database management server 406. This deployment model is referred to as server-side deployment. Server-side deployment has an advantage that a data access enforcer may enforce data access policies on requests sent by a plurality of application programs running on a plurality of computing devices. Data access policies for server-side deployment may be tailored to cover more complex access patterns and a data access enforcer may obtain contextual information provided through an identity-aware database client interface or from a policy context provider.

In an embodiment, a data access enforcer is installed on a gateway computer 2007 or 2104 intercepting requests sent from an application program 2003, 2102 or 2103 before the requests reach a database client interface handler 2015 or 2109 on a server computer 2013 or 2107. This deployment model is referred to as gateway deployment. Gateway deployment is suitable for protecting data stored in a public cloud-based database services or in situations where server-side deployment is not viable. A data access enforcer running on a computer separated from a client computer or a server computer acting as a reverse proxy for a database management server processes requests before they reach a database management server. Data access policies for gateway deployment may be tailored to an application program or cover more complex access patterns from a plurality of application programs and a data access enforcer may obtain contextual information provided through an identity-aware database client interface or from a policy context provider.

Figure 10:
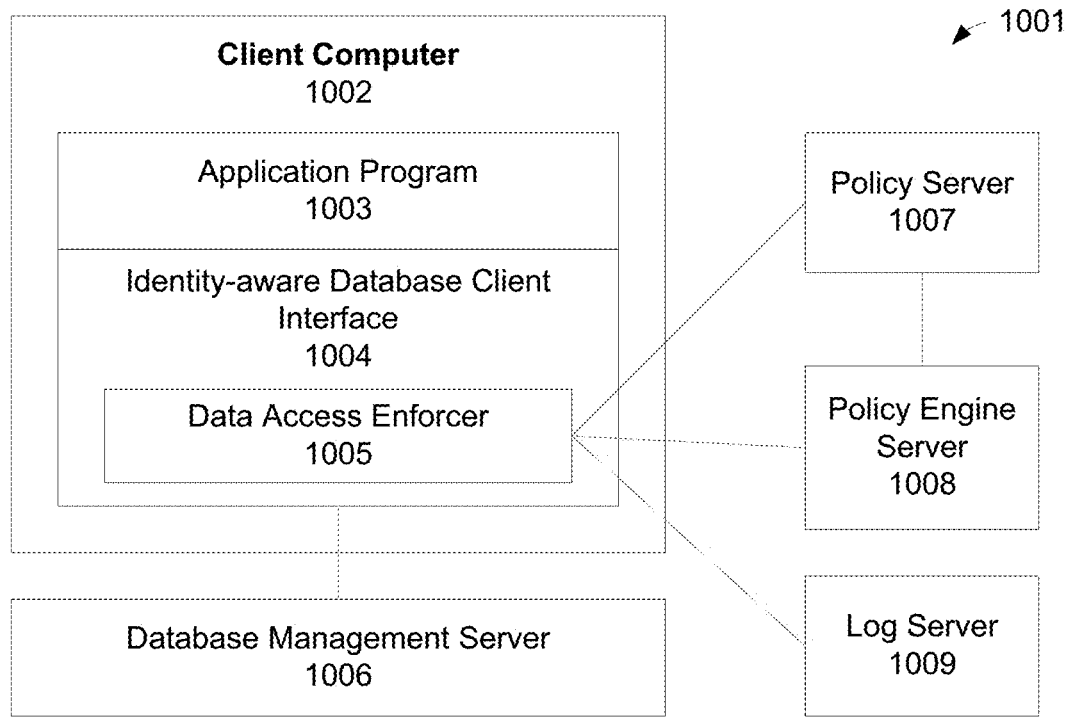
FIG. 10 shows a functional block diagram of client-side deployment of a data access enforcer with an identity-aware database client interface.

FIG. 10 shows a functional block diagram 1001 of client-side deployment of a data access enforcer 1005 with an identity-aware database client interface 1004. An application program 1003 running on a client computer 1002 having access to a database management server 1006 sends requests with contextual information (e.g., identity of a user requesting the data) to the database management server through the identity-aware database client interface.

The data access enforcer is installed on the client computer to protect privacy and confidentiality and prevent data leak. The data access enforcer receives configuration, policy enforcement support data, software update, or other data from a policy server 1007. The data access enforcer also reports its operational status to the policy server periodically.

In an implementation, an identity-aware database client interface extends an existing database client interface. The extension enables passing of contextual information required to support policy evaluation from an application program to a data access enforcer (e.g., in a request with a database query, or in a separate function call). The identity-aware database client interface supports the 3-layer security model described above. Examples of existing database client interfaces include Open Database Connectivity, Java Database Connectivity (JDBC), Microsoft® ADO.NET, Oracle® Call Interface, IBM® Db2 Call Level Interface, SAP® HANA Client, SAP® database client interface, or others. An example of an identity-aware database client interface is Identity-aware JDBC Driver Manager 1204 which extends a JDBC Driver Manager to support passing of contextual information in a request. Another example of an identity-aware database client interface is Identity-aware Oracle Call Interface 1304 which extends Oracle Call Interface to support passing of contextual information in a request.

In another implementation, an identity-aware database client interface is a specific implementation of the database client interface that supports the 3-layer security model. The specific implementation does not depend on an existing database client interface. The specific implementation allows contextual information required to support policy evaluation to be passed from an application program to a data access enforcer (e.g., in a request with a database query).

When the application program sends a request with a first database query and contextual information (e.g., the identity of the user who shall view the data to be returned with the request) to the database management server to retrieve a first result set, the data access enforcer intercepts the request. The data access enforcer inspects (or analyzes) the first database query, extracts information from the first database query, and collects additional contextual information required to support policy evaluation. The data access enforcer sends the request, the extracted information and contextual information to a policy engine 1008.

The information that may be extracted from the first database query includes a database operation (e.g., select, insert, update, delete, or call), one or more database tables or views, one or more columns in the database tables or views, or others.

Contextual information refers to data relevant to evaluating data access policies. Examples of contextual information include name and version of the application program, the user who is currently using the application program that initiated the request, the user who shall view the data to be returned with the request, the role of a user, the department a user belongs to, configuration and environment data, or some other data.

The policy engine selects a subset of data access policies from a plurality of data access policies in a local policy repository relevant to the request and evaluates the subset of data access policies to produce a policy effect (or decision, or policy decision) and one or more policy obligations (or instructions), if any. The policy effect and the one or more policy obligations (if any) are returned to the data access enforcer.

The data access enforcer implements the policy effect and the one or more policy obligations (if any), thereby altering the first database query to produce a second database query. The data access enforcer sends the second database query to the database management server through the database client interface to retrieve a second result set. The first database query is not sent to the database management server. The data access enforcer returns the second result set to the application program in response to the request.

If implementing the policy effect and the one or more policy obligations (if any) does not require altering the first database query, the data access enforcer sends the first database query to the database management server through the database client interface to retrieve a first result set. The data access enforcer returns the first result set to the application program in response to the request.

The data access enforcer and the policy engine send information associated with the request, policy evaluation, or enforcement to a log server 1009. In an implementation, the policy engine or the data access enforcer saves log data to a local cache and sends the cached log data to the log server periodically.

Policy engine is responsible for making a policy decision (or producing a policy effect) on a request based on a plurality of data access policies. The policy engine 1008 receives a plurality of data access policies, policy evaluation support data, configuration, software update, or other data from the policy server 1007. In an implementation, a policy engine also receives other types of policies from the policy server (e.g., access or use control policies). A policy engine may receive policy evaluation requests from one or more data access enforcers or data protection clients.

In an implementation, the policy engine 1008 does not produce a policy effect. The policy engine produces policy obligation only.

In an implementation, if the policy effect is DENY, the data access enforcer 1005 returns an error to the application program 1003 in response to the request.

In an implementation, the first database query is not altered but the first result set is altered by the data access enforcer 1005 to implement the one or more policy obligations.

In an implementation, the second result set is altered by the data access enforcer 1005 to implement the one or more policy obligations.

Figure 11:
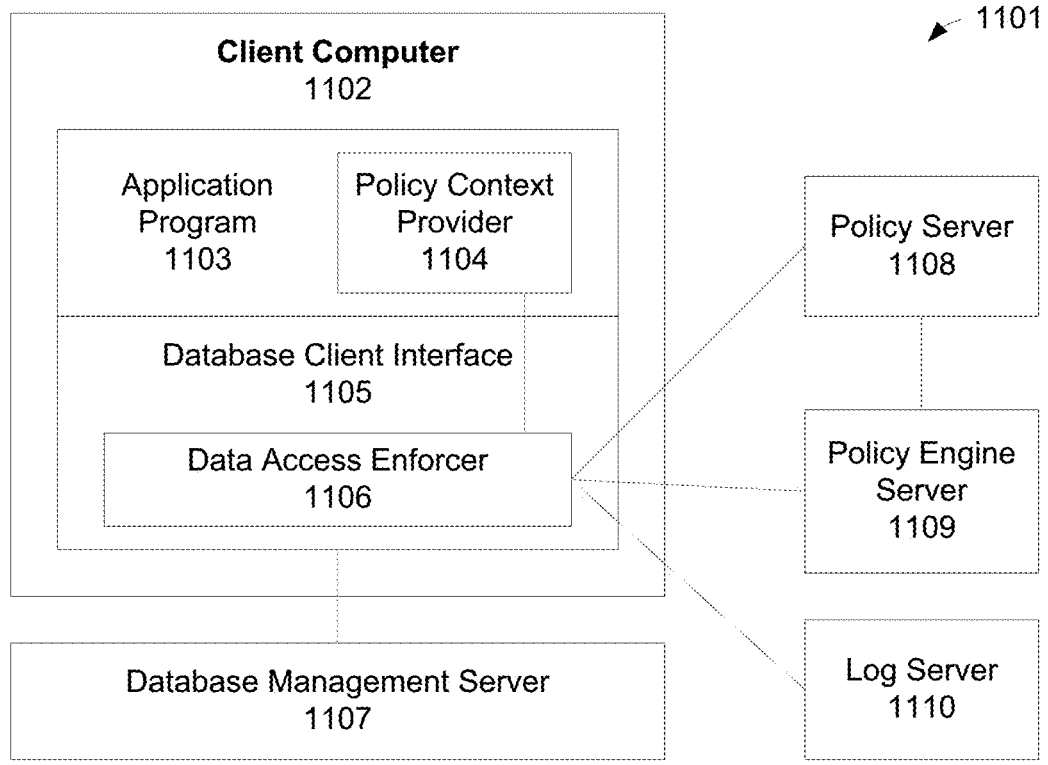
FIG. 11 shows a functional block diagram of client-side deployment of a data access enforcer and a policy context provider.

FIG. 11 shows a functional block diagram 1101 of client-side deployment of a data access enforcer 1106 and a policy context provider 1104. An application program (e.g., SAP ERP Central Component®) 1103 running on a client computer 1102 having access to a database management server 1107 sends requests to the database management server through a database client interface 1105. Examples of database client interfaces include Open Database Connectivity, Java Database Connectivity, Microsoft® ADO.NET, Oracle® Call Interface, IBM® Db2 Call Level Interface, SAP® HANA Client, SAP® database client interface, or others.

The data access enforcer is installed on the client computer to protect privacy and confidentiality and prevent data leak. The data access enforcer receives configuration, policy enforcement support data, software update, or other data from a policy server 1108. The data access enforcer also reports its operational status to the policy server periodically.

When the application program sends a request with a first database query to the database management server to retrieve a first result set, the data access enforcer intercepts the request. The data access enforcer inspects (or analyzes) the first database query, extracts information from the first database query, and collects contextual information required to support policy evaluation. The data access enforcer sends the request, the extracted information and contextual information to a policy engine 1109.

The information that may be extracted from the first database query includes a database operation (e.g., select, insert, update, delete, or call), one or more database tables or views, one or more columns in the database tables or views, or others.

Contextual information refers to data relevant to evaluating data access policies. In an implementation, the data access enforcer requests contextual information (e.g., the identity of the user who shall view the data in a result set) from a policy context provider running in a process of the application program. In another implementation, the data access enforcer extracts contextual information from the request. In yet another implementation, the data access enforcer requests contextual information from an external data source (e.g., Microsoft Active Directory® or OpenLDAP). In yet another implementation, contextual information is attached to (or embedded in) a database query. In this case, the data access enforcer removes the contextual information in the database query after the contextual information is extracted by the data access enforcer. In an example, contextual information is embedded in the WHERE clause of a SQL statement where the WHERE clause evaluates to false when the embedded data is present. Contextual information may include name and version of an application program, the user who is currently logged on to an application program that initiated a request, the user who shall view the data to be returned with a request, the role of a user, the department a user belongs to, configuration and environment data, or some other data. Policy context provider is an optional component.

The policy engine selects a subset of data access policies from a plurality of data access policies in a local policy repository relevant to the request and evaluates the subset of data access policies to produce a policy effect (or decision, or policy decision) and one or more policy obligations (or instructions), if any. The policy effect and the one or more policy obligations (if any) are returned to the data access enforcer.

The data access enforcer implements the policy effect and the one or more policy obligations (if any), thereby altering the first database query to produce a second database query. The data access enforcer sends the second database query to the database management server through the database client interface to retrieve a second result set. The first database query is not sent to the database management server. The data access enforcer returns the second result set to the application program in response to the request.

If implementing the policy effect and the one or more policy obligations (if any) does not require altering the first database query, the data access enforcer sends the first database query to the database management server through the database client interface to retrieve a first result set. The data access enforcer returns the first result set to the application program in response to the request.

The data access enforcer and the policy engine send information associated with the request, policy evaluation, or enforcement to a log server 1110. In an implementation, the policy engine or the data access enforcer saves log data to a local cache and sends the cached log data to the log server periodically.

Policy engine is responsible for making a policy decision (or producing a policy effect) on a request based on a plurality of data access policies. The policy engine 1109 receives a plurality of data access policies, policy evaluation support data, configuration, software update, or other data from the policy server 1108. In an implementation, the policy engine also receives other types of policies from the policy server (e.g., access or use control policies). The policy engine may receive policy evaluation requests from one or more data access enforcers or data protection clients.

In an implementation, the policy engine 1109 does not produce a policy effect. The policy engine produces policy obligation only.

In an implementation, if the policy effect is DENY, the data access enforcer 1106 returns an error to the application program 1103 in response to the request.

In an implementation, the first database query is not altered but the first result set is altered by the data access enforcer 1106 to implement the one or more policy obligations.

In an implementation, the second result set is altered by the data access enforcer 1106 to implement the one or more policy obligations.

In an example, a customer support team views customer account information using an application program. The customer account information is stored in a database managed by a database management server. The application program is written in Java programming language and runs in a Java Runtime Environment (JRE) on the client computer. The application program sends requests to the database management server through an identity-aware JDBC interface. When a customer support staff accesses customer account information, personally identifiable information (PII) such as social security number (SSN) or credit card number shall be masked (or redacted). Masking of PII is handled by a data access enforcer installed on the client computer.

An identity-aware JDBC interface is an implementation of the database client interface that extends the JDBC interface provided by JRE to allow contextual information to be passed (or associated) with a request to support policy evaluation. An identity-aware JDBC interface comprises an identity-aware JDBC driver manager and one or more JDBC drivers. In an implementation, an identity-aware JDBC interface allows contextual information to be passed along with a database query. An example method of an identity-aware JDBC interface that takes a HashMap of contextual information is:

```
public interface Statement extends Wrapper, AutoCloseable
{
    ResultSet executeQuery(String sql, HashMap context);
}
```

In another implementation, an identity-aware JDBC interface provides a method to register contextual information with a data access enforcer. The method may be called by an application program to provide contextual information to a data access enforcer before sending a database query. An example of the method is:

```
public interface Statement extends Wrapper, AutoCloseable
{
    void registerPolicyContext(HashMap context);
}
```

A component of the data access enforcer may run in a process of the application program or identity-aware JDBC interface, while other components may run in one or more processes separated from the application program and identity-aware JDBC interface.

Figure 12:
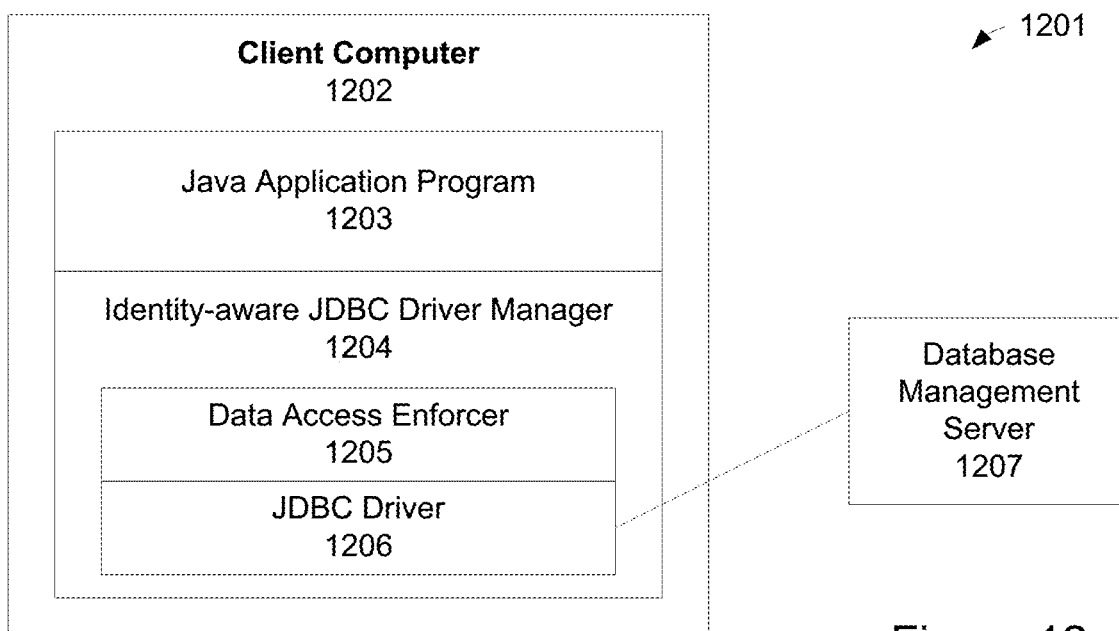
FIG. 12 shows a functional block diagram of a data access enforcer deployed on a client computer with an identity-aware JDBC interface to enforce data access policies.

Referring to FIG. 12, a data access enforcer 1205 deployed on a client computer 1202 with an identity-aware JDBC interface (also referred to as database client interface in this example) enforces data access policies on requests sent by an application program 1203 to a database management server Microsoft SQL Server® 1207. The identity-aware JDBC interface comprises an identity-aware JDBC Driver Manager 1204 and a JDBC Driver 1206. The application program is written in Java programming language and runs in a Java Runtime Environment on the client computer. A data access enforcer NextLabs Data Access Enforcer for JDBC™ 1205 is installed on the client computer. The data access enforcer intercepts requests sent through the database client interface and enforces data access policies on the requests. Customer account information is stored in a database table "customers" in a database managed by the database management server.

The data access enforcer enforces a plurality of data access policies to protect privacy and confidentiality and prevent data leak. A data access policy Policy_M1 in the plurality of data access policies masks (or redacts) data in a column in a result set if a user is not authorized to view the data. In an example, a mask pattern "0/*--/4" transforms a formatted 10 digits social security number "182-40-9736" to "*--9736". In another example, a mask pattern "0/#############/4" transforms a 16 characters credit number "9725326722842751" to "############2751". The data access policy is:

```
# Policy_M1
FOR database_table = "//server3/customers_db/customers"
ON SELECT
BY user.group = "support" AND user.role = "staff"
DO ALLOW
    AND ApplyStringMask("customers.ssn", "0/***-**-/4")
    AND ApplyStringMask("customers.primaryCreditCardNo",
    "0/#############/4");
```

To retrieve customer information in the database table "customers_db/customers", the application program sends a request with an unguarded database query to the database management server through the database client interface to retrieve a first result set. To support policy evaluation, the application program passes contextual information to the data access enforcer. The contextual information includes the identity of the user Gale Smith who shall view the data returned with the request. The unguarded database query is:

```
# SQL_M1
SELECT customerId, customerName, ssn, primaryCreditCardNo,
lastContactDate FROM customers;
```

The data access enforcer intercepts the request at the database client interface. The data access enforcer inspects (or analyzes) the unguarded database query in the request and extracts information (e.g., database operation, table names, view names, or column names) from the unguarded database query to support policy evaluation. The data access enforcer also collects (or gathers) contextual information required to support policy evaluation. The contextual information includes the user. If the database client interface is identity aware, contextual information is passed along with a request. If contextual information is not passed along with a request, the data access enforcer may query a policy context provider for contextual information required to support policy evaluation. The data access enforcer sends the request, the extracted information and the contextual information to a policy engine (not shown).

The policy engine selects a subset of data access policies from a plurality of data access policies in a local policy repository relevant to the request. The subset of data access policies includes the data access policy Policy_M1. The policy engine evaluates the subset of data access policies to produces a policy effect ALLOW and two policy obligations. The policy effect and the policy obligations are returned to the data access enforcer. The policy obligations are:

```
ApplyStringMask("customers.ssn", "0/***-**-/4") AND
ApplyStringMask("customers.primary CreditCardNo",
"0/############/4")
```

To implement the policy obligations, the data access enforcer inserts guard conditions into the unguarded database query to produces a guarded database query. The data access enforcer replaces the unguarded database query in the request with the guarded database query and sends the updated request through the database client interface to the database management server to retrieve a second result set. Data in the ssn and primaryCreditCardNo columns in the second result set are redacted. The second result set is returned to the application program. The content of the second result set is displayed on the application program.

In an example, a company uses an application program to manage materials it uses in its manufacturing process. The amount of materials and process used in manufacturing of each product are company secrets and they may be viewed by selected staff members of the production team under controlled environment only. The manufacturing materials and process data is stored in a database managed by a database management server. The application program sends requests through an identity-aware Oracle® Call Interface to the database management server to retrieve materials and process data. To protect the company's secrets and track all accesses, the company deployed a data access enforcer and a plurality of data access policies to control access to the data in the database and log requests.

An identity-aware Oracle® Call Interface (OCI) is an implementation of the database client interface that extends the Oracle® Call Interface provided by Oracle Corporation to allow contextual information to be passed (or associated) with a request to support policy evaluation. In an implementation, an identity-aware OCI allows contextual information to be passed along with a database query. In another implementation, an identity-aware OCI provides a method to register contextual information with a data access enforcer. The method may be called by an application program to provide contextual information to a data access enforcer before sending a database query.

A component of the data access enforcer may run in a process of the application program or identity-aware OCI, while other components may run in one or more processes separated from the application program and identity-aware OCI.

Figure 13:
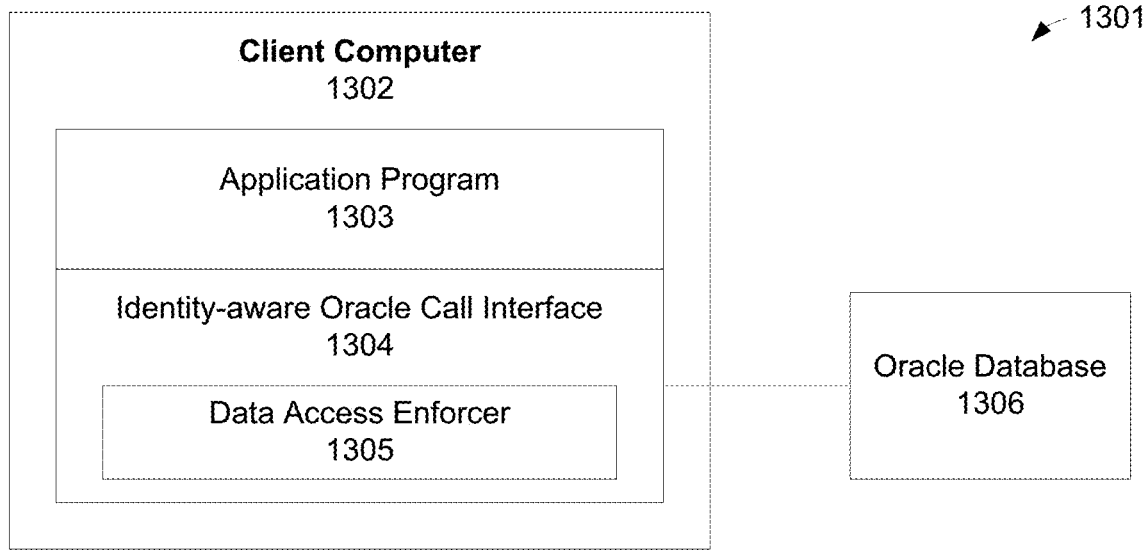
FIG. 13 shows a functional block diagram of a data access enforcer deployed on a client computer with an identity-aware Oracle® Call Interface to enforce data access policies.

Referring to FIG. 13, a data access enforcer 1305 deployed on a client computer 1302 with an identity-aware Oracle® Call Interface 1304 (also referred to as database client interface in this example). Manufacturing materials and process data generated during manufacturing is stored in a database table "materials" in a database managed by a database management server Oracle® database 1306. An application program 1303 running on the client computer sends requests to the database management server through the database client interface. The data access enforcer installed on the client computer intercepts requests sent through the database client interface and enforces data access policies on the requests.

The data access enforcer enforces a plurality of data access policies to protect privacy and confidentiality and prevent data leak. A data access policy Policy_S1 in the plurality of data access policies restricts (or limits) access to manufacturing materials and process data in the database table "materials" that is classified "secret" to two staff members James Arnold and Sara Robertson on two computer terminals production_floor_1 and office_12. The data access policy filters out (or excludes) manufacturing materials and process data that is classified "secret" when accessed in all other circumstances. Note that the data access policies do not specify policy effects (i.e., the policies are always allowed). The data access policy is:

```
# Policy_S1
FOR database_table = "//server10/production_db/materials"
ON SELECT
BY user.name = "James Arnold" OR user.name = "Sara Robertson"
WHERE computer.id = "production_floor_1" OR computer.id =
"office_12"
DO LOG
    OTHERS Apply RowFilter("materials.code < > 'secret'") AND
    LOG;
```

When a first user Peter Morris who is a member of the production team views the manufacturing materials and process data using the application program, the application program retrieves manufacturing materials and process data in the database table "production_db/materials" by sending a first request with an unguarded database query to the database management server through the database client interface to retrieve a first result set. The unguarded database query is:

```
# SQL_S1
SELECT batchNo, productionDate, productCode, materialCode,
processParameters, personInCharge, classification FROM materials;
```

The data access enforcer intercepts the first request at the database client interface. The data access enforcer inspects (or analyzes) the unguarded database query in the first request and extracts information (e.g., database operation, table names, view names, or column names) from the unguarded database query to support policy evaluation. The data access enforcer also collects (or gathers) contextual information that is passed along with the first request. Contextual information includes the first user who is currently logged on to the application program. If contextual information is not passed along with the first request, the data access enforcer may query a policy context provider for contextual information required to support policy evaluation. The data access enforcer sends the first request, the extracted information and the contextual information to a policy engine (not shown).

The policy engine selects a subset of data access policies from a plurality of data access policies in a local policy repository relevant to the first request. The subset of data access policies includes the data access policy Policy_S1. The policy engine evaluates the subset of data access policies with contextual information including the first user. In this case, the premise of data access policy Policy_S1 evaluates to false because of first user and the negative consequence element (or OTHERS element) applies. The policy engine produces two policy obligations. Note that the data access policy does not produce a policy effect. The policy obligations are returned to the data access enforcer. The data access enforcer inserts a guard condition into the unguarded database query according to the first policy obligation to produces a guarded database query. The first policy obligation is:
ApplyRowFilter("materials.code< >'secret'")
And the guard condition is:
materials.code< >"secret"
The guarded database query is:

```
# SQL_S2
SELECT batchNo, productionDate, productCode, materialCode,
processParameters, personInCharge, classification FROM materials
WHERE materials.code < > "secret";
```

The data access enforcer replaces the unguarded database query in the first request with the guarded database query and sends the updated first request through the database client interface to the database management server to retrieve a second result set. The second result set does not contain any manufacturing materials or process data that is classified "secret". The second result set is returned to the application program. The content of the second result set is displayed on the application program.

The data access enforcer invokes the auditor to send policy enforcement information to a log server to implements the second policy obligation LOG. In an implementation, the log data is cached locally and log data in the cache is sent to a log server periodically.

Alternatively, when a second user James Arnold who is a member of the production team views sales orders using a terminal production_floor_1 on the production floor, the application program sends a second request with the unguarded database query to the database management server. The data access enforcer intercepts the second request, inspects the unguarded database query, extracts information from the unguarded database query and collects contextual information to support policy evaluation. The contextual information includes the second user.

The policy engine evaluates data access polices with contextual information including the second user. The premise of the data access policy Policy_S1 evaluates to true because of the second user and the positive consequence element (or DO element) of the data access policy applies. The policy engine produces a policy obligation LOG. The policy obligation is returned to the data access enforcer.

The data access enforcer retrieves a third result set using the unguarded database query and the third result set includes manufacturing materials or process data that is classified "secret". The content of the third result set is displayed on the application program.

The data access enforcer invokes the auditor to send policy enforcement information to a log server to implements the policy obligation LOG. In an implementation, the log data is cached locally and log data in the cache is sent to a log server periodically.

In an example, an application program running on a client computer (e.g., desktop computer) attempts to load sales order data in a database table in a database managed by a database management server. The application program sends a request with a database query (e.g., SQL statement) to the database management server through an ODBC interface on the client computer. A data access enforcer is installed on the client computer to enforce a plurality of data access policies. A data access policy in the plurality of data access policies limits data retrieval to sales orders entered by the user who is currently logged on to the client computer and for a period up to twelve months.

A component of the data access enforcer may run in a process of the application program or ODBC interface, while other components may run in one or more processes separated from the application program and ODBC interface.

Figure 14:
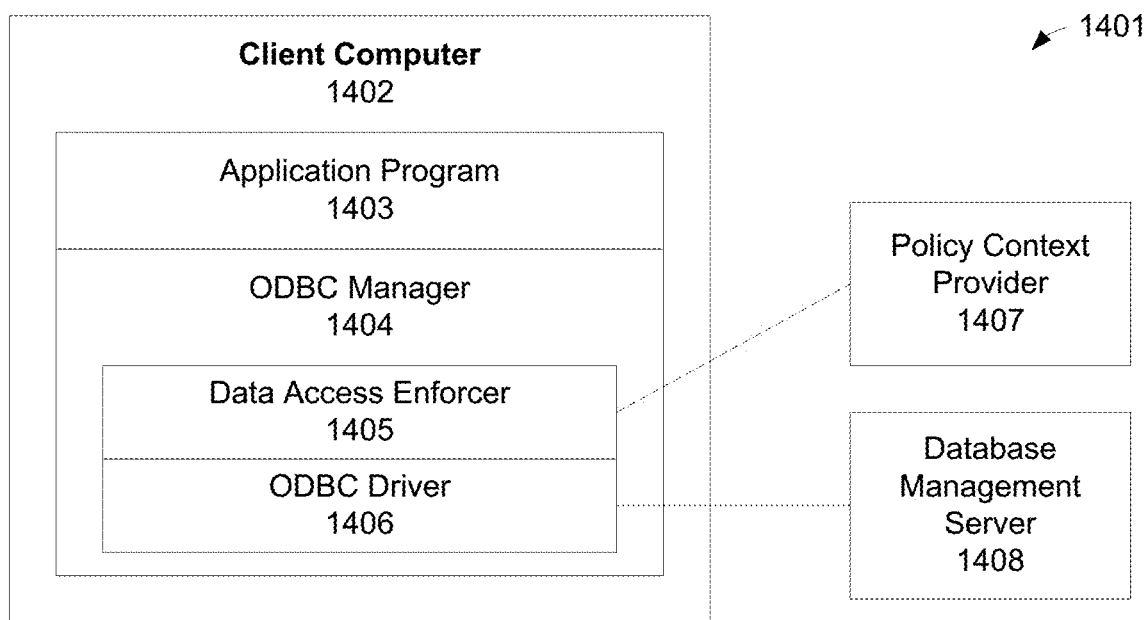
FIG. 14 shows a functional block diagram of a data access enforcer deployed on a client computer with an ODBC interface to enforce data access policies.

Referring to FIG. 14, a data access enforcer 1405 deployed on a client computer 1402 with an ODBC interface (also referred to as database client interface in this example) enforces data access policies on a request sent by an application program Microsoft Excel® 1403 running on the client computer to a database management server Oracle My SQL® 1408. The ODBC interface is a database client interface and it comprises an ODBC Manager 1404 and one or more ODBC Drivers 1406. A data access enforcer NextLabs Data Access Enforcer for ODBC™ 1405 is installed on the client computer.

The data access enforcer intercepts requests sent through the ODBC interface and enforces data access policies on the requests. A policy context provider 1407 provides contextual information to support policy evaluation. Examples of a policy context provide include directory services (e.g., Microsoft Active Directory® or OpenLDAP), or other data sources. Sales order data is stored in a database table "orders" in a database managed by the database management server.

The data access enforcer enforces a plurality of data access policies to protect privacy and confidentiality and prevent data leak. A data access policy Policy_F1 in the plurality of data access policies limits access to data in the "orders" database table to the rows entered by current user. A user is not allowed to view sales orders entered by another user. The policy also limits retrieval of data for up to twelve months. The data access policy is:

```
# Policy_F1
FOR database_table = "//server2/sales_db/orders"
ON SELECT
BY user.department = "sales"
DO ALLOW AND ApplyRowFilter("orders.enteredBy = ${user.name}
AND orders.orderDate >= DATEADD(DAY, -365, GETDATE( ))");
```

To retrieve data in the database table "sales_db/orders", the application program sends a request with an unguarded database query to the database management server through the database client interface to retrieve a first result set. The unguarded database query is:

```
# SQL_F1
SELECT * FROM orders;
```

The data access enforcer intercepts the request at the database client interface. The data access enforcer inspects (or analyzes) the unguarded database query in the request and extracts information (e.g., database operation, table names, view names, or column names) from the unguarded database query to support policy evaluation. The data access enforcer also collects (or gathers) contextual information required to support policy evaluation including calling the policy context provider to get information on the user currently logged on to the client computer. The contextual information collected includes the user John Doe who is currently logged on to the client computer. The data access enforcer sends the request, the extracted information and the contextual information to a policy engine (not shown).

The policy engine selects a subset of data access policies from a plurality of data access policies in a local policy repository relevant to the request. The subset of data access policies includes the data access policy Policy_F1. The policy engine evaluates the subset of data access policies to produces a policy effect ALLOW and a policy obligation. The policy effect and the policy obligation are returned to the data access enforcer. The policy obligation is:

ApplyRowFilter("orders.enteredBy = ${user.name} AND orders.orderDate >= DATEADD(DAY, -365, GETDATE( ))")

The data access enforcer inserts guard conditions into the unguarded database query to produces a guarded database query. The guard conditions are:

orders.enteredBy = "John Doe" AND orders.orderDate >= DATEADD(DAY, -365, GETDATE( ))

The guarded database query is:

SQL_F2
SELECT * FROM orders WHERE orders.enteredBy = "John Doe" AND orders.orderDate >= DATEADD(DAY, -365, GETDATE( ));

The data access enforcer replaces the unguarded database query in the request with the guarded database query and sends the updated request through the database client interface to the database management server to retrieve a second result set. The second result set contains only data entered by the user John Doe in the last twelve months. The second result set is returned to the application program. The content of the second result set is displayed on the application program.

In an example, Company A manufactures a plurality of products and it is in the process of selling Product Line K to Company B. Companies A and B agreed on a transition plan that gives the sales team of Company B access to the system that manages sales orders of Product Line K for six months after closing. The information technologies (IT) team of Company A is tasked to setup the sales order management system so that, after closing, the sales team of Company A shall not be able to enter or view sales orders for Product Line K and the sales team of Company B shall be able to enter or view sales orders for Product Line K only. Company A uses an application program SAP C/4 HANA® to enter and view sales orders and the sales orders are stored in a database managed by a database management server SAP® HANA. The application program sends requests through a SAP® database client interface to update or retrieve data in the database. To create the separation, Company A's IT team deploys a data access enforcer NextLabs Data Access Enforcer for SAP ERP™ with a plurality of data access polices.

SAP® database client interface (or DBCI) is a propriety application programming interface for accessing data stored in a database. SAP® DBCI may be instrumented to intercept requests make to a database using one or more instrumentation techniques described in detail in U.S. patent application Ser. No. 11/615,477, filed Dec. 22, 2006, and other U.S. patent applications listed in this application and incorporated by reference.

A component of the data access enforcer may run in a process of the application program or SAP® DBCI, while other components may run in one or more processes separated from the application program and SAP® DBCI.

Figure 15:
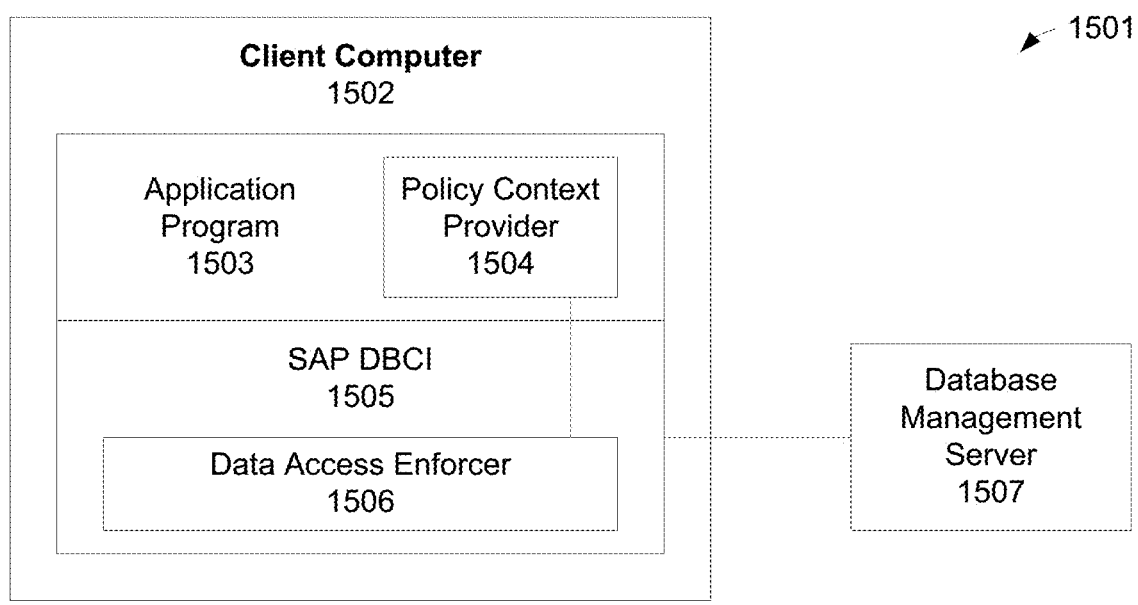
FIG. 15 shows a functional block diagram of a data access enforcer deployed on a client computer with a SAP® database client interface to enforce data access policies.

Referring to FIG. 15, a data access enforcer 1506 deployed on a client computer 1502 with a SAP® database client interface 1505 (also referred to as database client interface in this example) enforces data access policies to restrict access to sales orders in a database table "orders" in a database managed by a database management server SAP HANA® 1507. An application program SAP C/4 HANA® 1503 running on the client computer sends a request to the database management server through the database client interface. The data access enforcer installed on the client computer intercepts requests sent through the database client interface and enforces data access policies on the requests. A policy context provider 1504 is an add-on to the application program. The policy context provider gathers contextual information from the application program to support policy evaluation when queried by the data access enforcer.

The data access enforcer enforces a plurality of data access policies to protect privacy and confidentiality and prevent data leak. A first data access policy Policy_W1 in the plurality of data access policies filters out (or excludes) sales orders of Product Line K when sales order data is requested by a member of the sales team in Company A. A second data access policy Policy_W2 in the plurality of data access policies restricts (or limits) sales orders to Product Line K when sales order data is requested by a member of the sales team in Company B. The data access policies are:

Policy_W1
FOR database_table = "//server10/orders_db/orders"
ON SELECT
BY user.company = "Company A" AND user.department = "sales"
DO ALLOW AND Apply RowFilter("orders.productLine < > 'Product Line K'");
Policy_W2
FOR database_table = "//server10/orders_db/orders"
ON SELECT
BY user.company = "Company B" AND user.department = "sales"
DO ALLOW AND ApplyRowFilter("orders.productLine = 'Product Line K'");

At time T1, a first user Jim Jones who is a member of the sales team in Company A views sales orders using the application program. The application program retrieves sales orders in the database table "orders db/orders" by sending a first request with an unguarded database query to the database management server through the database client interface to retrieve a first result set. The unguarded database query is:

SQL_W1
SELECT orderNumber, customerName, orderDate, salesRep, productLine, amount, deliveryDate FROM orders;

The data access enforcer intercepts the first request at the database client interface. The data access enforcer inspects (or analyzes) the unguarded database query in the first request and extracts information (e.g., database operation, table names, view names, or column names) from the unguarded database query to support policy evaluation. The data access enforcer also collects (or gathers) contextual information required to support policy evaluation. Specifically, the data access enforcer makes a request to the policy context provider to gather contextual information such as the first user who is currently logged on to the application program. The data access enforcer sends the first request, the extracted information and the contextual information to a policy engine (not shown).

The policy engine selects a subset of data access policies from a plurality of data access policies in a local policy repository relevant to the first request. The subset of data access policies includes the data access policy Policy_W1. The policy engine evaluates the subset of data access policies with contextual information including the first user. The policy engine produces a policy effect ALLOW and a policy obligation. The policy effect and the policy obligation are returned to the data access enforcer. The policy obligation is:
ApplyRowFilter("orders.productLine< >'Product Line K'")
The data access enforcer inserts a guard condition into the unguarded database query according to the policy obligation to produces a first guarded database query. The guard condition is:
orders.productLine< >"Product Line K"
The first guarded database query is:

```
# SQL_W2
SELECT orderNumber, customerName, orderDate, salesRep, productLine,
amount, deliveryDate FROM orders WHERE orders.productLine < >
"Product Line K";
```

The data access enforcer replaces the unguarded database query in the first request with the first guarded database query and sends the updated first request through the database client interface to the database management server to retrieve a second result set. The second result set does not contain any sales order of Product Line K. The second result set is returned to the application program. The content of the second result set is displayed on the application program.

At time T2, a second user Kate Wilmore who is a member of the sales team in Company B views sales orders using the application program. The application program sends a second request with the unguarded database query through the database client interface to the database management server to retrieve a third result set. The data access enforcer intercepts the second request, inspects the unguarded database query, extracts information from the unguarded database query, and collects contextual information relevant to the second request to support policy evaluation. The contextual information includes the second user.

The policy engine selects a subset of data access policies from a plurality of data access policies in a local policy repository relevant to the first request. The subset of data access policies includes the data access policy Policy_W2. The policy engine evaluates the subset of data access policies with contextual information including the second user. The policy engine produces a policy effect ALLOW and a policy obligation. The policy effect and the policy obligation are returned to the data access enforcer. The policy obligation is:
ApplyRowFilter("orders.productLine='Product Line K'")
The data access enforcer inserts a guard condition into the unguarded database query according to the policy obligation to produces a second guarded database query. The guard condition is:
orders.productLine="Product Line K"
The second guarded database query is:

```
# SQL_W3
SELECT orderNumber, customerName, orderDate, salesRep, productLine,
amount, deliveryDate FROM orders WHERE orders.productLine =
"Product Line K";
```

The data access enforcer replaces the unguarded database query in the second request with the second guarded database query and sends the updated second request through the database client interface to the database management server to retrieve a fourth result set. The fourth result set comprises only sales orders of Product Line K. The fourth result set is different from the second result set. The fourth result set is returned to the application program. The content of the fourth result set is displayed on the application program.

Figure 16A:
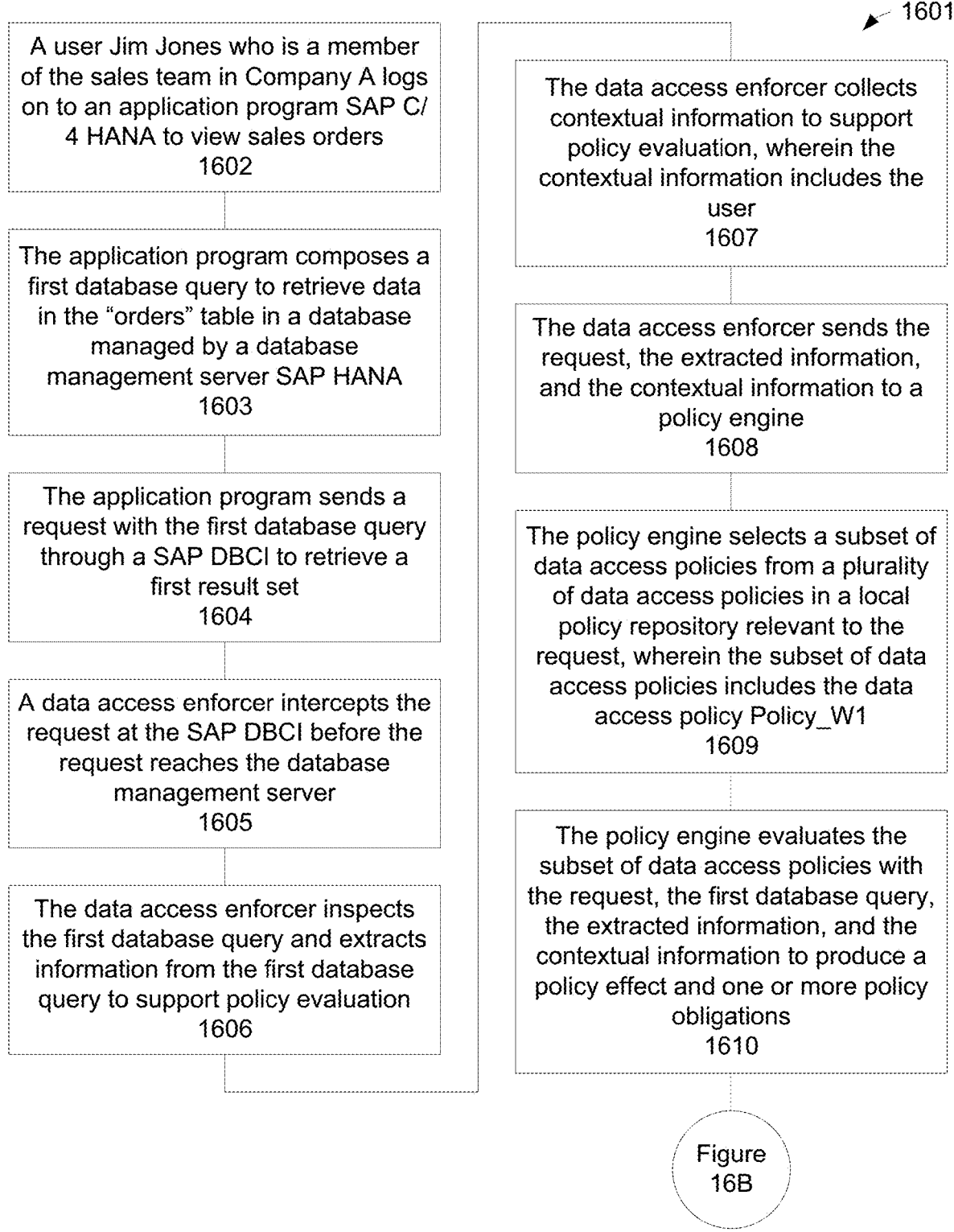
FIGS. 16A-16C show a flow diagram of a data access enforcer intercepting at a database client interface SAP® DBCI on a client computer enforcing data access policies that filter out data in a result set.
Figure 16B:
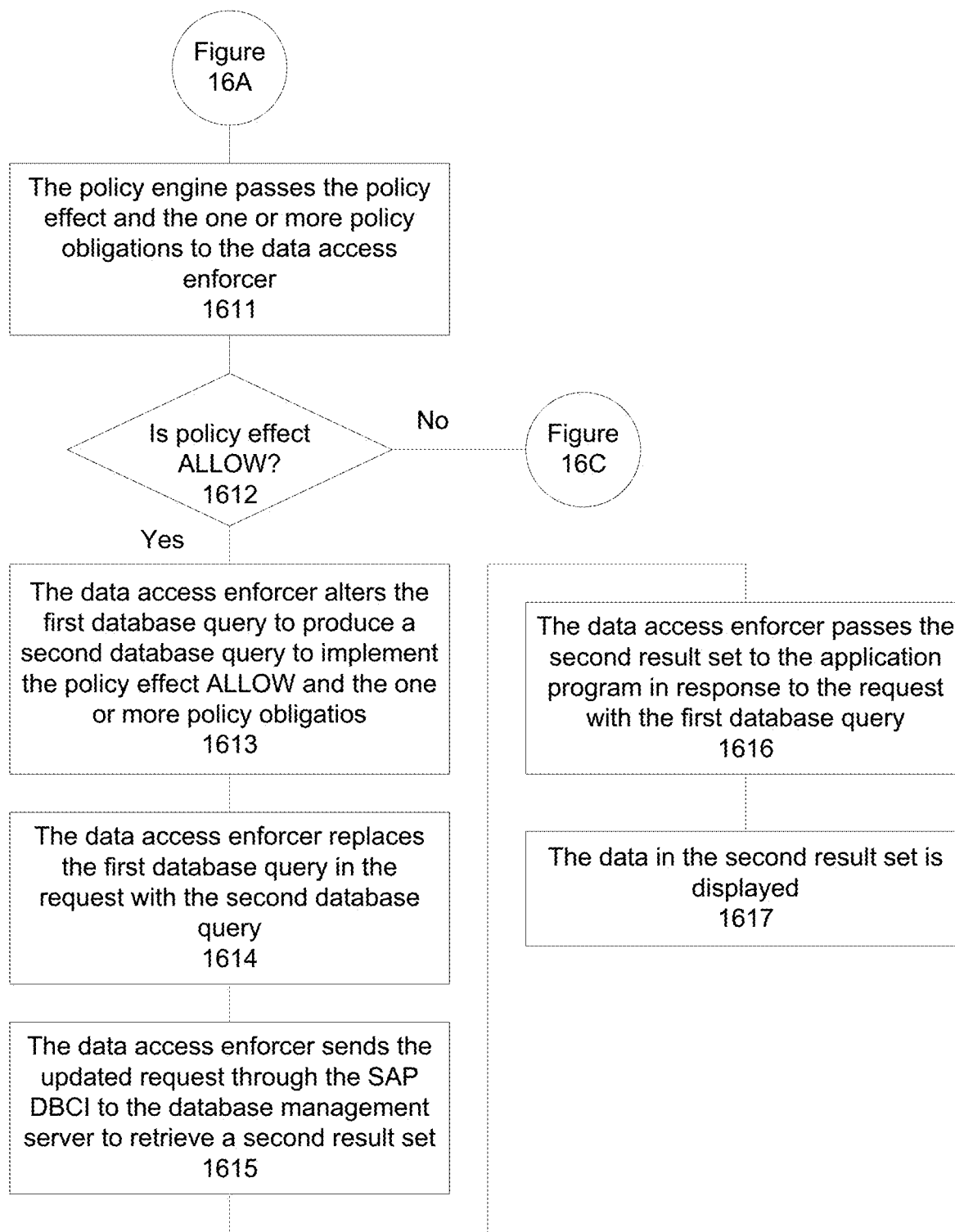
Figure 16C:
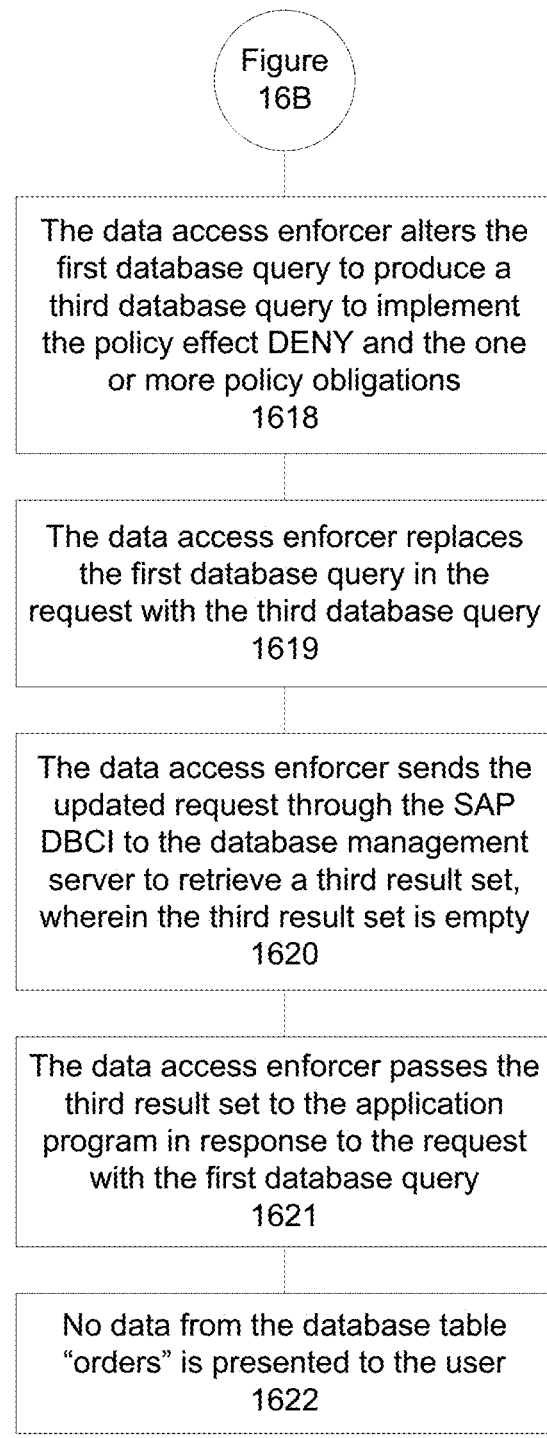

FIGS. 16A-16C show a flow diagram 1601 of a data access enforcer 1506 intercepting at a database client interface SAP® DBCI 1505 on a client computer 1502 enforcing data access policies that filter out (or exclude) data in a result set when the data is requested by an application program SAP C/4 HANA® 1503. In step 1602, a user Jim Jones (also referred to as first user in the description of FIG. 15 above) who is a member of the sales team in Company A logs on to the application program on the client computer to view sales orders.

In step 1603, the application program composes a first database query (also referred to as unguarded database query or SQL_W1 in the description of FIG. 15 above) to retrieve data in the database table (or table) "orders" in a database managed by a database management server SAP HANA® 1507. In step 1604, the application program sends a request (also referred to as first request in the description of FIG. 15 above) with the first database query through the database client interface to retrieve a first result set.

In step 1605, the data access enforcer intercepts the request at the database client interface before the request reaches the database management server. In step 1606, the data access enforcer inspects the first database query and extracts information (e.g., database operation, table names, view names, or column names) from the first database query to support policy evaluation. In step 1607, the data access enforcer collects contextual information to support policy evaluation, where the contextual information includes the user. The contextual information may be collected (or gathered) by querying an operating system application program interface or services, querying a Lightweight Directory Access Protocol (LDAP) server, querying a policy context provider 1504 running in a process of the application program, combination of these, or others. In step 1608, the data access enforcer sends the request, the extracted information, and the contextual information to a policy engine. In an implementation, the policy engine and the data access enforcer run on the same computing device. In another implementation, the policy engine and the data access enforcer run on separate computing devices.

In step 1609, the policy engine selects a subset of data access policies from a plurality of data access policies in a local policy repository relevant to the request, where the subset of data access policies includes the data access policy Policy_W1 (described above in the description of FIG. 15). In an implementation, the plurality of data access policies in a local policy repository is distributed from a policy server. In another implementation, the plurality of data access policies in a local policy repository is installed manually. In step 1610, the policy engine evaluates the subset of data access policies with the request, the first database query, the extracted information, and the contextual information to produce a policy effect (or decision, or policy decision) and one or more policy obligations, if any. In step 1611, the policy engine passes the policy effect and the one or more policy obligations (if any) to the data access enforcer.

If the policy effect is ALLOW, in step 1613, the data access enforcer alters the first database query to produce a second database query (also referred to as first guarded database query or SQL_W2 in the description of FIG. 15 above) to implement the policy effect ALLOW and the one or more policy obligations (if any). The altering of the first database query includes inserting a guard condition into the first database query. The guard condition filters (or exclude) any sales order of Product Line K. In step 1614, the data access enforcer replaces the first database query in the request with the second database query. In step 1615, the data access enforcer sends the updated request through the database client interface SAP DBCI 1505 to the database management server to retrieve a second result set. The second result set does not contain any sales order of Product Line K. In step 1616, the data access enforcer passes the second result set to the application program in response to the request with the first database query. In step 1617, the data in the second result set is displayed.

If the policy effect is DENY, in step 1618, the data access enforcer alters the first database query to produce a third database query to implement the policy effect DENY and the one or more policy obligations (if any). Altering the first database query includes inserting a condition into the first database query where the condition shall evaluate to false, thereby executing the third database query shall produce an empty result set. In step 1619, the data access enforcer replaces the first database query in the request with the third database query. In step 1620, the data access enforcer sends the updated request through database client interface SAP DBCI 1505 to the database management server to retrieve a third result set, where the third result set is empty. In step 1621, the data access enforcer passes the third result set to the application program in response to the request with the first database query. In step 1622, no data from the database table "orders" is presented to the user.

In an implementation, in step 1610, the policy engine does not produce a policy effect (i.e., since policy effect is always ALLOW). Steps 1618 to 1622 may be removed, and the data access enforcer does not need to handle policy effect DENY.

In an implementation, if the policy effect is DENY, in step 1618, the data access enforcer returns an error to the application program in response to the request. The data access enforcer does not send the request to the database management server.

Figure 17:
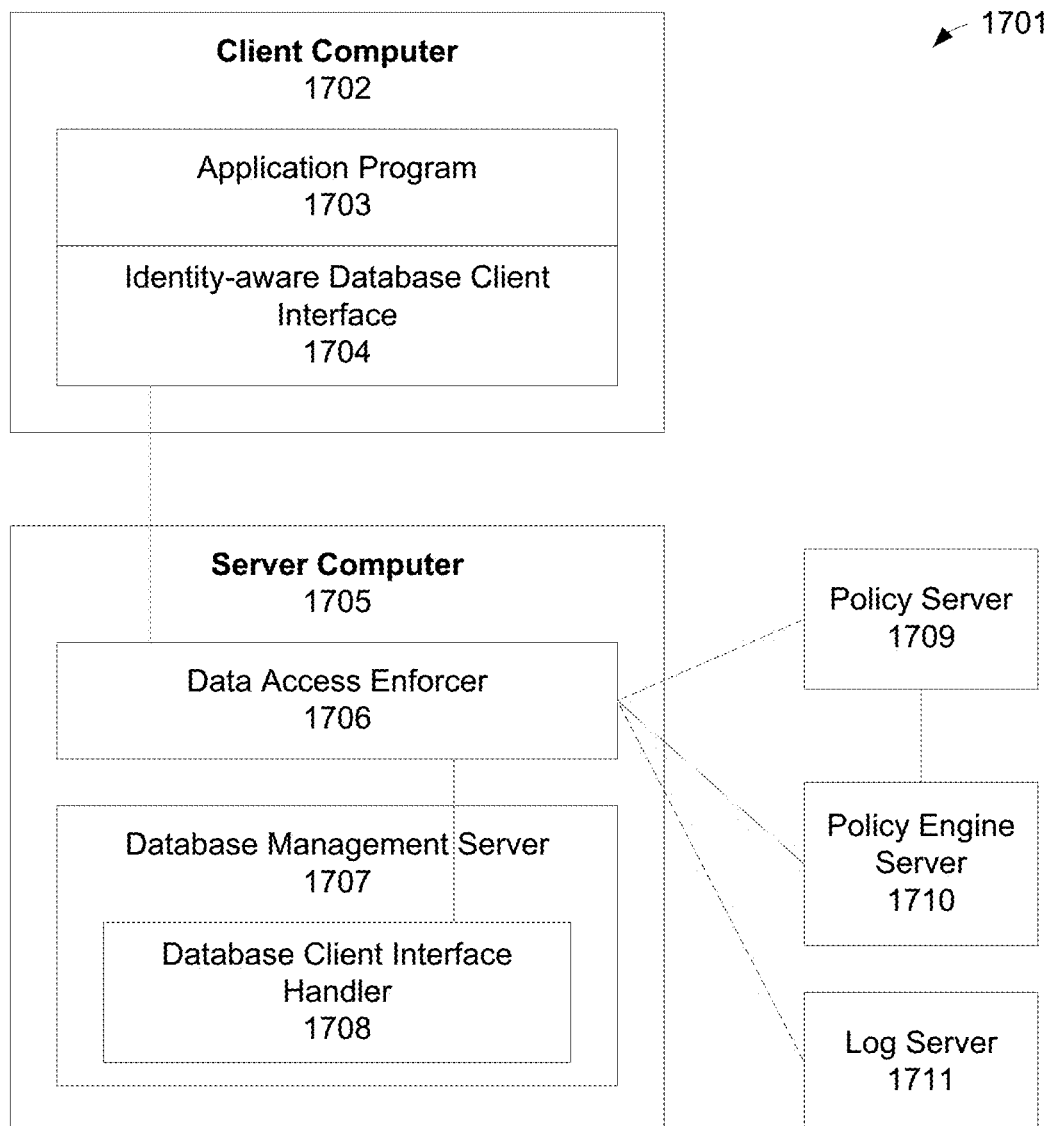
FIG. 17 shows a functional block diagram of server-side deployment of a data access enforcer with a policy engine server.

FIG. 17 shows a functional block diagram 1701 of server-side deployment of a data access enforcer 1706 with a policy engine server 1710. An application program 1703 (e.g., SAP ERP Central Component®) running on a client computer 1702 having access to a database management server 1707 running on a server computer 1705 sends requests through an identity-aware database client interface 1704 to the database management server. Examples of database management servers include Microsoft SQL Server®, Oracle® database, Oracle MySQL®, SAP HANA®, IBM DB2®, PostgreSQL®, or many others. The requests are received and processed by a database client interface handler 1708 in the database management server. A database client interface handler is a code module in a database management server that handles requests sent from a database client interface. A database client interface handler is a component of a database management server.

The data access enforcer is installed on the server computer to protect privacy and confidentiality and prevent data leak. The data access enforcer performs the functions of a reverse proxy for the database management server. The data access enforcer receives configuration, policy enforcement support data, software update, or other data from a policy server 1709. The data access enforcer also reports its operational status to the policy server periodically.

When the application program sends a request with a first database query to the database management server to retrieve a first result set, the data access enforcer intercepts the request. The data access enforcer inspects (or analyzes) the first database query, extracts information from the first database query, and collects contextual information required to support policy evaluation. If the database client interface is identity aware, contextual information is passed along with the request. If contextual information is not passed along with the request, the data access enforcer may query a policy context provider for contextual information required to support policy evaluation. The data access enforcer sends the request, the extracted information and contextual information to a policy engine 1710.

The information that may be extracted from the first database query includes a database operation (e.g., select, insert, update, delete, or call), one or more database tables or views, one or more columns in the database tables or views, or others.

Contextual information refers to data relevant to evaluating data access policies. In an implementation, the data access enforcer extracts contextual information (e.g., the identity of the user who shall view the data in a result set) from the request. In another implementation, the data access enforcer requests contextual information from a policy context provider running in a process of the application program. In yet another implementation, the data access enforcer requests contextual information from an external data source (e.g., Microsoft Active Directory® or OpenLDAP). In yet another implementation, contextual information is attached to (or embedded in) a database query. In this case, the data access enforcer removes the contextual information in the database query after the contextual information is extracted by the data access enforcer. In an example, contextual information is embedded in the WHERE clause of a SQL statement where the WHERE clause evaluates to false when the embedded data is present. Contextual information may include name and version of an application program, the user who is currently logged on to an application program that initiated a request, the user who shall view the data to be returned with a request, the role of a user, the department a user belongs to, configuration and environment data, or some other data. Policy context provider is an optional component.

The policy engine selects a subset of data access policies from a plurality of data access policies in a local policy repository relevant to the request and evaluates the subset of data access policies to produce a policy effect (or decision, or policy decision) and one or more policy obligations (or instructions), if any. The policy effect and the one or more policy obligations (if any) are returned to the data access enforcer.

The data access enforcer implements the policy effect and the one or more policy obligations, thereby altering the first database query to produce a second database query. The data access enforcer replaces the first database query in the request with the second database query. The data access enforcer sends the updated request to the database management server to retrieve a second result set. The first database query is not sent to the database management server. The data access enforcer returns the second result set to the application program in response to the request.

The data access enforcer and the policy engine send information associated with the request, policy evaluation, or enforcement to a log server 1711. In an implementation, the policy engine or the data access enforcer saves log data to a local cache and sends the cached log data to the log server periodically.

Policy engine is responsible for making a policy decision (or producing a policy effect) on a request based on a plurality of data access policies. The policy engine 1710 receives a plurality of data access policies, policy evaluation support data, configuration, software update, or other data from the policy server 1709. In an implementation, the policy engine also receives other types of policies from the policy server (e.g., access or use control policies). The policy engine may receive policy evaluation requests from one or more data access enforcers or data protection clients.

In an implementation, the policy engine 1710 does not produce a policy effect. The policy engine produces policy obligation only.

In an implementation, if the policy effect is DENY, the data access enforcer 1706 returns an error to the application program 1703 in response to the request.

In an implementation, the first database query is not altered but the second result set is altered by the data access enforcer 1706 to implement the one or more policy obligations.

In an implementation, a server-side deployment uses a local policy engine in a data access enforcer 1706 to handle policy evaluation. Policy evaluation is performed locally by a policy engine running on the server computer. A policy server 1709 distributes data access policies to a local policy repository on the server computer in addition to other information distributed to the data access enforcer. Both server-side deployments with local and external policy engines carry out the same enforcement functions.

In an example, a health care facility stores information of patients who visited the health care facility in a database managed by a database management server Oracle MySQL®. A medical staff uses Application H1 to view and update a patient's medical records. The medical staff does not need to view a patient's billing records. On the other hand, an office staff uses Application H2 to view and update a patient's personal information and billing records. Examples of a patient's personal information include day of birth, phone number, address, emergency contact, insurance coverage, credit card number, or others. The office staff does not need to view a patient's medical records. The patient's personal information and medical records contain personally identifiable information (PII) and the PII needs to be protected from misuse. To protect privacy and confidentiality and prevent data leak, the health care facility deploys a data access enforcer and a plurality of data access policies.

Figure 18:
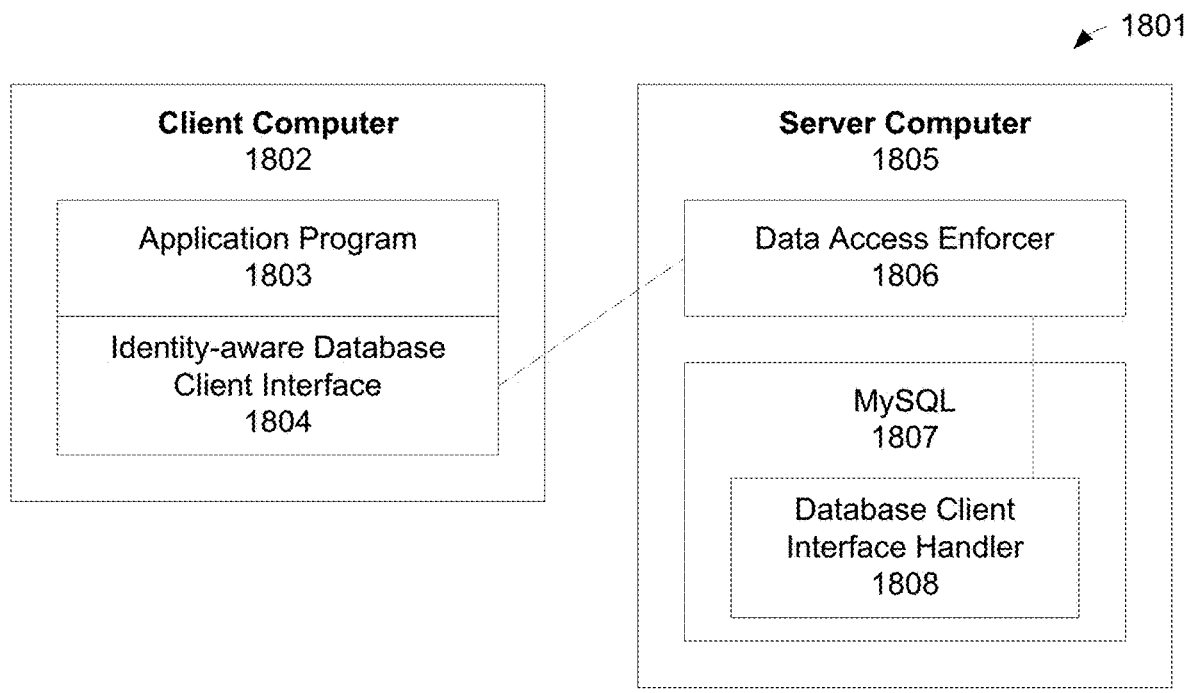
FIG. 18 shows a functional block diagram of a data access enforcer deployed on a server computer with a database management server Oracle MySQL® to enforce data access policies.

Referring to FIG. 18, a data access enforcer 1806 installed on a server computer 1805 with a database management server Oracle MySQL® 1807 enforces data access policies to protect patient data stored in a database table "patients" in a database managed by the database management server. The data access enforcer intercepts requests sent to the database management server and enforces data access policies on the requests. An application program Application H1 or Application H2 1803 running on a client computer 1802 is used by medical and office staffs to view and update medical records and patient information.

The data access enforcer enforces a plurality of data access policies to protect privacy and confidentiality and prevent data leak. A first data access policy Policy_H1 in the plurality of data access policies masks (or redacts) data in two columns in a result set when the data is retrieved by a medical staff using Application H1. A second data access policy Policy_H2 in the plurality of data access policies masks data in two columns in a result set when the data is retrieved by an office staff using Application H2. A third data access policy Policy_H3 in the plurality of data access policies denies access to data in the patients table by an application program that is neither Application H1 nor Application H2. In an example, when a mask pattern "0/\*\*\*\*\*\*\*\*/0" is applied to a column of a result set, the data in the column of the result set shall become "\*\*\*\*\*\*\*\*." The data access policies are:

```
# Policy_H1
FOR database_table = "//server11/patient_db/patients"
ON SELECT
BY user.group = "medical staff"
WHERE application.name = "Application H1"
DO ALLOW
    AND ApplyStringMask("patients.credit_card_number", "0/********/0")
    AND ApplyStringMask("patients.ssn", "0/********/0");
# Policy_H2
FOR database_table = "//server11/patient_db/patients"
ON SELECT
BY user.group = "office staff"
WHERE application.name = "Application H2"
DO ALLOW
    AND ApplyStringMask("patients.medications", "0/********/0")")
    AND ApplyStringMask("patients.visit_summary", "0/********/0");
# Policy_H3
FOR database_table = "//server11/patient_db/patients"
ON SELECT
WHERE application.name < > "Application H1" OR application.name < > "Application H2"
DO DENY
```

At time T1, an office staff looks up information on a patient Robert Olsen using Application H2. To retrieve patient information in the database table "patients_db/patients", Application H2 sends a first request with a first unguarded database query to the database management server to retrieve a first result set. The first unguarded database query is:

```
# SQL_H1
SELECT * FROM patients WHERE name = "Robert Olsen";
```

The data access enforcer intercepts the first request before it reaches a database client interface handler 1808 of the database management server. The data access enforcer inspects (or analyzes) the first unguarded database query and extracts information (e.g., database operation, table names, view names, or column names) from the first unguarded database query to support policy evaluation. The data access enforcer also collects (or gathers) contextual information required to support policy evaluation. Examples of contextual information include Application H2 that initiated the first request, the user who shall view the data in the first result set, or others. Optionally, the data access enforcer requests a policy context provider to gather additional contextual information from Application H2 or a directory service. The data access enforcer sends the first request, the extracted information and the contextual information to a policy engine (not shown).

The policy engine selects a subset of data access policies from a plurality of data access policies in a local policy repository relevant to the first request. The subset of data access policies includes the data access policy Policy_H2. The policy engine evaluates the subset of data access policies to produces a policy effect ALLOW and two policy obligations. The policy effect and the policy obligations are returned to the data access enforcer. The policy obligations are:

```
ApplyStringMask("patients.medications", "0/********/0") AND
ApplyStringMask("patients.visit_summary", "0/********/0")
```

The data access enforcer implements the policy effect and the two policy obligations by inserting guard conditions into the first unguarded database query to produces a first guarded database query. The data access enforcer replaces the first unguarded database query in the first request with the first guarded database query and sends the updated first request through the database client interface handler to the database management server to retrieve a second result set. Data in the medications and visit summary columns in the second result set are redacted. The second result set is returned to Application H2. The content of the second result set is displayed on Application H2.

At time T2, a medical staff looks up information of the patient Robert Olsen using Application H1. Application H1 sends a second request with a second unguarded database query to the database management server to retrieve a third result set. The second unguarded database query is:

```
# SQL_H2
SELECT * FROM patients WHERE name = "Robert Olsen";
```

The data access enforcer intercepts the second request before it reaches the database client interface handler of the database management server. The data access enforcer and the policy engine perform the same processing steps on the second request as it did on the first request. In this case, policy evaluation produces a policy effect ALLOW and two policy obligations. The policy obligations are:

```
ApplyStringMask("patients.credit_card_number", "0/********/0") AND
ApplyStringMask("patients.ssn", "0/********/0")
```

The data access enforcer implements the policy effect and the two policy obligations by inserting guard conditions into the second unguarded database query. The database management server produces a fourth result set with the second unguarded database query. Data in the credit_card_number and ssn columns in the fourth result set are redacted. The fourth result set is returned to Application H1. The content of the fourth result set is displayed on Application H1.

Figure 19A:
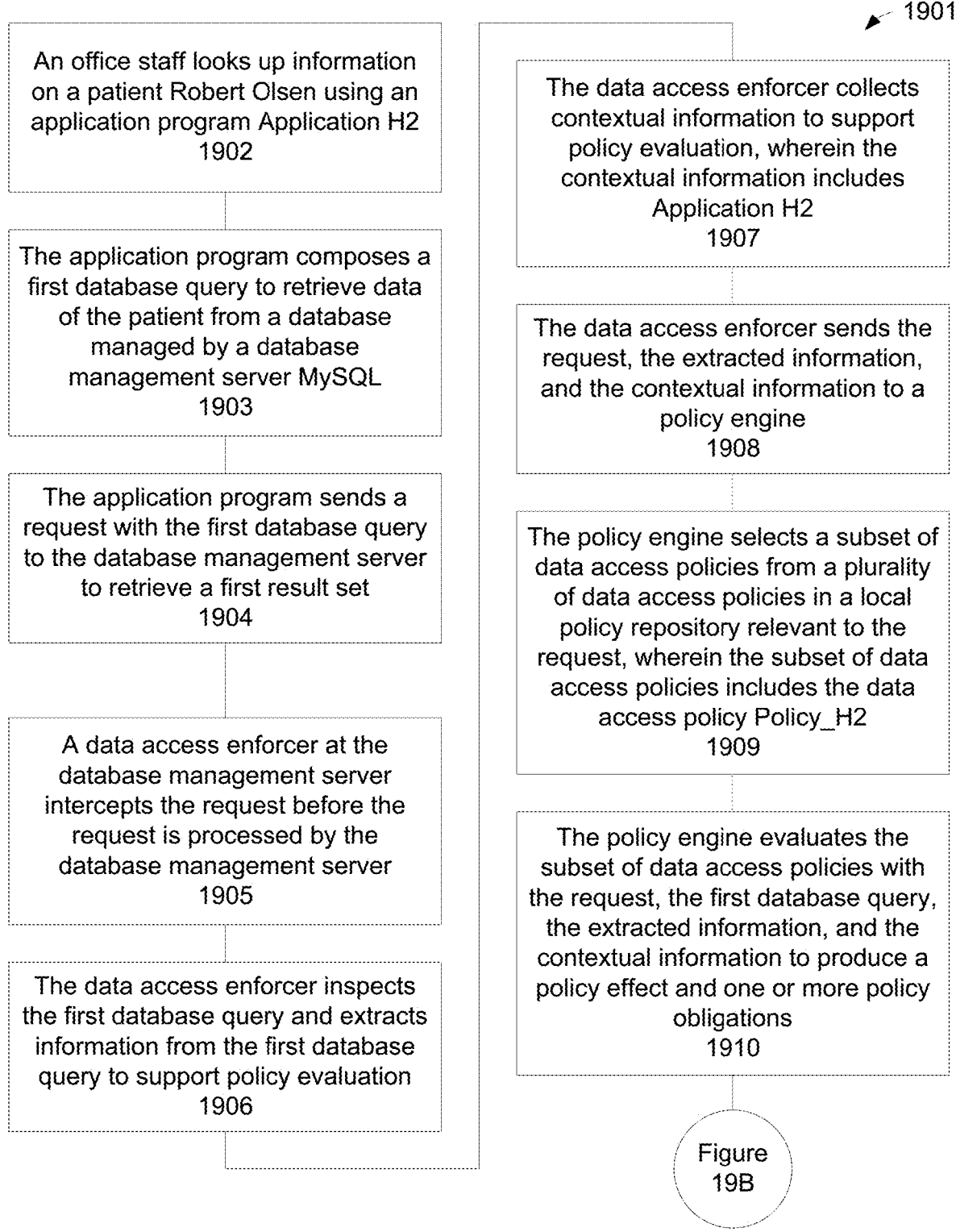
FIGS. 19A-19C show a flow diagram of a data access enforcer on a server computer enforcing data access policies that mask data in a column of a result set produced by a database management server Oracle MySQL®.
Figure 19B:
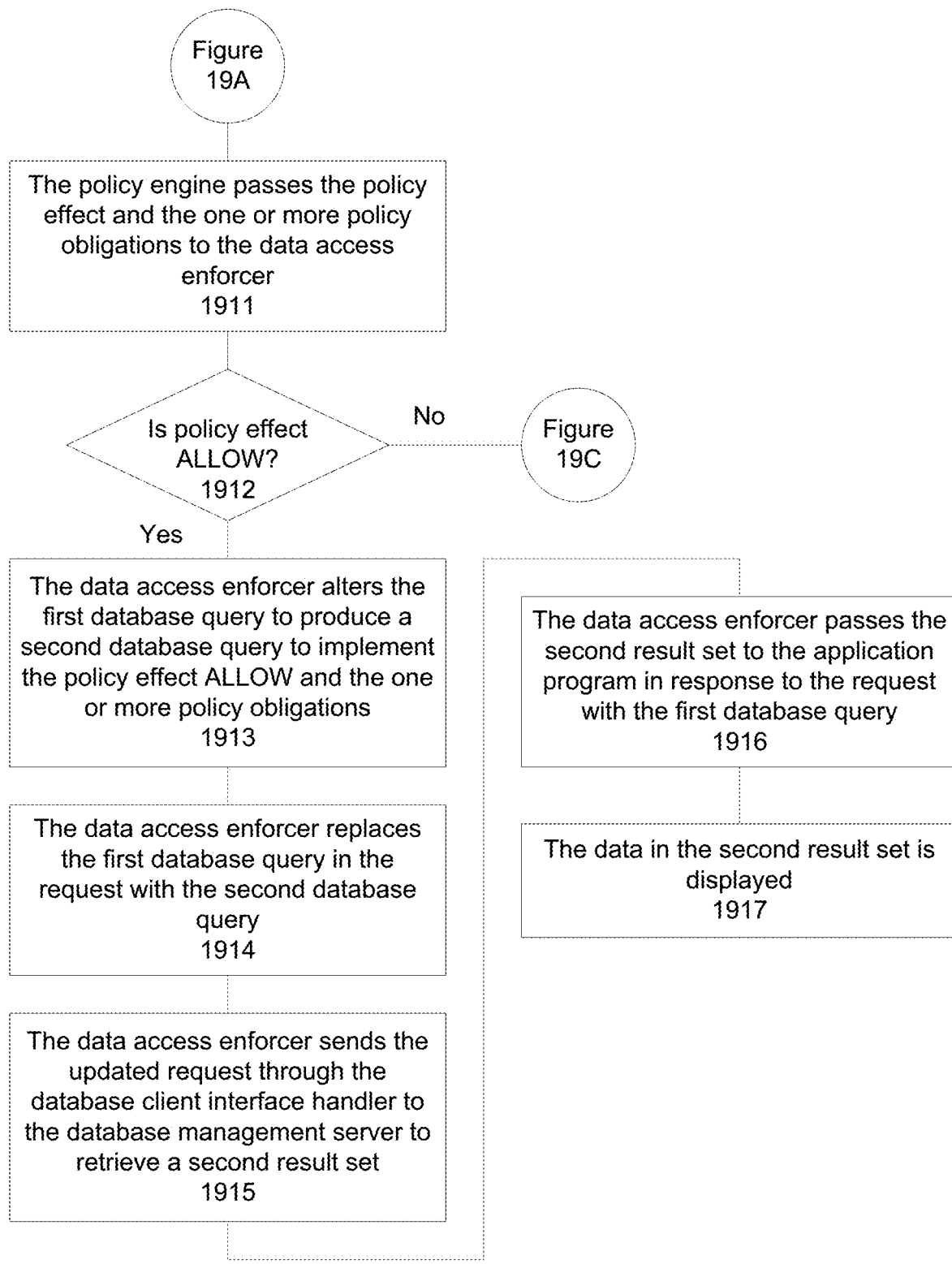
Figure 19C:
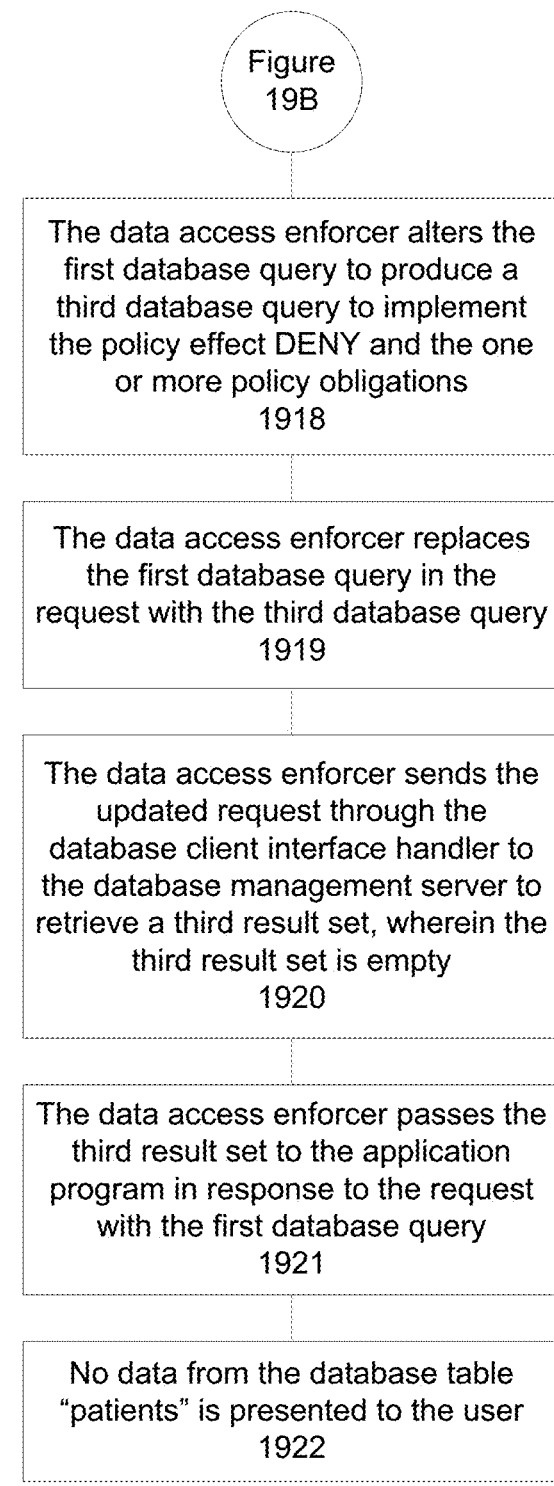

FIGS. 19A-19C show a flow diagram 1901 of a data access enforcer 1806 on a server computer 1805 enforcing data access policies that mask data in a column of a result set produced by a database management server Oracle MySQL® 1807. In step 1902, an office staff looks up information on a patient Robert Olsen using an application program Application H2 1803. In step 1903, the application program composes a first database query (also referred to as first unguarded database query or SQL H1 in the description of FIG. 18 above) to retrieve data of the patient from a database managed by the database management server. In step 1904, the application program sends a request (also referred to as first request in the description of FIG. 18 above) with the first database query to the database management server to retrieve a first result set.

In step 1905, the data access enforcer 1806 running on a server computer 1805 with the database management server intercepts the request before the request is processed by the database management server. In step 1906, the data access enforcer inspects the first database query and extracts information (e.g., database operation, table names, view names, or column names) from the first database query to support policy evaluation. In step 1907, the data access enforcer collects contextual information to support policy evaluation, where the contextual information includes Application H2 and user group being "office staff" The contextual information may be extracted from the request, obtained from a Lightweight Directory Access Protocol server, gathered by querying a policy context provider running in a process of the application program, or others. In step 1908, the data access enforcer sends the request, the extracted information, and the contextual information to a policy engine. In an implementation, the policy engine and the data access enforcer run on the same computer. In another implementation, the policy engine and the data access enforcer run on separate computers.

In step 1909, the policy engine selects a subset of data access policies from a plurality of data access policies in a local policy repository relevant to the request, where the subset of data access policies includes the data access policy Policy_H2 (described above in the description of FIG. 18). In an implementation, the plurality of data access policies in a local policy repository is distributed from a policy server. In another implementation, the plurality of data access policies in a local policy repository is installed manually. In step 1910, the policy engine evaluates the subset of data access policies with the request, the first database query, the extracted information and the contextual information to produce a policy effect (or decision, or policy decision) and one or more policy obligations, if any. In step 1911, the policy engine passes the policy effect and the one or more policy obligations (if any) to the data access enforcer.

If the policy effect is ALLOW, in step 1913, the data access enforcer alters the first database query to produce a second database query (also referred to as first guarded database query in the description of FIG. 18 above) to implement the policy effect ALLOW and the one or more policy obligations (if any). The altering of the first database query includes inserting guard conditions into the first database query. The guard conditions mask selected PIIs (e.g., medical records, or medications) in a result set. In step 1914, the data access enforcer replaces the first database query in the request with the second database query. In step 1915, the data access enforcer sends the updated request through the database client interface handler 1808 to the database management server to retrieve a second result set. In step 1916, the data access enforcer passes the second result set to the application program in response to the request with the first database query. In step 1917, the data in the second result set is displayed on the application program with selected PII data being redacted.

If the policy effect is DENY, in step 1918, the data access enforcer alters the first database query to produce a third database query to implement the policy effect DENY and the one or more policy obligations (if any). Altering the first database query includes inserting a condition into the first database query where the condition shall evaluate to false, thereby the third database query shall produce an empty result set. In step 1919, the data access enforcer replaces the first database query in the request with the third database query. In step 1920, the data access enforcer sends the updated request through the database client interface handler 1808 to the database management server to retrieve a third result set, where the third result set is empty. In step 1921, the data access enforcer passes the third result set to the application program in response to the request with the first database query. In step 1922, no data from the database table "patients" is presented to the user.

In an implementation, in step 1910, the policy engine does not produce a policy effect (i.e., since policy effect is always ALLOW). Steps 1918 to 1922 may be removed, and the data access enforcer does not need to handle policy effect DENY.

In an implementation, if the policy effect is DENY, in step 1918, the data access enforcer returns an error to the application program. The data access enforcer does not send the request to the database management server.

Figure 20:
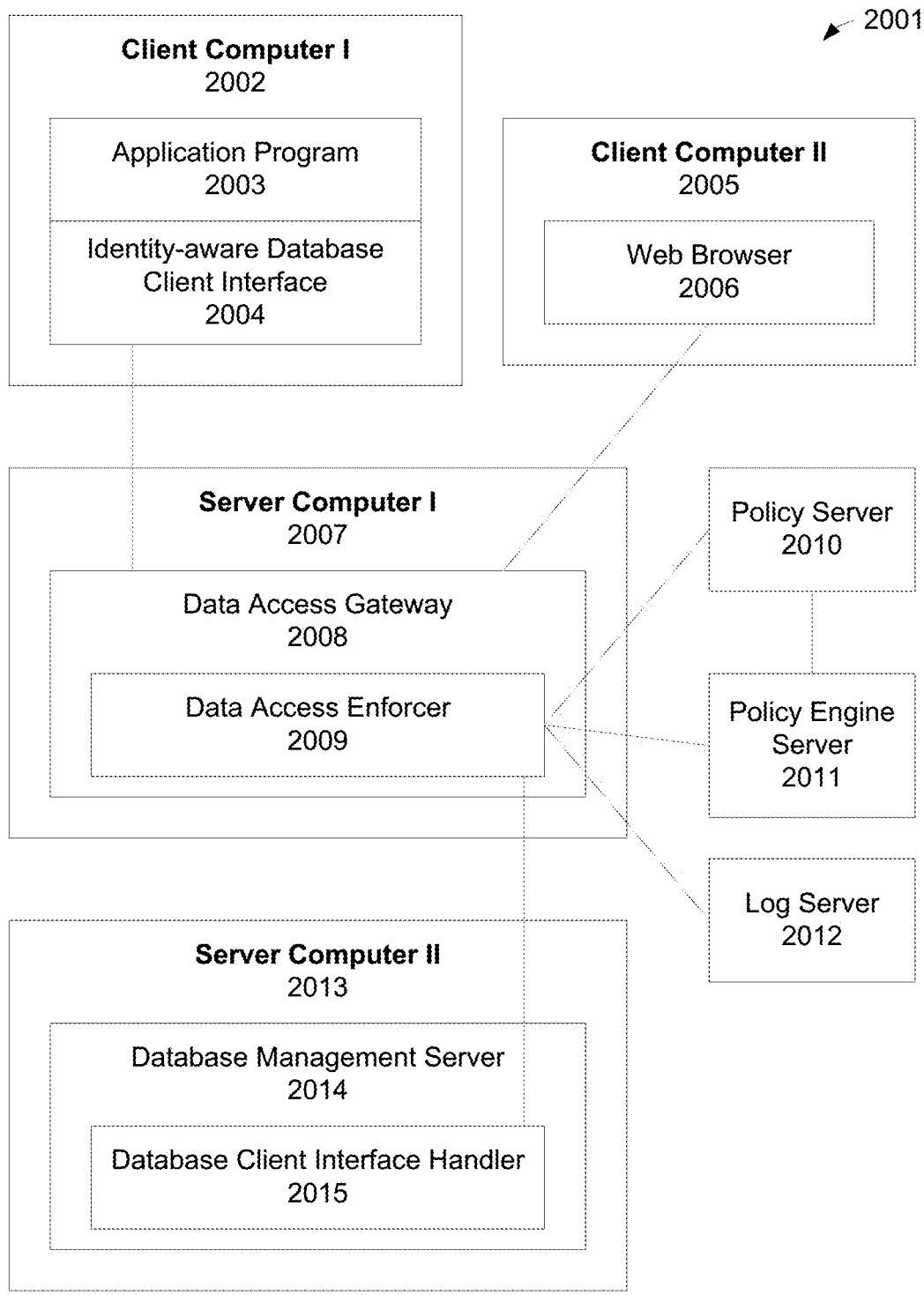
FIG. 20 shows a functional block diagram of gateway deployment of a data access enforcer with a policy engine server.

FIG. 20 shows a functional block diagram 2001 of gateway deployment of a data access enforcer 2009 with a policy engine server 2011. An application program (e.g., SAP ERP Central Component®) 2003 running on a client computer Client Computer I 2002 having access to a database management server 2014 sends requests through an identity-aware database client interface 2004 to the database management server. Examples of database management servers include Microsoft SQL Server®, Oracle® database, Oracle MySQL®, SAP HANA®, IBM DB2®, Google BigQuery™, Amazon Aurora®, PostgreSQL®, or others. The database management server is running on a server computer Server Computer II 2013 and the requests are received and processed by a database client interface handler 2015. A database client interface handler is a code module in a database management server and it handles requests from one or more application programs. A database client interface handler is a component of a database management server.

In an implementation, the application program and the database management server are deployed in an intranet environment of an organization. In another implementation, the database management server operates in an Internet Cloud environment and the application program operates in the same Internet Cloud environment or in a different environment.

To protect privacy and confidentiality and prevent data leak, a data access enforcer 2009 is installed on a gateway computer Server Computer I 2007. The data access enforcer is hosted in a data access gateway 2008 which performs the functions of a reverse proxy for one or more database management servers. The data access enforcer receives configuration, policy enforcement support data, software update, or other data from a policy server 2010. The data access gateway or data access enforcer reports its operational status to the policy server periodically. Server Computer I and Server Computer II are separate computing devices.

When the application program sends a request with a first database query to the database management server to retrieve a first result set, the data access enforcer intercepts (or receives) the request. The data access enforcer inspects (or analyzes) the first database query, extracts information from the first database query, and collects (or gathers) contextual information required to support policy evaluation. If the database client interface is identity aware, contextual information is passed along with a request. If contextual information is not passed along with a request, the data access enforcer may query a policy context provider for contextual information required to support policy evaluation. The data access enforcer sends the request, the extracted information and contextual information to a policy engine 2011.

The information that may be extracted from the first database query includes a database operation (e.g., select, insert, update, delete, or call), one or more database tables or views, one or more columns in the database tables or views, or others.

Contextual information refers to data relevant to evaluating data access policies. In an implementation, the data access enforcer extracts contextual information (e.g., the identity of the user who shall view the data in a result set) from the request. In another implementation, the data access enforcer requests contextual information from a policy context provider running in a process of the application program. In yet another implementation, the data access enforcer requests contextual information from an external data source (e.g., Microsoft Active Directory® or OpenLDAP). In yet another implementation, contextual information is attached to (or embedded in) a database query. In this case, the data access enforcer removes the contextual information in the database query after the contextual information is extracted by the data access enforcer. In an example, contextual information is embedded in the WHERE clause of a SQL statement where the WHERE clause evaluates to false when the embedded data is present. Contextual information may include name and version of an application program, the user who is currently logged on to an application program that initiated a request, the user who shall view the data to be returned with a request, the role of a user, the department a user belongs to, configuration and environment data, or some other data. Policy context provider is an optional component.

The policy engine selects a subset of data access policies from a plurality of data access policies in a local policy repository relevant to the request and evaluates the subset of data access policies to produce a policy effect (or decision, or policy decision) and one or more policy obligations (or instructions), if any. The policy effect and the one or more policy obligations (if any) are returned to the data access enforcer.

The data access enforcer implements the policy effect and the one or more policy obligations (if any), thereby altering the first database query to produce a second database query. The data access enforcer replaces the first database query in the request with the second database query. The data access enforcer sends the updated request to the database management server to retrieve a second result set. The first database query is not sent to the database management server. The data access enforcer returns the second result set to the application program in response to the request.

The data access enforcer and the policy engine send information associated with the request, policy evaluation, or enforcement to a log server 2012. In an implementation, the policy engine or the data access enforcer saves log data to a local cache and sends the cached log data to the log server periodically.

The data access gateway 2008 may intercept (or receive) requests from one or more application programs. A Web browser 2006 running on client computer Client Computer II 2005 may send a HTTP request to the database management server 2014 to retrieve data. The HTTP request is intercepted (or received) by the data access enforcer 2009. The steps applied to the processing of the request sent by the application program 2003 also apply to the processing of the HTTP request.

Policy engine is responsible for making a policy decision (or producing a policy effect) on a request based on a plurality of data access policies. The policy engine 2011 receives a plurality of data access policies, policy evaluation support data, configuration, software update, or other data from the policy server 2010. In an implementation, a policy engine also receives other types of policies from the policy server (e.g., access or use control policies). A policy engine may receive policy evaluation requests from one or more data access enforcers or data protection clients.

In an implementation, the policy engine 2011 does not produce a policy effect. The policy engine produces policy obligation only.

In an implementation, if the policy effect is DENY, the data access enforcer returns an error to the application program in response to the request.

In an implementation, the first database query is not altered but the second result set is altered by the data access enforcer to implement the one or more policy obligations.

In an implementation, the second result set is altered by the data access enforcer to implement the one or more policy obligations.

In an implementation, a gateway deployment uses a local policy engine to handle policy evaluation. Policy evaluation is performed locally by a policy engine running on the gateway computer 2007. A policy server 2010 distributes data access policies to a local policy repository on the gateway computer in addition to other information distributed to the data access enforcer. Both gateway deployments with local and external policy engines carry out the same enforcement functions.

In an example, a company has two design teams Team A and Team B. Team A is working on a project Project G for a first customer and Team B is working on a project Project H for a second customer. Both projects share a base design that is developed by the company and licensed to the first and second customers. Design data of the projects is stored in a database managed by a database management server Google BigQuery™. BigQuery™ is a cloud database service offered by Google®. To protect the intellectual properties (IP) and company secrets for the customers, Team A and Team B work separately. Team A uses an application program Application D1 to access Project G and base design data, while Team B uses an application program Application D2 to access Project H and base design data. A data access gateway is deployed to enforce data access policies that implement the requirement.

Figure 21:
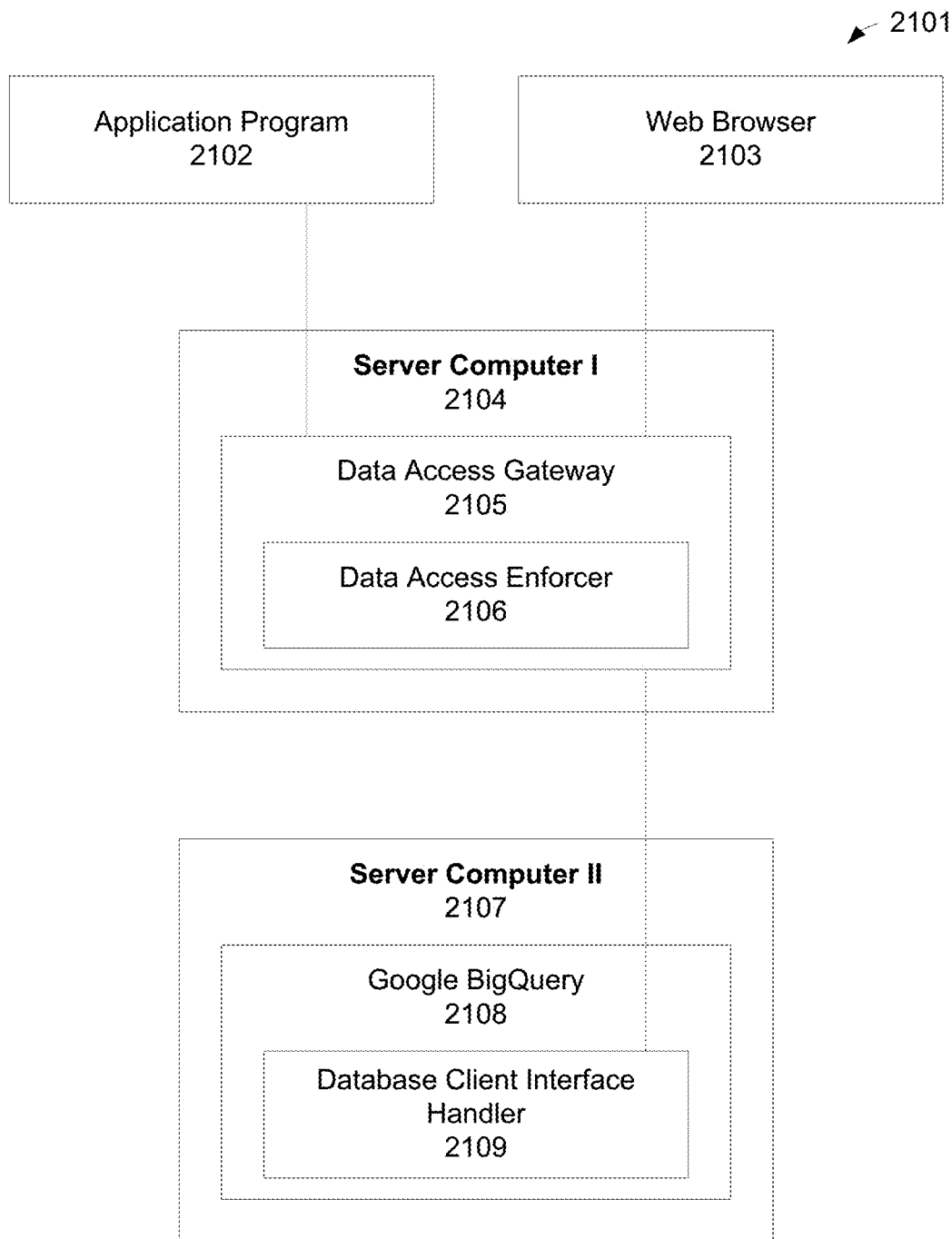
FIG. 21 shows a functional block diagram of a data access enforcer deployed on a gateway computer to enforce data access policies for a database management server Google BigQuery™.

Referring to FIG. 21, a data access enforcer 2106 deployed on a gateway computer Server Computer I 2104 enforces data access policies for a database management server Google BigQuery™ 2108 running on a server computer Server Computer II 2107. An application program Application D1 2102 running on a client computer retrieves data in a database table "projects" in a database managed by the database management server through a data access gateway 2105 running on the gateway computer. The database table stores design data of the base design, Project G, Project H, and other projects. The data access gateway comprises a data access enforcer 2106 that enforces data access policies on requests intended for the database management server.

The data access enforcer enforces a plurality of data access policies to protect privacy and confidentiality and prevent data leak. A first data access policy Policy_D1 in the plurality of data access policies filters out (or excludes) design data that is not classified (or coded) Base Design or Project G when accessed by Team A using Application D1. A second data access policy Policy_D2 in the plurality of data access policies filters out (or excludes) design data that is not classified Base Design or Project H when accessed by Team B using Application D2. The data access policies are:

```
# Policy_D1
FOR database_table = "//server101/design_db/projects"
ON SELECT
BY user.group = "Team A"
WHERE application.name = "Application D1"
DO ALLOW
    AND ApplyRowFilter("projects.code = 'Base Design' OR projects.code = 'Project G'");
# Policy_D2
FOR database_table = "//server101/design_db/projects"
ON SELECT
BY user.group = "Team B"
WHERE application.name = "Application D2"
DO ALLOW
    AND ApplyRowFilter("projects.code = 'Base Design' OR projects.code = 'Project H'");
```

At time T1, a first user Rebecca Thomas in Team A views design data using an application program Application D1. The application program retrieves design data in the database table "design_db/projects" by sending a first request with a first unguarded database query to the database management server to retrieve a first result set. The first unguarded database query is:

```
# SQL_D1
SELECT id, code, designData, lastModified FROM projects;
```

The data access enforcer intercepts (or receives) the first request and inspects (or analyzes) the first unguarded database query in the first request. The data access enforcer extracts information (e.g., database operation, table names, view names, or column names) from the first unguarded database query to support policy evaluation. The data access enforcer also collects (or gathers) contextual information required to support policy evaluation. Optionally, the data access enforcer makes a request to the policy context provider to gather contextual information from the application program. Contextual information collected by the policy context provider includes the first user who is currently logged on to the application program, or the name of the application program (i.e., Application D1) that sent the first request. The data access enforcer sends the first request, the extracted information and the contextual information to a policy engine (not shown).

The policy engine selects a subset of data access policies from a plurality of data access policies in a local policy repository relevant to the first request. The subset of data access policies includes the data access policy Policy_D1. The policy engine evaluates the subset of data access policies with contextual information including the first user and Application D1. The policy engine produces a policy effect ALLOW and a policy obligation. The policy effect and the policy obligation are returned to the data access enforcer. The policy obligation is:
ApplyRowFilter("projects.code='Base Design' OR projects.code='Project G'")

The data access enforcer inserts guard conditions into the first unguarded database query according to the policy obligation to produces a first guarded database query. The guard conditions are:
projects.code="Base Design" OR projects.code="Project G"

The first guarded database query is:

```
# SQL_D2
SELECT id, code, designData, lastModified FROM projects WHERE projects.code = "Base Design" OR projects.code = "Project G";
```

The data access enforcer replaces the first unguarded database query in the first request with the first guarded database query and sends the updated first request to the database management server to retrieve a second result set. The second result set contains only design data belongs to Base Design or Project G. The second result set is returned to the application program. The content of the second result set is displayed on the application program.

At time T2, a second user Peter Goodman of Team B views design data using an application program Application D2. The application program sends a second request with a second unguarded database query to the database management server to retrieve a third result set. The second unguarded database query is:

```
# SQL_D3
SELECT id, code, version, designData, remarks, updatedBy, lastModified
FROM projects;
```

The data access enforcer intercepts (or receives) the second request and inspects (or analyzes) the second unguarded database query in the second request. The data access enforcer extracts information (e.g., database operation, table names, view names, or column names) from the second unguarded database query to support policy evaluation. The data access enforcer also collects (or gathers) contextual information required to support policy evaluation. Optionally, the data access enforcer makes a request to the policy context provider to gather contextual information from the application program. Contextual information collected by the policy context provider includes the second user who is currently logged on to the application program, or the name of the application program (i.e., Application D2) that sent the second request. The data access enforcer sends the second request, the extracted information and the contextual information to a policy engine (not shown).

The policy engine selects a subset of data access policies from a plurality of data access policies in a local policy repository relevant to the second request. The subset of data access policies includes the data access policy Policy_D2. The policy engine evaluates the subset of data access policies with contextual information including the second user and Application D2. The policy engine produces a policy effect ALLOW and a policy obligation. The policy effect and the policy obligation are returned to the data access enforcer. The policy obligation is:
ApplyRowFilter("projects.code='Base Design' OR projects.code='Project H'")

The data access enforcer inserts guard conditions into the second unguarded database query according to the policy obligation to produces a second guarded database query. The guard conditions are:
projects.code="Base Design" OR projects.code="Project H"

The second guarded database query is:

```
# SQL_D4
SELECT id, code, version, designData, remarks, updatedBy, lastModified
FROM projects WHERE projects.code = "Base Design" OR
projects.code = "Project H";
```

The data access enforcer retrieves a fourth result set using the second guarded database query and the fourth result set comprises only design data belongs to Base Design or Project H. The fourth result set is different from the second result set. The content of the fourth result set is displayed on the application program.

In an implementation, the data access gateway 2105 intercepts (or receives) HTTP requests from a Web browser 2103 running on a client computer. The HTTP request contains a database query to be processed by a database management server Google BigQuery™ 2108. The steps applied to the processing of the request sent by the application program 2102 in the above also applies to processing of the HTTP request.

Figure 22A:
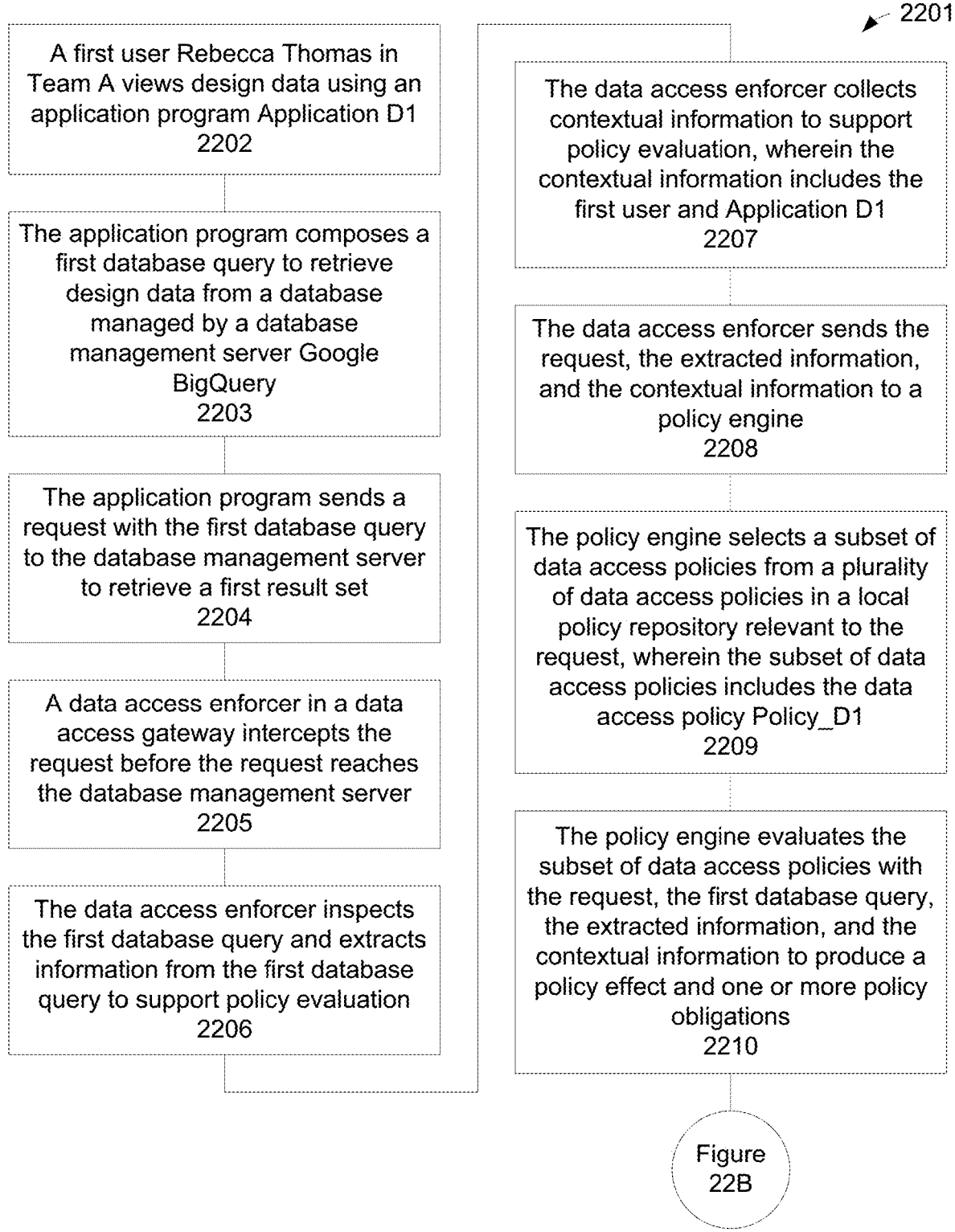
Figure 22B:
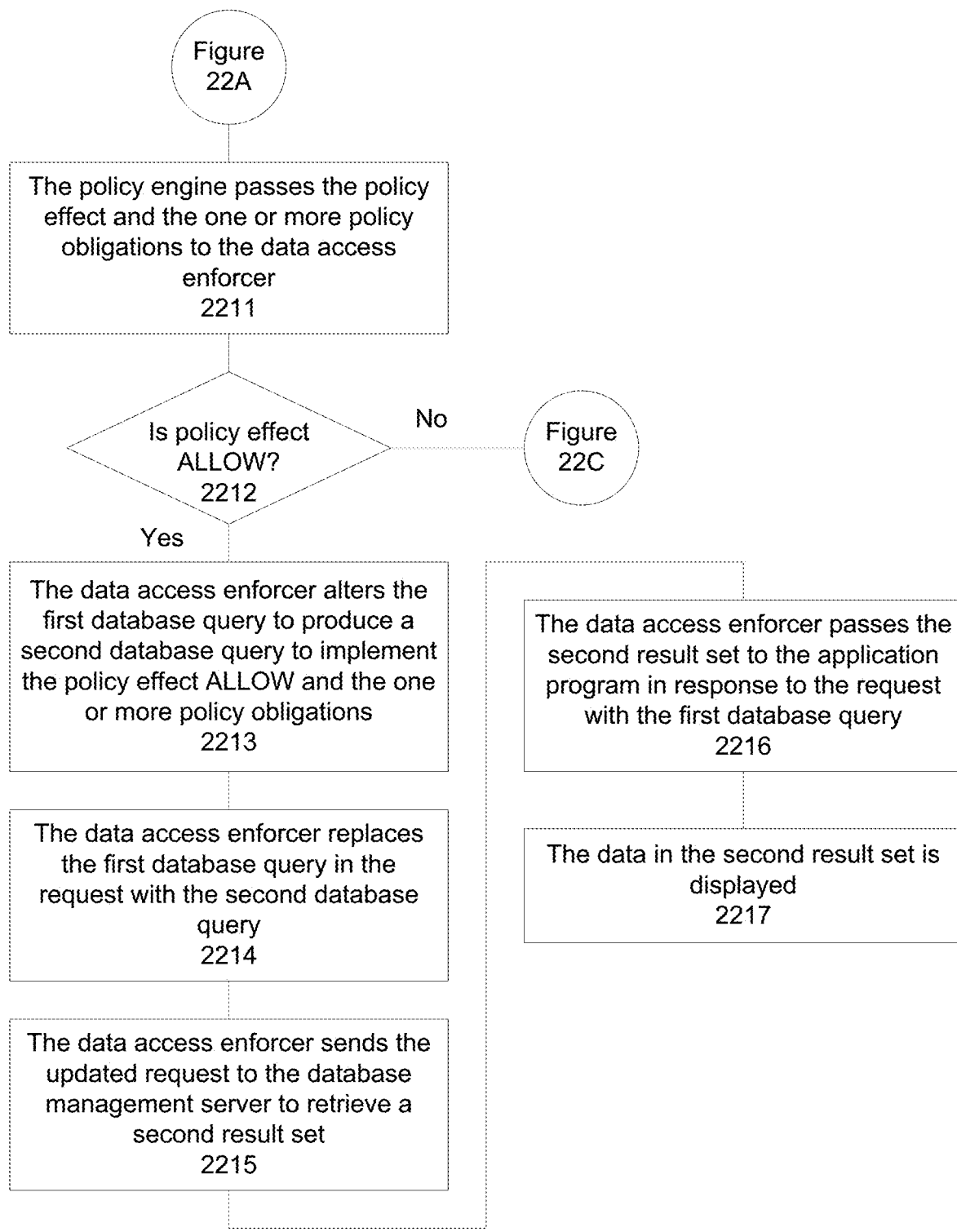

FIGS. 22A-22C show a flow diagram 2201 of a data access enforcer 2106 on a gateway computer Server Computer I 2104 enforcing data access policies that filter out (or exclude) data in a result set produced by a database management server Google BigQuery™ 2108 running on a server computer Server Computer II 2107. In step 2202, a first user Rebecca Thomas in Team A views design data using an application program Application D1 2102. In step 2203, the application program composes a first database query (also referred to as first unguarded database query or SQL_D1 in the description of FIG. 21 above) to retrieve design_data from a database managed by the database management server. In step 2204, the application program sends a request (also referred to as first request in the description of FIG. 21 above) with the first database query to the database management server to retrieve a first result set.

In step 2205, a data access enforcer 2106 in a data access gateway 2105 intercepts (or receives) the request before the request reaches the database management server. In step 2206, the data access enforcer inspects (or analyzes) the first database query and extracts information (e.g., database operation, table names, view names, or column names) from the first database query to support policy evaluation. In step 2207, the data access enforcer collects contextual information required to support policy evaluation, where the contextual information includes the first user and Application D1. The contextual information may be extracted from the request, obtained from a Lightweight Directory Access Protocol server, gathered by querying a policy context provider running in a process of the application program, or others. In step 2208, the data access enforcer sends the request, the extracted information and the contextual information to a policy engine. In an implementation, the policy engine and the data access enforcer run on the same computing device. In another implementation, the policy engine and the data access enforcer run on separate computing devices.

In step 2209, the policy engine selects a subset of data access policies from a plurality of data access policies in a local policy repository relevant to the request, where the subset of data access policies includes the data access policy Policy_D1 (described above in the description of FIG. 21). In an implementation, the plurality of data access policies in a local policy repository is distributed from a policy server. In another implementation, the plurality of data access policies in a local policy repository is installed manually. In step 2210, the policy engine evaluates the subset of data access policies with the request, the first database query, the extracted information and the contextual information to produce a policy effect (or decision, or policy decision) and one or more policy obligations, if any. In step 2211, the policy engine passes the policy effect and the one or more policy obligations (if any) to the data access enforcer.

If the policy effect is ALLOW, in step 2213, the data access enforcer alters the first database query to produce a second database query (also referred to as first guarded database query or SQL_D2 in the description of FIG. 21 above) to implement the policy effect ALLOW and the one or more policy obligations (if any). The altering of the first database query includes inserting guard conditions into the first database query. The guard conditions restrict (or limit) design data to that classified as Base Design or Project G. In step 2214, the data access enforcer replaces the first database query in the request with the second database query. In step 2215, the data access enforcer sends the updated request to the database management server to retrieve a second result set. The second result set contains only design data classified as Base Design or Project G. In step 2216, the data access enforcer passes the second result set to the application program in response to the request with the first database query. In step 2217, the data in the second result set is displayed on the application program.

If the policy effect is DENY, in step 2218, the data access enforcer alters the first database query to produce a third database query (also referred to as second unguarded database query or SQL_D3 in the description of FIG. 21 above) to implement the policy effect DENY and the one or more policy obligations (if any). Altering the first database query includes inserting a condition into the first database query where the condition shall evaluate to false, thereby the third database query shall produce an empty result set. In step 2219, the data access enforcer replaces the first database query in the request with the third database query. In step 2220, the data access enforcer sends the updated request to the database management server to retrieve a third result set, where the third result set is empty. In step 2221, the data access enforcer passes the third result set to the application program in response to the request with the first database query. In step 2222, no data from the database table "projects" is presented to the user.

In an implementation, in step 2210, the policy engine does not produce a policy effect (i.e., since policy effect is always ALLOW). Steps 2218 to 2222 may be removed, and the data access enforcer does not need to handle policy effect DENY.

In an implementation, if the policy effect is DENY, in step 2218, the data access enforcer returns an error to the application program. The data access enforcer does not send the request to the database management server.

In an implementation, a method includes: providing a database component in a software stack, where the database component manages a relational database, where the relational database having tables, where each table having a rows and columns; providing an application component in the software stack, where the application component has access to data in the tables, where the application component retrieves data in the tables via a database query; providing a data protection component in the software stack, where the data protection component controls access to the data in the tables according to data access policies, where a database query sent by the application component passes through the data protection component before the database query reaches the database component; at the application component, sending a first database query to the database component to retrieve a first result set, where the identity of a user who shall view the data in the first result set is sent along with the first database query; at the data protection component, intercepting the first database query before the first database query reaches the database component; at the data protection component, collecting contextual information to support evaluation of the data access policies, where a subset of the contextual information is collected from the application component; at the data protection component, obtaining an instruction for altering the first database query according to the data access policies and contextual information, where the instruction can include a policy obligation; at the data protection component, altering the first database query to produce a second database query according to the instruction; at the data protection component, sending the second database query to the database component to retrieve a second result set, where the first database query is not sent to the database component; and at the data protection component, passing the second result set to the application component in response to the first database query.

In various implementations, the database query is a Structure Query Language (SQL) statement. The data access policies controls access to the data in the tables based on the identity of a user logged into the application component. The data access policies controls access to the data in the tables based on the identity of a user connected to the database component. The data access policies controls access to the data in the tables can include excluding a row in the first result set. The data access policies controls access to the data in the tables, including masking of data in a column in the first result set. The data access policies are stored in one of a XML file, a configuration file, or a database.

Further, the at the data protection component, collecting contextual information to support evaluation of the data access policies, where a subset of the contextual information is collected from the application component can further include: invoking a code module in the application component to retrieve contextual information to support evaluation of the data access policies.

The at the data protection component, obtaining an instruction for altering the first database query according to the data access policies and contextual information can further include: sending the first database query and the contextual information to a policy engine; evaluating at the policy engine a subset of the data access policies with the first database query and the contextual information to produce an instruction for altering the first database query; and passing the instruction to the data protection component by the policy engine.

The contextual information can include the identity of a user logged into the application component. The instruction for altering the first database query can include an instruction for inserting a guard condition into the first database query, where the guard condition prevents data leak. The data protection component and the policy engine can run on the same computing device. The data protection component and the policy engine can run on separate computing devices.

The at the data protection component, altering the first database query to produce a second database query according to the instruction can include: inserting a guard condition into the first database query, where the guard condition reduces the amount of data produced by the first database query. The first database query can include an SQL statement, where the inserting a guard condition into the first database query can include: altering the WHERE clause of the SQL statement. The first database query and the second database query can be different. The executing the first database query at the database component can produce a nonempty result set (or not-empty set or not-null set or not-zero set), where executing the second database query at the database component produces an empty result set.

The second result set can be a subset of the first result set. The first result set and the second result set each can include rows and columns, where the number of rows in the first result set is greater than or equal to the number of rows in the second result set. The first result set and the second result set each can include rows and columns, where data in a column in the second result set is masked while data in a corresponding column in the first result set is not masked.

The database component can include a database manage server. The application component can include an application program. The data protection component can include a data access enforcer, where the data protection component protects privacy and confidentiality and prevents data leak.

In a further implementation, a method includes: providing a database management server, where the database management server manages a relational database, where the relational database having tables, where each table having rows and columns; providing an application program having access to data in the tables, where the application program retrieves data in the tables via a database query; providing a database client interface facilitating communication between the application program and the database management server, where the application program sends database queries to the database management server through the database client interface; providing a policy engine having data access policies, where the data access policies controls access to the data in the tables; providing a data access enforcer capable of intercepting database queries passing through the database client interface; at the application program, sending a first database query through the database client interface to the database management server to retrieve a first result set, where the identity of a user who shall view the data in the first result set is sent along with the first database query; at the data access enforcer, intercepting the first database query before the first database query reaches the database management server; at the data access enforcer, collecting contextual information to support evaluation of the data access policies, where a subset of the contextual information is collected from the application program; at the data access enforcer, obtaining a decision on whether the first database query is allowed from the policy engine; at the data access enforcer, altering the first database query to produce a second database query to implement the decision; at the data access enforcer, sending the second database query using the database client interface to the database management server to retrieve a second result set, where the first database query is not sent to the database management server; and at the data access enforcer, passing the second result set to the application program in response to the first database query.

In various implementations, the database query is a Structure Query Language (SQL) statement. The database client interface includes one of Open Database Connectivity (ODBC), Java Database Connectivity (JDBC), Oracle Call Interface (OCI) or SAP HDB Client module. The database client interface is extended to support passing contextual information along with the first database query, where the contextual information includes the identity of the user. The data access policies controls access to the data in the tables based on the identity of a user logged into the application program. The data access policies controls access to the data in the tables based on the identity of a user connected to the database management server. The data access policies controls access to the data in the tables includes excluding a row in the first result set. The data access policies controls access to the data in the tables includes masking of data in a column in the first result set. The data access policies can be stored in a file.

The at the data access enforcer, obtaining a decision on whether the first database query is allowed from the policy engine further includes: at the data access enforcer, sending the first database query and the contextual information to the policy engine; at the policy engine, evaluating a subset of the data access policies with the first database query and the contextual information to produce a decision; and at the policy engine, passing the decision to the data access enforcer. The decision can be an allowed or deny response. The decision can include allowed and additional instructions.

The at the data access enforcer, obtaining a decision on whether the first database query is allowed from the policy engine can be replaced by: at the data access enforcer, obtaining a decision from the policy engine, where the decision includes an instruction for altering the first database query. The data access enforcer and the policy engine can run or execute on the same computing device.

The at the data access enforcer, altering the first database query to produce a second database query to implement the decision can include: inserting a condition into the first database query, where the condition reduces the amount of data produced by the first database query. The first database query can include a SQL statement, where the inserting a condition into the first database query can include: altering the WHERE clause of the SQL statement.

The at the data access enforcer, altering the first database query to produce a second database query to implement the decision can include: if the decision is not allowed, the first database query is altered to produce a second database query, where executing the second database query at the database management server produces an empty result set.

The first database query and the second database query can be different. The second result set can be a subset of the first result set. The first result set and the second result set can each include rows and columns, where the number of rows in the second result set is less than or equal to the number of rows in the first result set. The first result set and the second result set can each include rows and columns, where data in a column in the second result set is masked while data in a corresponding column in the first result set is not masked.

In a further implementation, a method includes: providing a database management server, where the database management server manages a relational database, where the relational database having tables, where each table having rows and columns; providing an application program having access to data in the tables, where the application program retrieves data in the tables via a database query; providing a database client interface facilitating communication between the application program and the database management server, where the application program sends database queries to the database management server through the database client interface; providing a policy engine having data access policies, where the data access policies controls access to the data in the tables; providing a data access enforcer capable of intercepting database queries passing through the database client interface; at the application program, sending a first database query through the database client interface to the database management server to retrieve a first result set; at the data access enforcer, intercepting the first database query before the first database query reaches the database management server; at the data access enforcer, collecting contextual information to support evaluation of the data access policies, where a subset of the contextual information is collected from the application program; at the data access enforcer, obtaining a decision on whether the first database query is allowed from the policy engine; at the data access enforcer, altering the first database query to produce a second database query to implement the decision; at the data access enforcer, sending the second database query using the database client interface to the database management server to retrieve a second result set, where the first database query is not sent to the database management server; and at the data access enforcer, passing the second result set to the application program in response to the first database query.

In various implementations, the database client interface can include one of Open Database Connectivity (ODBC), Java Database Connectivity (JDBC), Oracle Call Interface (OCI) or SAP HDB Client module. The at the data access enforcer, obtaining a decision on whether the first database query is allowed from the policy engine further can include: at the data access enforcer, sending the first database query and the contextual information to the policy engine; at the policy engine, evaluating a subset of the data access policies with the first database query and the contextual information to produce a decision; and at the policy engine, passing the decision to the data access enforcer. The contextual information can include the identity of a user logged into the application program. The at the data access enforcer, altering the first database query to produce a second database query to implement the decision can include: inserting a condition into the first database query, where the condition reduces the amount of data produced by the first database query.

In a further implementation, a method includes: providing a database management server, where the database management server manages a relational database, where the relational database having tables, where each table having rows and columns; providing an application program having access to data in the tables, where the application program retrieves data in the tables via a database query; providing a policy engine having data access policies, where the data access policies controls access to the data in the tables; providing a data access enforcer capable of intercepting database queries before the database queries reach the database management server; at the application program, sending a first database query to the database management server to retrieve a first result set, where the identity of a user who shall view the data in the first result set is sent along with the first database query; at the data access enforcer, intercepting the first database query before the first database query is processed by the database management server; at the data access enforcer, collecting contextual information to support evaluation of the data access policies; at the data access enforcer, obtaining a decision on whether the first database query is allowed from the policy engine, where the decision includes a policy obligation; at the data access enforcer, altering the first database query to produce a second database query to implement the decision; at the data access enforcer, sending the second database query to the database management server to retrieve a second result set, where the first database query is not sent to the database management server; and at the data access enforcer, passing the second result set to the application program in response to the first database query.

In various implementations, the database query is a Structure Query Language (SQL) statement. The data access policies can control access to the data in the tables based on the identity of a user logged into the application program. The data access policies can control access to the data in the tables based on the identity of a user connected to the database management server. The data access policies can control access to the data in the tables includes excluding a row in the first result set. The data access policies can control access to the data in the tables includes masking of data in a column in the first result set. The data access policies can be stored in a file. The data access enforcer can perform the function of a reverse proxy server for the database management server. The application program and the data access enforcer can run on separate or different computing devices. The data access enforcer and the database management server can run on the same computing device. The data access enforcer and the database management server can run on separate computing devices.

The application program and the database management server can communicate using one of Tabular Data Stream (TDS) protocol, Hypertext Transfer Protocol (HTTP) or SOAP messaging protocol. The application program and the database management server can communicate using a representational state transfer (REST) style application programming interface. The at the data access enforcer, intercepting the first database query before the first database query is processed by the database management server can include: instrumenting the database client interface handler of the database management server to intercept the first database query before the first database query is processed by the database management server.

The at the data access enforcer, obtaining a decision on whether the first database query is allowed from the policy engine can include: at the data access enforcer, sending the first database query and the contextual information to the policy engine; at the policy engine, evaluating a subset of the data access policies with the first database query and the contextual information to produce a decision; and at the policy engine, passing the decision to the data access enforcer. The contextual information can include the identity of a user logged into the application program. The decision can include allowed or deny. The decision can include allowed and additional instructions.

The at the data access enforcer, obtaining a decision on whether the first database query is allowed from the policy engine can be replaced by: at the data access enforcer, obtaining a decision from the policy engine, where the decision can include an instruction for altering the first database query. The data access enforcer and the policy engine can run on the same computing device. The data access enforcer and the policy engine can run on separate computing devices. The at the data access enforcer, altering the first database query to produce a second database query to implement the decision can include: inserting a condition into the first database query, where the condition reduces the amount of data produced by the first database query.

The first database query can include a SQL statement, where the inserting a condition into the first database query can include: altering the WHERE clause of the SQL statement. The at the data access enforcer, altering the first database query to produce a second database query to implement the decision can include: if the decision is not allowed, the first database query is altered to produce a second database query, where executing the second database query at the database management server produces an empty result set. The first database query and the second database query can be different. The second result set can be a subset of the first result set. The first result set and the second result set each can include rows and columns, where the number of rows in the second result set is less than or equal to the number of rows in the first result set. The first result set and the second result set each can include rows and columns, where data in a column in the second result set is masked while data in a corresponding column in the first result set is not masked.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description shall enable others skilled in the art to best utilize and practice the invention in various embodiments and with various modifications as are suited to a particular use. The scope of the invention is defined by the following claims.

The invention claimed is:

1. A method comprising:
providing a database management server, wherein the database management server manages a relational database, wherein the relational database having a plurality of tables, wherein each table having a plurality of rows and columns;
providing an application program having access to data in the plurality of tables, wherein the application program retrieves data in the plurality of tables via a database query;
providing a policy engine having a plurality of data access policies, wherein the plurality of data access policies controls access to the data in the plurality of tables;
providing a data access enforcer capable of intercepting database queries before the database queries reach the database management server;
providing a policy context provider installed on the application component, where the policy context provider sends application user information to the data protection component;
at the application component, sending a first user information comprising an identity of the first user to the data protection component, where policy enforcement by the data protection component is based on the first user information;
at the application component, sending a second user information comprising an identity of the second user to the data protection component, where policy enforcement by the data protection component is based on the second user information;
at the application program, sending a first database query to the database management server to retrieve a first result set, wherein an identity of a user viewing the data in the first result set was provided by the policy context provider before the first database query is sent;
at the data access enforcer, intercepting the first database query before the first database query is processed by the database management server;
at the data access enforcer, collecting contextual information to support evaluation of the plurality of data access policies;
at the data access enforcer, obtaining a decision on whether the first database query is allowed from the policy engine, wherein the decision comprises a policy obligation;
at the data access enforcer, altering the first database query to produce a second database query to implement the decision;
at the data access enforcer, sending the second database query to the database management server to retrieve a second result set, wherein the first database query is not sent to the database management server; and
at the data access enforcer, passing the second result set to the application program in response to the first database query, wherein for the first user information, the response to the first database query provides results comprises masked data in a first column, and
for the second user information, the response to the first database query provides results comprises unmasked data in the first column.

2. The method of claim 1 wherein the database query is a Structure Query Language (SQL) statement.

3. The method of claim 1 wherein the plurality of data access policies controls access to the data in the plurality of tables based on the identity of a user logged into the application program.

4. The method of claim 1 wherein the plurality of data access policies controls access to the data in the plurality of tables based on the identity of a user connected to the database management server.

5. The method of claim 1 wherein the plurality of data access policies controls access to the data in the plurality of tables comprises excluding a row in the first result set.

6. The method of claim 1 wherein the plurality of data access policies controls access to the data in the plurality of tables comprises masking of data in a column in the first result set.

7. The method of claim 1 wherein the plurality of data access policies is stored in a file.

8. The method of claim 1 wherein the data access enforcer performs the function of a reverse proxy server for the database management server.

9. The method of claim 1 wherein the application program and the data access enforcer run on separate computing devices.

10. The method of claim 1 wherein the data access enforcer and the database management server run on the same computing device.

11. The method of claim 1 wherein the data access enforcer and the database management server run on separate computing devices.

12. The method of claim 1 wherein the application program and the database management server communicate using one of Tabular Data Stream (TDS) protocol, Hypertext Transfer Protocol (HTTP) or SOAP messaging protocol.

13. The method of claim 1 wherein the application program and the database management server communicate using a representational state transfer (REST) style application programming interface.

14. The method of claim 1 wherein the at the data access enforcer, intercepting the first database query before the first database query is processed by the database management server comprises:
instrumenting the database client interface handler of the database management server to intercept the first database query before the first database query is processed by the database management server.

15. The method of claim 1 wherein the at the data access enforcer, obtaining a decision on whether the first database query is allowed from the policy engine comprises:
at the data access enforcer, sending the first database query and the contextual information to the policy engine;
at the policy engine, evaluating a subset of the plurality of data access policies with the first database query and the contextual information to produce a decision; and
at the policy engine, passing the decision to the data access enforcer.

16. The method in claim 15 wherein the contextual information comprises the identity of a user logged into the application program.

17. The method of claim 1 wherein the decision comprises allowed or deny.

18. The method of claim 1 wherein the decision comprises allowed and additional instructions.

19. The method of claim 1 wherein the at the data access enforcer, obtaining a decision on whether the first database query is allowed from the policy engine is replaced by
at the data access enforcer, obtaining a decision from the policy engine, wherein the decision comprises an instruction for altering the first database query.

20. The method of claim 1 wherein the data access enforcer and the policy engine run on the same computing device.

21. The method of claim 1 wherein the data access enforcer and the policy engine run on separate computing devices.

22. The method of claim 1 wherein the at the data access enforcer, altering the first database query to produce a second database query to implement the decision comprises:
inserting a condition into the first database query, wherein the condition reduces the amount of data produced by the first database query.

23. The method of claim 22 wherein the first database query comprises a SQL statement, wherein the inserting a condition into the first database query comprises:
altering the WHERE clause of the SQL statement.

24. The method of claim 1 wherein the at the data access enforcer, altering the first database query to produce a second database query to implement the decision comprises:
if the decision is not allowed, the first database query is altered to produce a second database query, wherein executing the second database query at the database management server produces an empty result set.

25. The method of claim 1 wherein the first database query and the second database query are different.

26. The method of claim 1 wherein the second result set is a subset of the first result set.

27. The method of claim 1 wherein the first result set and the second result set each comprises a plurality of rows and columns, wherein the number of rows in the second result set is less than or equal to the number of rows in the first result set.

28. The method of claim 1 wherein the first result set and the second result set each comprises a plurality of rows and columns, wherein data in a column in the second result set is masked while data in a corresponding column in the first result set is not masked.

* * * * *